United States Patent
Tonkovich et al.

(10) Patent No.: US 7,610,775 B2
(45) Date of Patent: *Nov. 3, 2009

(54) DISTILLATION PROCESS USING MICROCHANNEL TECHNOLOGY

(75) Inventors: Anna Lee Tonkovich, Dublin, OH (US); Wayne W. Simmons, Dublin, OH (US); Laura J. Silva, Dublin, OH (US); Dongming Qiu, Carbondale, IL (US); Steven T. Perry, Galloway, OH (US); Thomas Yuschak, Dublin, OH (US); Thomas P. Hickey, Dublin, OH (US); Ravi Arora, Dublin, OH (US); Amanda Smith, Galloway, OH (US); Robert Dwayne Litt, Westerville, OH (US); Paul Neagle, Westerville, OH (US)

(73) Assignee: Velocys, Inc., Plain City, OH (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/177,941

(22) Filed: Jul. 8, 2005

(65) Prior Publication Data
US 2006/0016216 A1 Jan. 26, 2006

Related U.S. Application Data

(63) Continuation-in-part of application No. 10/898,687, filed on Jul. 23, 2004, now Pat. No. 7,305,850.

(60) Provisional application No. 60/669,486, filed on Apr. 8, 2005.

(51) Int. Cl.
*F25J 3/00* (2006.01)

(52) U.S. Cl. .............................. 62/617; 62/623; 62/643; 62/902

(58) Field of Classification Search ................ 62/617, 62/643, 623, 902, 903, 905
See application file for complete search history.

(56) References Cited

U.S. PATENT DOCUMENTS

| 3,477,917 A | 11/1969 | Rodgers | 203/10 |
| 3,562,116 A | 2/1971 | Rodgers | 202/200 |

(Continued)

FOREIGN PATENT DOCUMENTS

CN 1068973 2/1993

(Continued)

OTHER PUBLICATIONS

Notice of Allowance, U.S. Appl. No. 10/898,687, mailed Oct. 17, 2007.

(Continued)

*Primary Examiner*—William C Doerrler
(74) *Attorney, Agent, or Firm*—Renner, Otto, Boisselle & Sklar, LLP

(57) ABSTRACT

The disclosed invention relates to a distillation process for separating two or more components having different volatilities from a liquid mixture containing the components. The process employs microchannel technology for effecting the distillation and is particularly suitable for conducting difficult separations, such as the separation of ethane from ethylene, wherein the individual components are characterized by having volatilities that are very close to one another.

116 Claims, 30 Drawing Sheets

U.S. PATENT DOCUMENTS

| | | | |
|---|---|---|---|
| 3,661,721 A | 5/1972 | Rodgers | 202/172 |
| 4,392,362 A | 7/1983 | Little | 62/514 |
| 4,516,632 A | 5/1985 | Swift et al. | 165/167 |
| 4,597,947 A | 7/1986 | Almaula et al. | 422/191 |
| 5,309,637 A | 5/1994 | Moriarty | 29/890.054 |
| 5,317,805 A | 6/1994 | Hoopman et al. | 29/890.03 |
| 5,611,214 A | 3/1997 | Wegeng et al. | 62/498 |
| 5,727,618 A | 3/1998 | Mundinger et al. | 165/80.4 |
| 5,811,062 A | 9/1998 | Wegeng et al. | 422/129 |
| 5,858,314 A | 1/1999 | Hsu et al. | 422/211 |
| 6,126,723 A | 10/2000 | Drost et al. | 96/4 |
| 6,129,973 A | 10/2000 | Martin et al. | 428/166 |
| 6,192,596 B1 | 2/2001 | Bennett et al. | 34/76 |
| 6,200,536 B1 | 3/2001 | Tonkovich et al. | 422/177 |
| 6,216,343 B1 | 4/2001 | Leland et al. | 29/890.032 |
| 6,220,497 B1 | 4/2001 | Benz et al. | 228/118 |
| 6,230,408 B1 | 5/2001 | Ehrfeld et al. | 29/890.039 |
| 6,313,393 B1 | 11/2001 | Drost | 136/201 |
| 6,352,577 B1 | 3/2002 | Martin et al. | 96/4 |
| 6,381,846 B2 | 5/2002 | Insley et al. | 29/890.039 |
| 6,415,860 B1 | 7/2002 | Kelly et al. | 165/748 |
| 6,488,838 B1 | 12/2002 | Tonkovich et al. | 208/108 |
| 6,540,975 B2 | 4/2003 | Tonkovich et al. | 423/659 |
| 6,666,909 B1 | 12/2003 | TeGrotenhuis et al. | 95/273 |
| 6,675,875 B1 | 1/2004 | Vafai et al. | 165/80.4 |
| 6,746,819 B1 | 6/2004 | Schmitz et al. | 430/272.1 |
| 6,747,178 B1 | 6/2004 | Harston et al. | 570/175 |
| 6,749,814 B1 | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,769,444 B2 | 8/2004 | Guzman et al. | 137/15.01 |
| 6,770,245 B2 | 8/2004 | Akporiaye et al. | 422/82.12 |
| 6,773,684 B2 | 8/2004 | Lesieur et al. | 422/198 |
| 6,875,247 B2 * | 4/2005 | TeGrotenhuis et al. | 55/319 |
| 7,220,388 B2 | 5/2007 | Bishop et al. | 422/100 |
| 7,305,850 B2 * | 12/2007 | Tonkovich et al. | 62/617 |
| 2002/0144600 A1 | 10/2002 | TeGrotenhuis et al. | 95/273 |
| 2004/0104010 A1 | 6/2004 | Kenny et al. | 165/80.4 |
| 2004/0123626 A1 | 7/2004 | Caze et al. | 65/17.2 |
| 2004/0125689 A1 | 7/2004 | Ehrfeld et al. | 366/165.1 |
| 2004/0130057 A1 | 7/2004 | Mehrabi et al. | 264/171.13 |
| 2004/0131345 A1 | 7/2004 | Kylberg et al. | 392/465 |
| 2004/0131507 A1 | 7/2004 | Saitmacher et al. | 422/111 |
| 2004/0131829 A1 | 7/2004 | Joseph et al. | 428/166 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |
| 2007/0241066 A1 | 10/2007 | Bishop et al. | 210/774 |

FOREIGN PATENT DOCUMENTS

| | | |
|---|---|---|
| DE | 19812067 | 10/1999 |
| EP | 1 311 341 B1 | 8/2001 |
| EP | 0 904 608 B1 | 12/2001 |
| EP | 1 362 634 A1 | 11/2003 |
| WO | 97/32687 | 9/1997 |
| WO | 98/55812 | 12/1998 |
| WO | 00/06295 | 2/2000 |
| WO | 01/10773 A1 | 2/2001 |
| WO | 01/12312 A2 | 2/2001 |
| WO | 01/54807 A1 | 8/2001 |
| WO | 01/95237 A2 | 12/2001 |
| WO | 03/026788 | 4/2003 |
| WO | 03/078052 A1 | 9/2003 |
| WO | 03/106386 A2 | 12/2003 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | WO 2004/067708 | 8/2004 |

OTHER PUBLICATIONS

Office Action, U.S. Appl. No. 10/898,687, mailed Oct. 10, 2006.
Office Action, U.S. Appl. No. 10/898,687, mailed Feb. 6, 2007.
Office Action, U.S. Appl. No. 10/898,687, mailed Jun. 8, 2007.
Office Action, U.S. Appl. No. 10/898,687, mailed Sep. 17, 2007.
Ouyang et al. "Flexible Microreactor System for Chemical Research at Moderate and High Temperatures". Stevens Institute of Technology.
Benedict; Multistage Separation Process; *Transactions American Institute Chemical Engineers*; vol. 43, No. 2, pp. 41-60, Feb. 1947.
Matlosz et al.; "Microreactors as Tools in Chemical Research"; Microreaction Technology; IMRET 5: Proceedings of the Fifth International Conference on Microreaction Technology.
Srinivasn et al.; "Micromachined Reactors for Catalytic Partial Oxidation Reactions"; AIChE Journal; Nov. 1997; vol. 43, No. 11; pp. 3059-3069.
TeGrotenhuis et al.; Optimizing Microchannel Reactors by Trading-Off Equilibrium and Reaction Kinetics through Temperature Management; Prepared for presentation at IMRET 6—6$^{th}$ International Conference on Microreaction Technology; Mar. 2002.
Wegeng et al.; "Compact Fuel Processors for Fuel Cell Powered Automobiles Based on Microchannel Technology"; Fuel Cells Bulletin No. 28; pp. 8-13.
Rostami et al.; "Flow and Heat Transfer for Gas Flowing in Microchannels: a Review"; Heat and Mass Transfer 38 (2002) 359-367.
TeGrotenhuis et al.; "Normal Gravity Testing of a Microchannel Phase Separator for Insitu Resource Utilization"; NASA/CR-2001-210955.
"Modular Micro Chemical Engineering: Micro Distillation Column"; Micro ChemTec.
Aguirre et al.; Optimal Thermodynamic Approximation to Reversible Distillation by Means of Interheaters and Intercoolers; Ind. Eng. Chem. Res. 1997, 36, 4882-4893.
Invitation to Pay Additional Fees and Partial International Search Report, Application No. PCT/US2005/024444, mailed Jan. 19, 2006.
International Preliminary Report on Patentability, Application No. PCT/US2005/024444, Mailed Dec. 1, 2006.

* cited by examiner

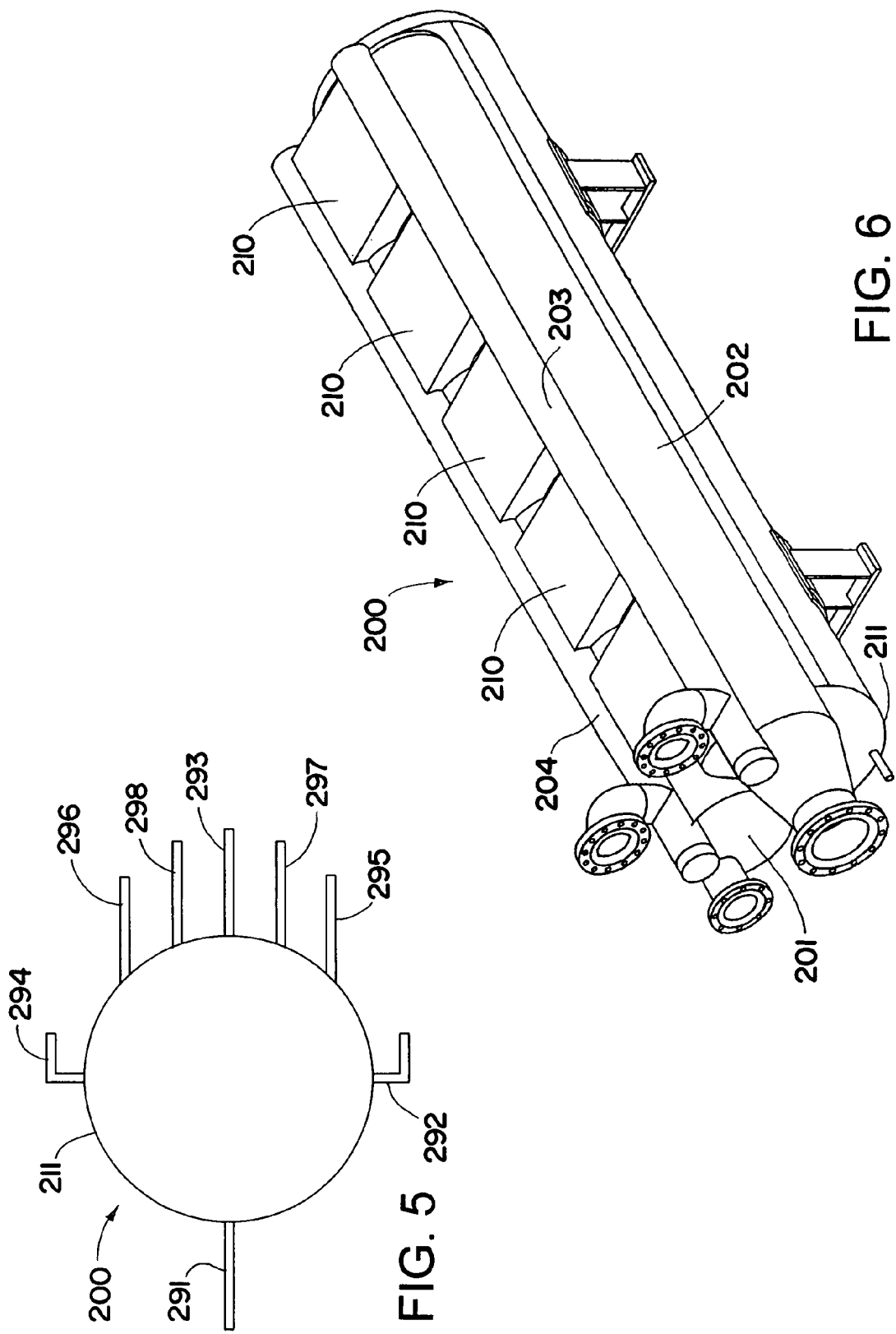

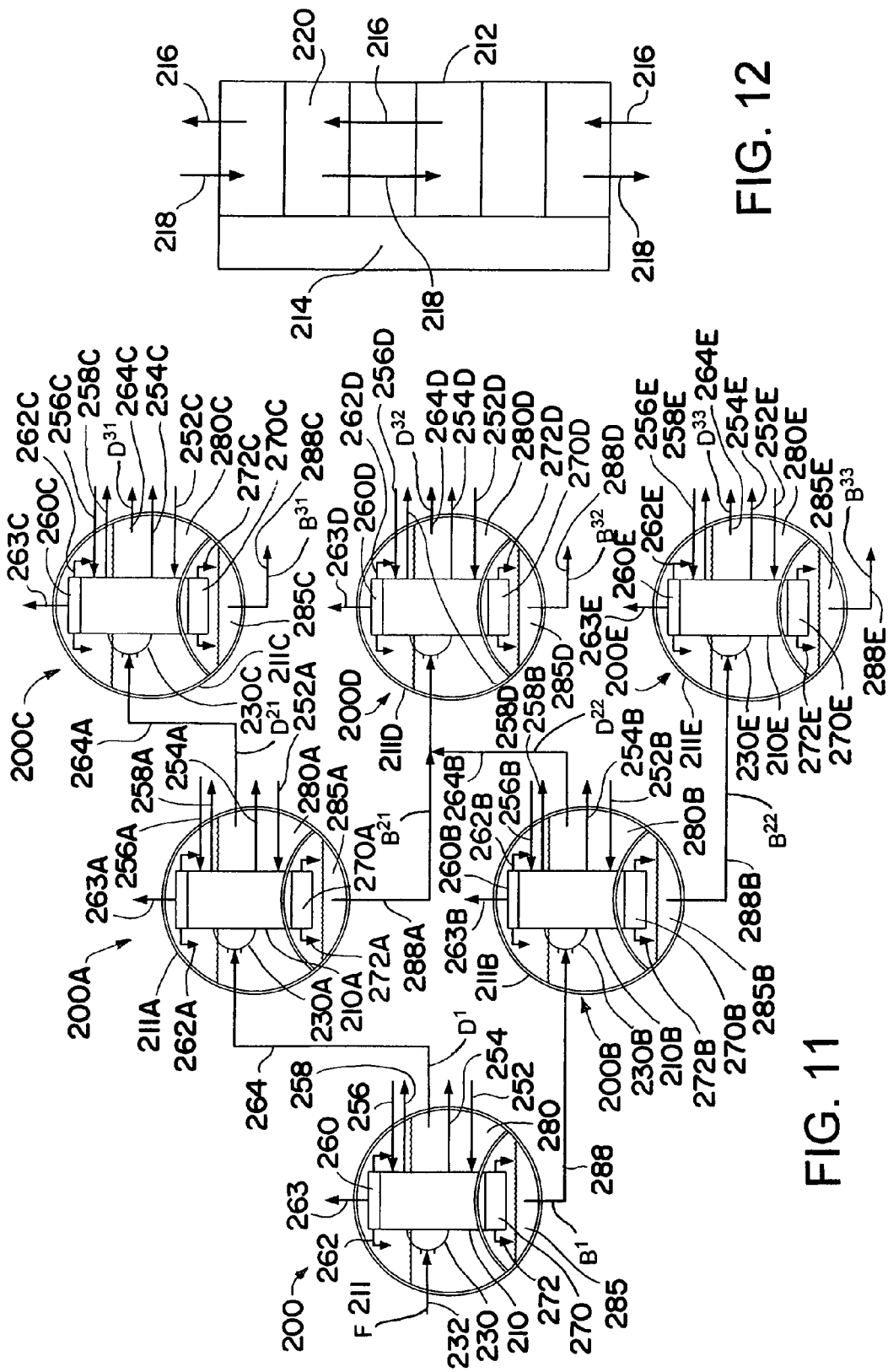

DISTILLATION PROCESS USING MICROCHANNEL TECHNOLOGY

This application is a continuation-in-part of U.S. application Ser. No. 10/898,687, now U.S. Pat. No. 7,305,850 filed Jul. 23, 2004. This application claims priority to U.S. Provisional Application Ser. No. 60/669,486, filed Apr. 8, 2005. These applications are incorporated herein by reference in their entireties.

This invention was made with Government support under Contract DE-FC36-04G014271 awarded by the United States Department of Energy. The Government has certain rights in this invention.

TECHNICAL FIELD

This invention relates to a distillation process for separating two or more components having different volatilities from a liquid mixture containing the components. The process employs microchannel technology for effecting the distillation and is particularly suitable for conducting difficult separations, such as the separation of ethane from ethylene, wherein the individual components are characterized by having volatilities that are very close to one another.

BACKGROUND

Distillation is a method of separation that is based on the difference in composition between a liquid mixture and the vapor formed from it. This composition difference arises from the dissimilar effective vapor pressures, or volatilities, of the components of the liquid mixture. Distillation as normally practiced involves condensation of the vaporized material, usually in multiple vaporization/condensation sections.

Distillation is a widely used industrial method for separating liquid mixtures and is at the heart of the separation processes in many chemical and petroleum plants. The most elementary form of the method is simple distillation in which the liquid is brought to boiling and the vapor formed is separated and condensed to form a product. If the process is continuous it is called flash distillation. If the feed mixture is available as an isolated batch of material the process is a form of batch distillation and the compositions of the collected vapor and residual liquid are thus time dependent. The term fractional distillation, which may be contracted to fractionation, was originally applied to the collection of separate fractions of condensed vapor, each fraction being segregated. In modern practice the term is applied to distillation processes in general, where an effort is made to separate an original mixture into two or more streams, at least one of which is enriched in at least one component. When the vapors are enriched by contact with counter-flowing liquid reflux, the process is often called rectification. When fractional distillation is accomplished with a continuous feed of material and continuous removal of product fractions, the process is called continuous distillation. When steam is added to the vapors to reduce the partial pressures of the components to be separated, the term steam distillation is used.

Most distillations conducted commercially operate continuously, with a more volatile fraction recovered as distillate and a less volatile fraction recovered as bottoms or residue. If a portion of the distillate is condensed and returned to the process to enrich the vapors, the liquid is called reflux. The apparatus in which the enrichment occurs is usually a vertical, cylindrical vessel called a still or distillation column. This apparatus normally contains internal devices for effecting vapor-liquid contact; the devices may be categorized as plates or packings.

A problem with many distillation processes is that they employ relatively large pieces of equipment that are highly inefficient with respect to energy consumption. Distillation accounts for about a quadrillion BTUs of energy consumption per year in the United States. Conventional distillation systems could reduce lost work and increase plant energy efficiency by incorporating capital-intensive reboilers at multiple sections. However, the capital cost of adding multiple reboilers to conventional distillation columns is typically prohibitive. The trade-off between energy and capital often results in favoring the lower cost solution. The efficiency of mass transfer sections in distillation columns is set by the effectiveness of trays or packing, which has not changed significantly in many years. For separation of components with similar boiling points, such as separating ethane from ethylene, commercial distillation columns are typically hundreds of feet high, due to the need to use many mass transfer sections.

Another problem relates to the fact that the equipment (e.g., distillation columns, reboilers, condensers, etc.) used in many of these distillation processes require relatively large internal volumes for processing the materials being treated. These large internal volumes render the equipment slow to respond to changes in operating conditions (e.g., temperature, etc.). This makes the distillation processes using this equipment slow to start up and subject to imprecise control.

SUMMARY

The present invention provides a solution to these problems by employing a distillation process using microchannel technology. With the present invention, in one embodiment, process intensification is achieved through the use of stacked layers of thin sheets of material with stamped, etched or piece-wise assembled channels, that is, microchannels, providing narrow flow paths with short diffusion distances for mass transfer. The use of these microchannels can provide for dramatic reductions in the required flow length of the section dominated by mass transfer, resulting in relatively short distillation units. Heat inputs and outputs can be closely integrated with microchannel vapor-liquid equilibrium stages resulting in processes that can approach reversible distillation.

In one embodiment, the invention relates to a process for distilling a fluid mixture in a microchannel distillation unit, the microchannel distillation unit comprising a plurality of microchannel distillation sections, the microchannel distillation unit having at least one feed inlet, the fluid mixture comprising a more volatile component and a less volatile component, the process comprising: flowing a vapor phase through the microchannel distillation unit in a first direction; flowing a liquid phase through the microchannel distillation unit in second direction that is counter-current to the first direction; and flowing the fluid mixture through the feed inlet into at least one microchannel distillation section, part of the more volatile component transferring from the fluid mixture to the vapor phase to form a more volatile component rich vapor phase, part of the less volatile component transferring from the fluid mixture to the liquid phase to form a less volatile component rich liquid phase.

In one embodiment, the invention relates to a process for distilling a fluid mixture in a microchannel distillation assembly, the microchannel distillation assembly comprising at least one, and in one embodiment, a plurality of microchannel distillation units, each microchannel distillation unit comprising a plurality of microchannel distillation sections, each of the microchannel distillation units having a feed inlet, a distillate end, and a bottoms end, the fluid mixture comprising a more volatile component and a less volatile component, the process comprising:

flowing a vapor phase through each of the microchannel distillation units towards the distillate end of each of the microchannel distillation units;

flowing a liquid phase through each of the microchannel distillation units towards the bottoms end of each of the microchannel distillation units;

flowing the fluid mixture through the feed inlet of each of the microchannel distillation units into at least one microchannel distillation section within each of the microchannel distillation units, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in each microchannel distillation unit towards the distillate end of each microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in each microchannel distillation unit towards the bottoms end of each microchannel distillation unit, the less volatile component rich vapor liquid phase contacting the vapor phase in each microchannel distillation section and becoming enriched with the less volatile component.

In one embodiment, the invention relates to a process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component.

BRIEF DESCRIPTION OF THE DRAWINGS

In the annexed drawings, like parts and features have like designations.

FIG. 5 is an end view of the microchannel distillation assembly illustrated in FIG. 4.

FIG. 6 is a schematic illustration of an alternate embodiment of the microchannel distillation assembly illustrated in FIG. 4.

FIG. 11 is a schematic illustration of an alternate embodiment of a distillation process using six microchannel distillation assemblies in accordance with the invention, two of the microchannel distillation assemblies being downstream from a first microchannel distillation assembly, and three of the microchannel distillation assemblies being downstream from the first mentioned two microchannel distillation assemblies.

FIG. 12 is a schematic illustration of a microchannel distillation unit that can be used in accordance with the inventive process, the microchannel distillation unit comprising a process microchannel and an adjacent heat exchange channel, the process microchannel containing a plurality of microchannel distillation sections or stages.

DETAILED DESCRIPTION

Figure 1:
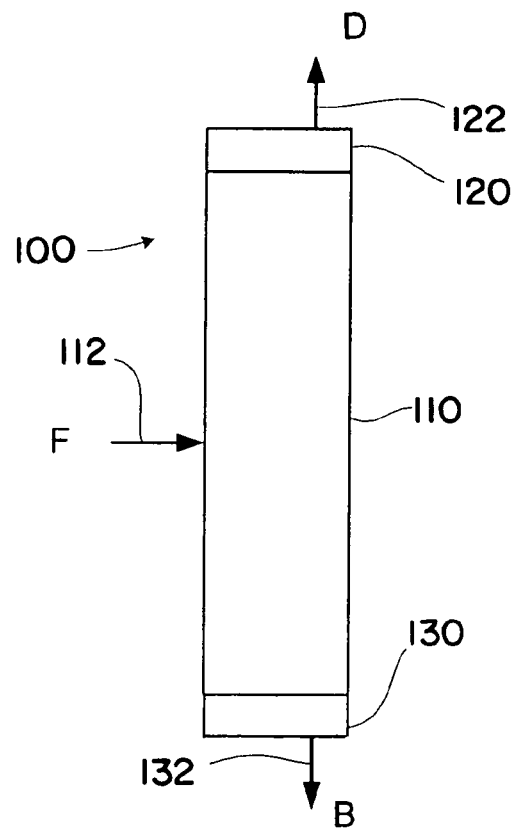
FIG. 1 is a schematic illustration of a distillation process using a microchannel distillation assembly in accordance with the invention.

The term "microchannel" refers to a channel having at least one internal dimension of height or width of up to about 10 millimeters (mm), and in one embodiment up to about 5 mm, and in one embodiment up to about 2 mm, and in one embodiment up to about 1 mm. In one embodiment, the height or width is in the range of about 0.01 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.75 mm, and in one embodiment about 0.05 to about 0.5 mm. Both height and width are perpendicular to the direction of flow through the microchannel.

The term "adjacent" when referring to the position of one channel relative to the position of another channel means directly adjacent. In one embodiment, a wall or walls may separate the two channels, in part or in whole. This wall may vary in thickness. In one embodiment, a process microchannel and a liquid channel may be in fluid contact with one another. For example, a process microchannel may have an opening exposed to the wicking region of a liquid channel. However, "adjacent" channels are not separated by an intervening channel that would interfere with heat transfer between the channels.

The terms "upstream" and "downstream" refer to positions within the process microchannels used in the inventive process that are relative to the direction of flow of the vapor phase through the process microchannels towards the distillate end of the microchannel distillation unit. For example, a position within the process microchannels not yet reached by a portion of the vapor phase flowing toward that position would be downstream of that portion of the vapor phase. A position within the process microchannels already passed by a portion of the vapor phase flowing away from that position would be upstream of that portion of the vapor phase. The terms "upstream" and "downstream" do not necessarily refer to a vertical position since the process microchannels used in the inventive process may be oriented horizontally, vertically or at an inclined angle.

The term "capture structure" refers to a structure positioned within a channel that captures liquid.

The term "capillary features" are features associated with a microchannel that are used to hold liquid substances. They are either recessed within a wall of a microchannel or protrude from a wall of the microchannel into the flow path that is adjacent to the microchannel wall. The features may create a spacing that is less than about 1 mm, and in one embodiment less than about 250 microns, and in one embodiment less than about 100 microns. The features may have at least one dimension that is smaller than any dimension of the microchannel in which they are situated.

The term "wick" or "liquid removal structure" refers to medium for drawing off liquid by capillary action.

The term "wicking region" refers to a space occupied by a wick and/or a wicking surface (e.g., a grooved surface).

The term "pore throat" refers to a wick which is as denser or denser than a wick and is located at a liquid outlet to prevent vapor or gas breakthrough into the liquid.

The term "fluid" refers to a gas, a liquid, or a gas or a liquid containing dispersed solids, or a mixture thereof. The fluid may be in the form of a vapor or a gas containing dispersed liquid droplets.

$$\text{Suratmann number} = \frac{\sigma D_h P_L}{\mu_L^2}$$

where, $\sigma$=Surface tension of liquid, N/m
$D_h$=Hydraulic diameter of channel, m
$\rho_L$=Density of liquid, kg/m$^3$
$\mu_L$=Viscosity of liquid, N-s/m$^2$ A "shim" is a thin sheet of metal having a thickness in the range from about 0.01 mm to about 2 mm that contains either partial or full features or both, for which multiple shims may be stacked and bonded to form a microchannel device.

A "surface feature" is a recessed or protruding feature in a microchannel that acts to perturb flow and enhance transverse and/or perpendicular flow and thus reduce mass transfer resistance in a liquid or vapor or both.

The inventive process will be described initially with reference to FIG. 1. Referring to FIG. 1, a microchannel distillation assembly 100 is provided for distilling a fluid mixture containing components X and Y. Component Y is more volatile than component X. The microchannel distillation assembly 100 includes microchannel distillation column or apparatus 110, a microchannel condenser 120, and microchannel reboiler 130. The microchannel distillation column or apparatus 110 contains one or more microchannel distillation units (see, for example, microchannel distillation unit 400 in FIG. 14) which are provided for separating component X from component Y. Each of the microchannel distillation units may comprise a plurality of microchannel distillation sections or stages (see, for example, microchannel distillation sections 450, 450a and 450b in FIG. 14). In operation, a feed F comprising a fluid mixture (i.e., gas, liquid, or mixture of gas and liquid) comprising components X and Y enters a microchannel distillation column or apparatus 110, as indicated by arrow 112. Within the microchannel distillation column or apparatus 110a vapor phase flows through a series of the microchannel distillation sections in a direction towards the microchannel condenser 120 and a liquid phase flows through a series of the microchannel distillation sections in a direction towards the microchannel reboiler 130. In each microchannel distillation section the vapor phase and the liquid phase contact each other with the result being a mass transfer between the phases. In each microchannel distillation section part of the more volatile component Y transfers from the liquid phase to the vapor phase, and part of the less volatile component X transfers from the vapor phase to the liquid phase. The vapor phase, which is progressively enriched with the more volatile component Y, flows through microchannel distillation column or apparatus 110 towards the microchannel condenser 120 and into the microchannel condenser 120. The liquid phase, which is progressively enriched with the less volatile component X, flows through the microchannel distillation column or apparatus 110 towards the microchannel reboiler 130 and into the microchannel reboiler 130. The vapor phase may be fully or partially condensed in the microchannel condenser 120 to form distillate product D. Part of the distillate product D, which may be referred to as an overhead product (sometimes called a head or a make), may be withdrawn from the system, as indicated by arrow 122. Part of the distillate product D may be returned to the microchannel distillation column or apparatus 110 where it flows through the microchannel distillation unit in the form of a liquid phase. The liquid phase, in the form of bottoms product B may flow into the microchannel reboiler 130. Part of the bottoms product B may be withdrawn from the system, as indicated by arrow 132. Part of the bottoms product may be fully or partially vaporized in the microchannel reboiler 130 and returned to the microchannel distillation column or apparatus 110 where it flows through the microchannel distillation column or apparatus 110 in the form of a vapor phase. The ratio between the amount of distillate product D that is removed from the system and the amount that is returned to the system may be referred to as the reflux ratio. The ratio between the amount of bottoms product B that is removed from the system and the amount that is returned to the system may be referred to as the boil-up ratio. These ratios can vary and can be determined by those skilled in the art.

In one embodiment, the microchannel distillation assembly 100 may be constructed without the microchannel condenser 120. In this embodiment, the microchannel distillation assembly 100 may comprise the microchannel distillation column or apparatus 110 and the microchannel reboiler 130. In this embodiment the microchannel distillation assembly 100 may be used as a stripping column.

In one embodiment, the microchannel distillation assembly 100 may be constructed without the microchannel reboiler 130. In this embodiment, the microchannel distillation assembly 100 may comprise the microchannel distillation column or apparatus 110 and the microchannel condenser 120. In this embodiment the microchannel distillation assembly 100 may be used in operations where a relatively hot fluid is added in a lower microchannel distillation section or stage. An example of such a use would be a steam stripper.

Figure 14:
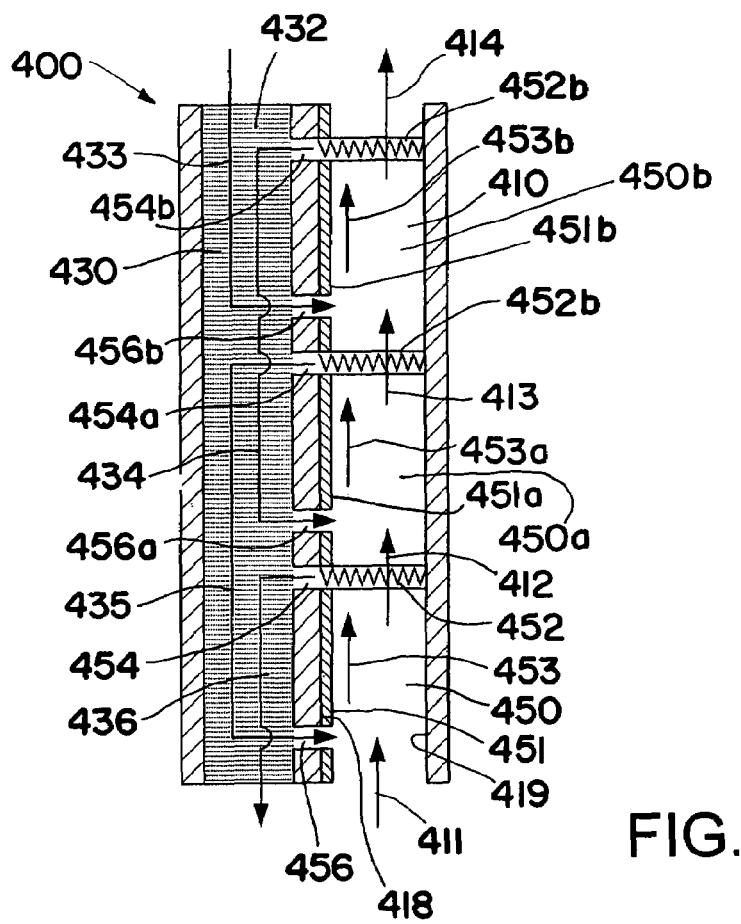
FIG. 14 is a schematic illustration of an alternate embodiment of a microchannel distillation unit that can be used in accordance with the inventive process.

When used the microchannel condenser 120 and/or reboiler 130 may be in the form of one of the microchannel distillation sections or stages (see, for example, microchannel distillation sections 450, 450a and 450b in FIG. 14) used in the microchannel distillation column or apparatus 110.

Figure 4:
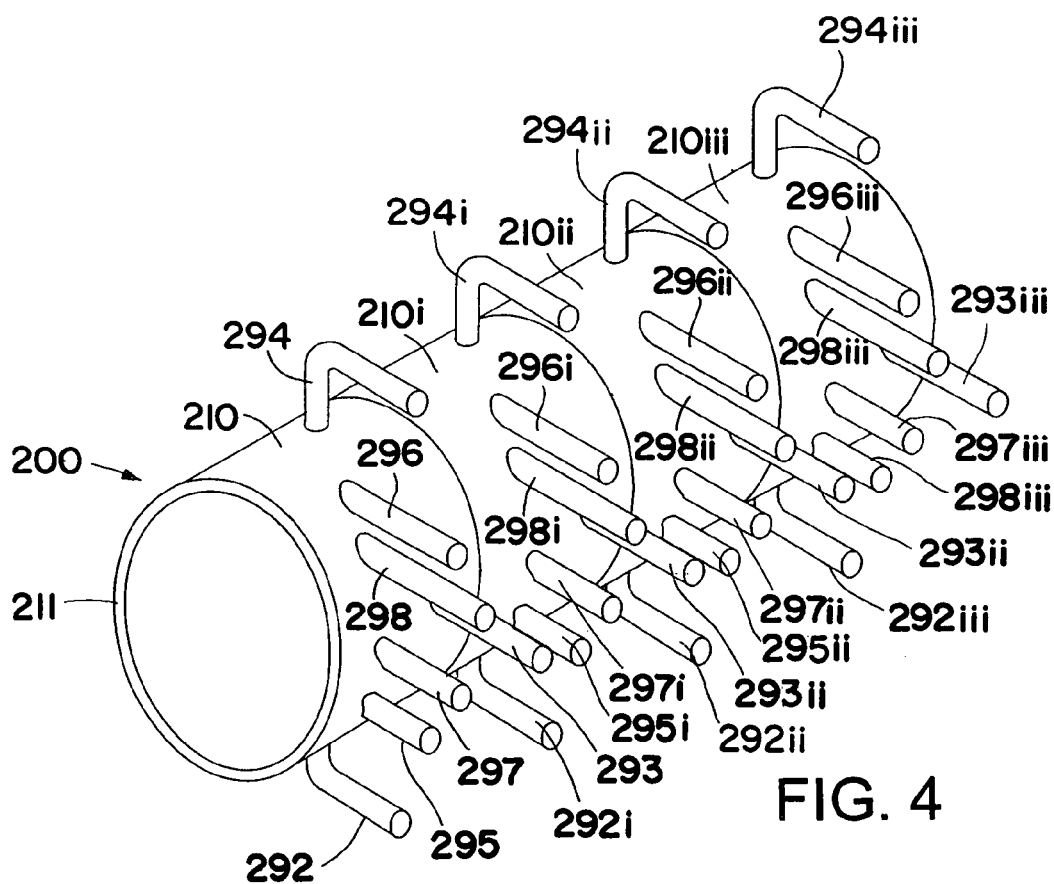
FIG. 4 is a three-dimensional exterior schematic illustration of the microchannel distillation assembly illustrated in FIG. 2.

The inventive process will now be described with reference to FIGS. 2, 4, 5 and 12. Referring to FIGS. 2, 4, 5 and 12, a process for distilling a fluid mixture in a microchannel distillation assembly 200 is provided. The microchannel distillation assembly 200 comprises at least one, and in one embodiment a plurality of microchannel distillation columns or apparatuses 210. In FIG. 4, four microchannel distillation units, namely, microchannel distillation columns or apparatuses 210, 210i, 210ii and 210iii, are shown, however, it is to be understood that any number of microchannel distillation columns or apparatuses 210 may be used in the microchannel distillation assembly 200, for example, one, two, three, four, six, eight, ten, tens, hundreds, thousands, etc., may be used. Each microchannel distillation column or apparatus 210 may be housed within cylindrical vessel 211. Cylindrical vessel 211 may be a pressurized vessel. Alternatively, the microchannel distillation column or apparatus 210 may not be surrounded by a contiguous vessel, and may maintain pipe connections for each inlet and outlet port. The microchannel distillation column or apparatus 210 and accompanying pipe connections for flow into or out of the microchannel distillation column or apparatus 210 may be considered to comprise the microchannel distillation assembly 200. Each microchannel distillation column or apparatus 210 may comprise a plurality of the microchannel distillation units 212 and heat exchange channels 214 illustrated in FIG. 12. Any number of microchannel distillation units 212 may be used in each microchannel distillation column or apparatus 210, for example, one, two, three, four, six, eight, ten, tens, hundreds, thousands, etc. Each microchannel distillation unit 212 may have an adjacent heat exchange channel 214, although some of the process microchannel distillation units 212 may have more than one adjacent heat exchange channel 214 while other microchannel distillation units 212 may not have any adjacent heat exchange channels 214. A single heat exchange channel 214 may provide heating and/or cooling for more than one microchannel distillation unit 212. For example, the heating and/or cooling of from 1 to about 20 microchannel distillation units 212, and in one embodiment 1 to about 10, and in one embodiment 1 to about 5, and in one embodiment 1 to about 3 microchannel distillation units 212 may be provided by a single heat exchange channel 214. Each microchannel distillation unit 212 may comprise a plurality of microchannel distillation sections (or stages) 220. Each of the microchannel distillation column or apparatus 210 may have at least one feed inlet 230, a distillate end 240 and a bottoms end 250. Each microchannel distillation column or apparatus 210 may be used in combination with a microchannel condenser 260 and a microchannel reboiler 270. In one embodiment, the microchannel distillation column or apparatus 210 may be used in combination with a microchannel condenser 260, but not a microchannel reboiler 270. In one embodiment the microchannel distillation column or apparatus 210 may be used in combination with a microchannel reboiler 270, but not a microchannel condenser 260. The microchannel distillation assembly 200 may include a distillate product receiving cavity 280 and a bottoms product receiving cavity 285. The microchannel distillation assembly 200 may include feed inlet 291, bottoms product outlet 292, distillate product outlet 293, distillate exhaust outlet 294, heat exchange fluid inlets 295 and 296, and heat exchange fluid outlets 297 and 298. When more than one microchannel distillation column or apparatus 210 is used in the microchannel distillation assembly 200, the cavities 280 and 285 may be individualized for each of the microchannel distillation columns or apparatuses 210, or cavities that are common to more than one, and in one embodiment all of the microchannel distillation column or apparatus 210 in the microchannel distillation assembly 200, may be used. Similarly, with reference to FIGS. 4 and 5, when more than one microchannel distillation column or apparatus 210 is used in the microchannel distillation assembly 200, the feed inlets 291 (and 291i, 291ii and 291iii not shown in FIG. 4), bottoms outlets 292 (and 292i, 292ii and 292iii), distillate product outlets 293 (and 293i, 293ii and 293iii), distillate exhaust outlets 294 (and 294i, 294ii and 294iii), and heat exchange fluid inlets 295 (and 295i, 295ii and 295iii), 296 (and 296i, 296ii and 296iii), and heat exchange fluid outlets 297 (and 297i, 297ii, 297iii), and 298 (and 298i, 298ii and 298iii) may be individualized for each of the microchannel distillation columns or apparatuses 210, as illustrated in FIG. 4, or inlets and/or outlets that are common to more than one, and in one embodiment all of the microchannel distillation columns or apparatuses 210 in the microchannel distillation assembly 200 may be used. This may involve the use of flow channels and manifolds for conducting the flow of the various fluids to and from the microchannel distillation columns or apparatuses 210. This is shown in FIG. 6 wherein the microchannel assembly 200 employs manifolds 201, 202, 203 and 204 for the flow of feed, product and heat exchange fluids into or out of the microchannel distillation columns or apparatuses 210. Reference is herein made to PCT International Application No. PCT/US05/03904, filed Feb. 7, 2005, wherein multiple microchannel units or modules positioned within cylindrical vessels which employ common inlets and outlets are disclosed; this application is incorporated herein by reference.

Figure 2:
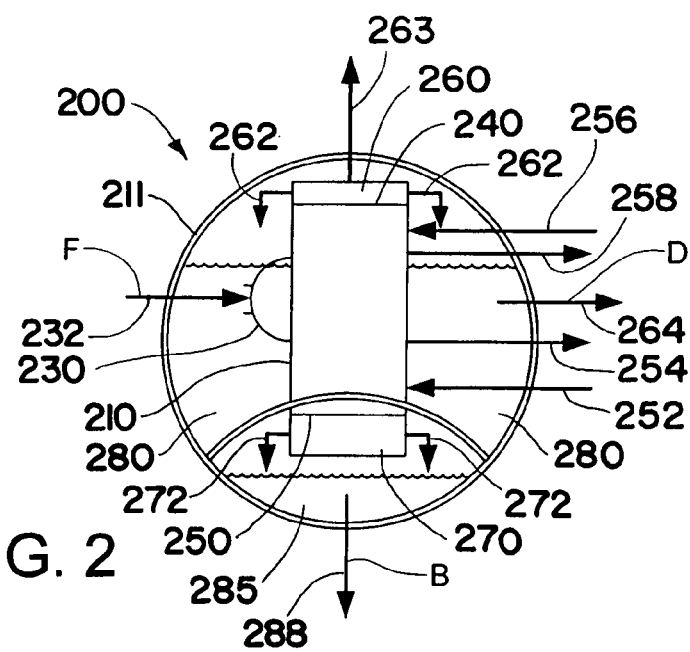
FIG. 2 is a schematic illustration of an alternate embodiment of a distillation process using a microchannel distillation assembly in accordance with the invention.
Figure 3:
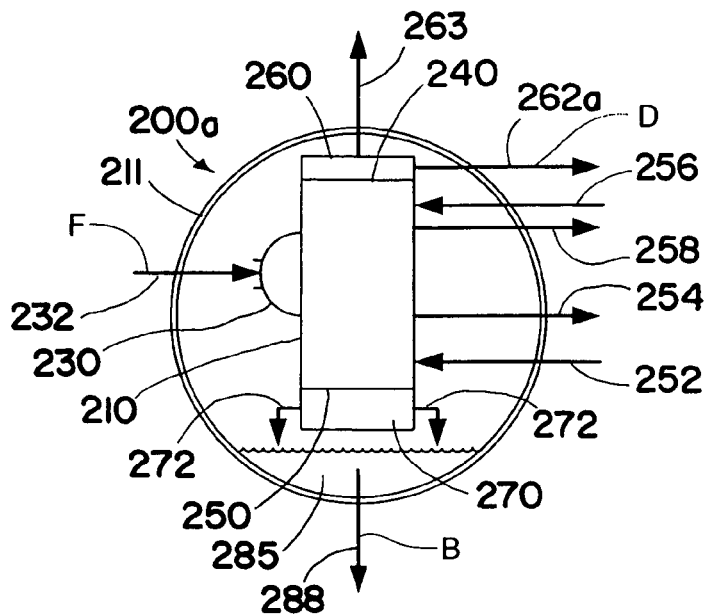
FIG. 3 is a schematic illustration of another alternate embodiment of a distillation process using a microchannel distillation assembly in accordance with the invention.

FIG. 3 discloses microchannel distillation assembly 200a which is an alternate embodiment of the microchannel distillation assembly 200 shown in FIG. 2. The microchannel distillation assembly 200a depicted in FIG. 3 is the same as the embodiment microchannel distillation assembly 200 depicted in FIG. 2 with the exception that the assembly 200a shown in FIG. 3 does not include a distillate product receiving cavity 285. Consequently, the distillate product flows out of the microchannel condenser 260, as indicated by arrow 262a.

The process using the microchannel distillation assemblies 200 and 200 a illustrated in FIGS. 2 and 3, respectively, may be conducted as follows. A feed stream F comprising a fluid mixture enters microchannel distillation assembly 200 or 200a through inlet 291 and microchannel distillation column or apparatus 210 through feed port 230, as indicated by arrow 232 (see, FIGS. 2, 3 and 5). The fluid mixture (i.e., gas, liquid or a mixture of gas and liquid) may comprise a mixture of a more volatile component Y and a less volatile component X. Within each microchannel distillation column or apparatus 210a vapor phase flows through a plurality of microchannel distillation sections 220 in microchannel distillation unit 212 in a direction indicated by arrows 216 towards the distillate end 240, and a liquid phase flows through a plurality of microchannel distillation sections 220 in a direction indicated by arrows 218 towards the bottoms end 250 (see, FIGS. 2, 3 and 12). In each microchannel distillation section 220 the vapor phase and the liquid phase contact each other with the result being a mass transfer between the phases. In each microchannel distillation section 220 part of the more volatile component Y transfers from the liquid phase to the vapor phase, and part of the less volatile component X transfers from the vapor phase to the liquid phase. The vapor phase, which is progressively enriched with the more volatile component Y, flows through microchannel distillation column or apparatus 210 towards the distillate end 240 and into the microchannel condenser 260. The liquid phase, which is progressively enriched with the less volatile component X, flows through the microchannel distillation column or apparatus 210 towards the bottoms end 250 and into the microchannel reboiler 270. The vapor phase is condensed in the microchannel condenser 260 to form distillate product D. Part of the distillate product D, which may be referred to as an overhead product, may be withdrawn from the microchannel condenser 260, as indicated by arrows 262. The distillate product D may accumulate in the distillate product receiving cavity 280 (FIG. 2), and be withdrawn from the microchannel distillation assembly 200, as indicated by arrow 264. Alternatively, as indicated in FIG. 3, the distillate product D may be withdrawn from the microchannel condenser 260 and microchannel distillation assembly 200 A, as indicated by arrow 262a. Part of the distillate product D may be returned to the microchannel distillation column or apparatus 210 where it flows through the microchannel distillation column or apparatus 210 in the form of a liquid phase. Vapor exhaust may be withdrawn from the microchannel condenser 260, as indicated by arrow 263, and combined with the feed F, subjected to further processing, or discarded. The liquid phase, in the form of bottoms product B, may flow into the bottoms product receiving cavity 285, as indicated by arrows 272, and be withdrawn from the microchannel distillation assembly 200, as indicated by arrow 288. Part of the bottoms product may be vaporized in the microchannel reboiler 270 and returned to the microchannel distillation column or apparatus 210 where it flows through the microchannel distillation column or apparatus 210 in the form of a vapor phase. The ratio between the amount of distillate product D that is removed from the system and the amount that is returned to the system may be referred to as the reflux ratio. The ratio between the amount of bottoms product B that is removed from the system and the amount that is returned to the system may be referred to as the boil-up ratio. These ratios can vary and can be determined by those skilled in the art. Heat exchange fluid enters the microchannel distillation column or apparatus 210, as indicated by arrows 252 and 256, flows in the heat exchange channel 214, and exits the microchannel distillation column or apparatus 210, as indicated by arrows 254 and 258.

Figure 7:
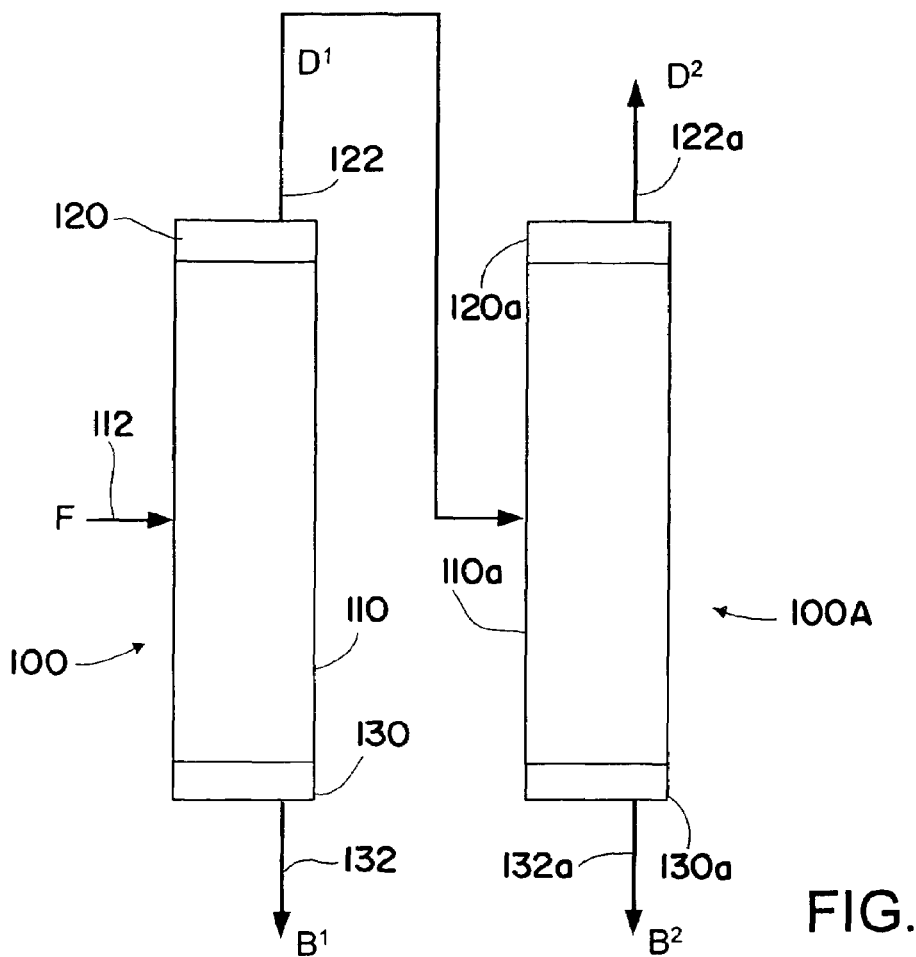
FIG. 7 is a schematic illustration of a distillation process using two microchannel distillation assemblies in accordance with the invention, one of the microchannel distillation assemblies being downstream from the other microchannel distillation assembly.

The distillation process illustrated in FIG. 7 uses two microchannel distillation assemblies, namely microchannel distillation assemblies 100 and 100A. The microchannel distillation process illustrated in FIG. 7 is similar to the microchannel distillation assembly 100 illustrated in FIG. 1 with the exception that the process illustrated in FIG. 7 is suitable for effecting separation between three components, namely, components X, Y and Z, from a feed F comprising components X, Y and Z. Components Y and Z are more volatile than component X, and component Z is more volatile than component Y. Microchannel distillation assemblies 100 and 100A illustrated in FIG. 7 have the same construction and function in the same manner as microchannel distillation assembly 100 in FIG. 1. The feed F containing components X, Y and Z flows into microchannel distillation column or apparatus 110, as indicated by line 112. A mixture enriched with component X is separated as first bottoms product $B^1$. Part of the first bottoms product $B^1$ can be recirculated back through microchannel distillation column or apparatus 110 in the same manner as discussed above for microchannel distillation column or apparatus 110 in FIG. 1. The remainder of the first bottoms product $B^1$ is withdrawn from the system, as indicated by arrow 132. A mixture enriched with components Y and Z is separated as a first distillate product $D^1$. Part of the first distillate product $D^1$ can be recirculated back through microchannel distillation column or apparatus 110 in the same manner as discussed above for microchannel distillation unit 110 in FIG. 1. The remainder of the first distillate product $D^1$ flows to microchannel distillation column or apparatus 110a, as indicated by line 122, wherein a second distillate product $D^2$ enriched with component Z is withdrawn from the microchannel distillation column or apparatus 110a, as indicated by line 122a. A second bottoms product $B^2$ containing an enriched concentration of component Y is withdrawn from microchannel distillation column or apparatus 110a, as indicated by line 132a. The second distillate product $D^2$ and second bottoms product $B^2$ can be partially recirculated back through the microchannel distillation column or apparatus 110a in the same manner as discussed above for microchannel distillation column or apparatus 110 in FIG. 1. An advantage of this process is that the microchannel distillation columns or apparatuses 110 and 110a can be combined in a single construction wherein heat exchange economies can be achieved. For example, a relatively cold part of one microchannel distillation unit may cool a relatively hot part of another microchannel distillation unit.

Figure 8:
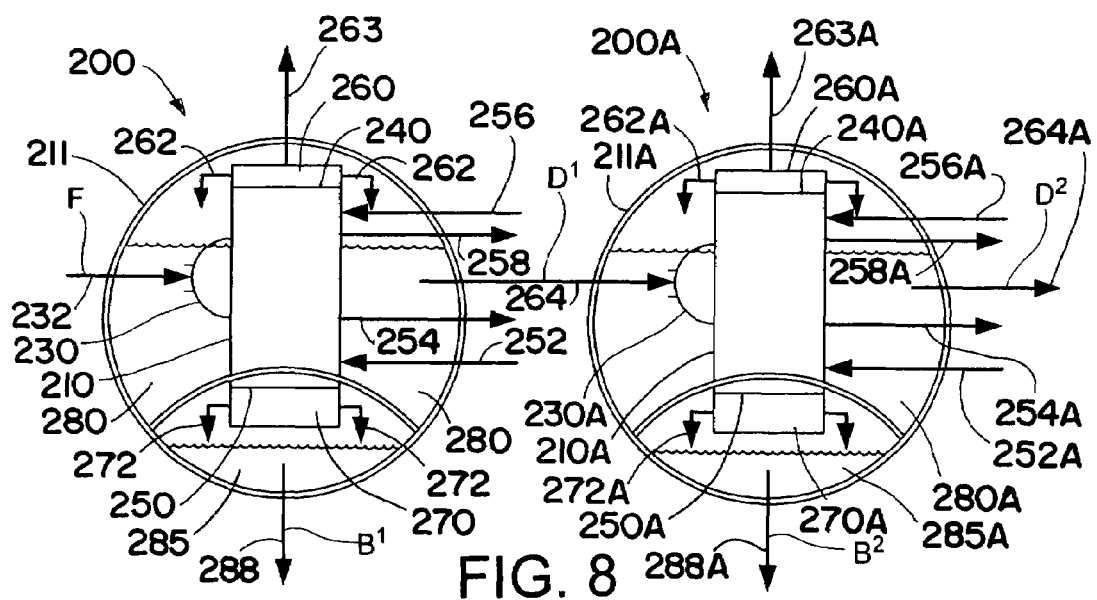
FIG. 8 is a schematic illustration of an alternate embodiment of a distillation process using two microchannel distillation assemblies in accordance with the invention, one of the microchannel distillation assemblies being downstream from the other microchannel distillation assembly.

The distillation process, using microchannel distillation assemblies 200 and 200A, illustrated in FIG. 8, is similar to the distillation process illustrated in FIG. 2 with the exception that the distillation process illustrated in FIG. 8 is suitable for effecting separation between three components, namely, components X, Y and Z, from a feed composition F comprising components X, Y and Z. Components Y and Z may be more volatile than component X, and component Z may be more volatile than component Y. Microchannel distillation assemblies 200 and 200A illustrated in FIG. 8 function in the same manner as the microchannel distillation assembly 200 illustrated in FIG. 2. The features of microchannel distillation assembly 200A that are the same as those for the microchannel distillation assembly 200 are identified with the same numeral except that the numeral is followed by the letter A. The feed F containing components X, Y and Z flows into microchannel distillation assembly 200 through inlet 291 and then into microchannel distillation column or apparatus 210 through feed port 230, as indicated by arrow 232. A fluid mixture enriched with component X is separated as the first bottoms product $B^1$. Part of the first bottoms product $B^1$ can be recirculated back through microchannel distillation column or apparatus 210 in the same manner as discussed above for microchannel distillation column or apparatus 210 illustrated in FIG. 2. The remainder of the first bottoms product $B^1$ may be withdrawn from the system, as indicated by arrow 288. A fluid mixture enriched with components Y and Z may be separated as the first distillate product $D^1$. Part of the first distillate product $D^1$ can be recirculated back through microchannel distillation column or apparatus 210 in the same manner as discussed above for microchannel distillation column or apparatus 210 illustrated in FIG. 2. The remainder of the first distillate product $D^1$ flows to microchannel distillation assembly 200A, as indicated by line 264, wherein a second distillate product $D^2$ is enriched with component Z. $D^2$ may be withdrawn from the microchannel distillation column or apparatus 210A, as indicated by arrow 264 A. A second bottoms product $B^2$ containing an enriched concentration of component Y may be withdrawn from microchannel distillation column or apparatus 210A, as indicated by arrow 288 A. The second distillate product $D^2$ and second bottoms product $B^2$ can be partially recirculated back through the microchannel distillation column or apparatus 210A in the same manner as discussed above for microchannel distillation column or apparatus 210 illustrated in FIG. 2.

Figure 9:
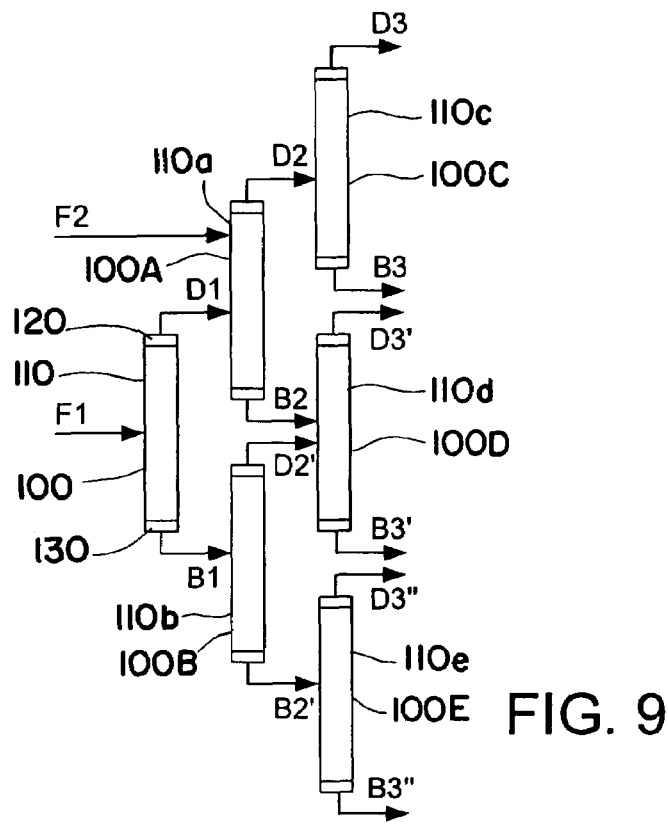
FIG. 9 is a schematic illustration of a distillation process using six microchannel distillation assemblies in accordance with the invention, two of the microchannel distillation assemblies being downstream from a first microchannel distillation assembly, and three of the microchannel distillation assemblies being downstream from the first mentioned two microchannel distillation assemblies.

The distillation process using microchannel distillation assemblies 100, 100A, 100B, 100C, 100D and 100E illustrated in FIG. 9 is similar to the distillation process illustrated in FIG. 1 with the exception that the distillation process illustrated in FIG. 9 is suitable for treating a fluid mixture containing more than three components, for example, six components. The microchannel distillation assemblies 100-100E employ microchannel distillation columns or apparatuses 110a, 110b, 110c, 110d and 110e, respectively. Microchannel distillation assemblies 100-100E have the same construction and may be operated in the same manner as the microchannel distillation assembly 100 illustrated in FIG. 1, although in each of the assemblies 100-100E different feed streams may be treated and the operating temperatures may be different. Additional feed streams, such as feed stream F2, can be used with one or more of the microchannel distillation assemblies 100-100E. Some of the streams, for example, bottoms product B2 and distillate product D2', may be combined. The final products produced in the process illustrated in FIG. 9 are distillate products D3, D3' and D3", and bottoms products B3, B3' and B3". Intermediate distillate products D1, D2 and D2', and intermediate bottoms products B1, B2 and B2' are also produced. The microchannel distillation assemblies 100-100E can be housed separately or combined in a single construction or apparatus (e.g., within a single block or vessel). Although six microchannel distillation assemblies 100-100E are depicted in FIG. 9, any number of microchannel distillation assemblies can be used, for example, tens, hundreds, etc. An advantage of combining the microchannel distillation assemblies in a single construction is that heat exchange economies can be achieved wherein, for example, a relatively cold part of one microchannel distillation assembly may cool a relatively hot part of another microchannel distillation assembly.

The distillation process, using microchannel distillation assemblies 200, 200A, 200B, 200C, 200D and 200E illustrated in FIG. 11, is similar to the distillation process illustrated in FIG. 2 with the exception that the distillation process illustrated in FIG. 11 is suitable for treating a fluid mixture containing more than three components, for example, six components. The features of the microchannel distillation assemblies 200A-200E that are the same as those for the microchannel distillation assembly 200 are identified with the same reference numeral except the numeral is followed by the letter A, B, C, D or E. The microchannel distillation assemblies 200A-200E may be operated in the same manner as the microchannel distillation assembly 200 as described above, although in each of the assemblies 200A-200E different feed streams may be treated and the operating temperatures may be different. Some of the streams, for example, bottoms product $B^{21}$ and distillate product $D^{22}$, may be combined. The final products produced in the process illustrated in FIG. 11 are distillate products $D^{31}$, $D^{32}$ and $D^{33}$, and bottoms products $B^{31}$, $B^{32}$ and $B^{33}$. Intermediate distillate products $D^1$, $D^{21}$ and $D^{22}$, and intermediate bottoms products $B^1$, $B^{21}$ and $B^{22}$ are also produced.

In an alternate embodiment to the embodiments depicted in FIGS. 8 and 11, the microchannel distillation columns or apparatuses 210 and 210A (FIG. 8) or the microchannel distillation columns or apparatuses 210, 210A, 210B, 210C, 210D and 210E (FIG. 11) can be combined in a single operation wherein they are connected in series or parallel to provide for multiple separations. These can be housed separately as shown in FIGS. 8 and 11 or they can be combined in a single construction (e.g., within a single block or vessel). Although two microchannel distillation columns or apparatuses (210 and 210A) are depicted in FIG. 8 and six microchannel distillation columns or apparatuses (210, 210A, 210B, 210C, 210D and 210E) are depicted in FIG. 11, this can be done with any number of microchannel distillation units, for example, tens, hundreds, etc. An advantage of combining the microchannel distillation columns or apparatuses in a single construction is that heat exchange economies can be achieved wherein, for example, a relatively cold part of one microchannel distillation unit may cool a relatively hot part of another microchannel distillation unit.

Figure 10:
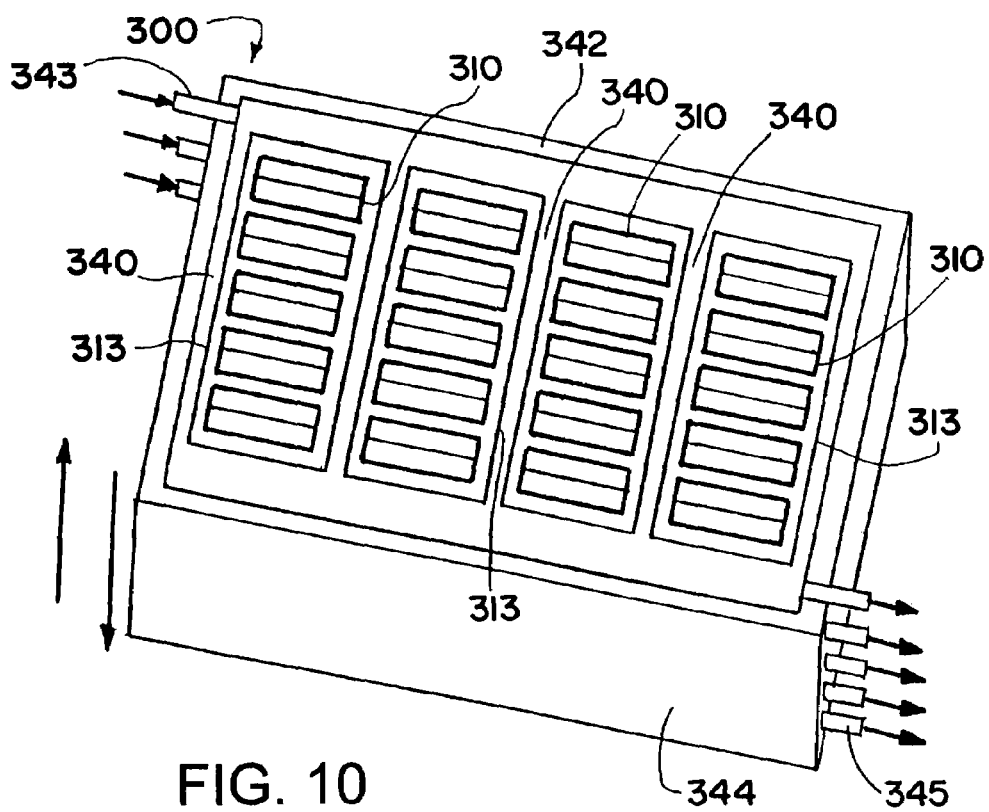
FIG. 10 is a schematic illustration of an alternate embodiment of a microchannel distillation assembly that can be used in accordance with the invention.

The microchannel distillation assembly 300 illustrated in FIG. 10 contains a plurality of adjacent microchannel distillation columns or apparatuses 310 arranged in parallel spaced rows 313. The rows 313 of microchannel distillation columns or apparatuses 310 are separated by cross-flow heat exchange channels 340 positioned between the rows 313. Heat exchange manifolds 342 and 344 distribute heat exchange fluid to the heat exchange channels 340. The heat exchange manifold 342 includes heat exchange fluid inlets 343. Heat exchange manifold 344 includes heat exchange fluid outlets 345. This embodiment provides the advantage of avoiding the use of interleaved heat exchange channels while still providing the required temperature profile. In this embodiment each heat exchange channel is in thermal communication with a plurality of microchannel distillation columns or apparatuses 310. The microchannel distillation assembly 300 employs a separate heat exchange manifold for each layer of heat exchange channels. Alternatively, a common manifold for a plurality of or all of the heat exchange channels can be used.

The microchannel distillation columns or apparatuses 110, 210 or 310 may be connected together with a macromanifold pipe connection that allows a single feed inlet to supply feed to each of the individual microchannel distillation columns or apparatuses. Macromanifold connections of a large pipe, not necessarily circular, may also gather products or effluent from the plurality of microchannel distillation columns or apparatuses. The microchannel distillation columns or apparatuses may be operated in parallel or alternatively in series. The series microchannel distillation columns or apparatuses may be advantageous in order to break up the total number of microchannel distillation sections or stages that are required by dividing each microchannel distillation columns or apparatuses into two or more microchannel distillation columns or apparatuses.

In addition to the distillation processes illustrated in FIGS. 1-12, there are other distillation processes that may be used for separating fluids for which the inventive microchannel distillation process may be employed. For example, distillation processes with any number of microchannel distillation columns or apparatuses, for example, ten, twenty, thirty, etc., can be employed similarly to those illustrated. Distillation processes that can be conducted in accordance with the invention include: processes employing partitioned columns; topping and tailing processes or tailing and topping processes, which may employ two distillation columns; easiest separation first processes, which may employ three distillation columns; and full thermal coupling processes which employ two distillation columns. These distillation processes are described in Becker et al., "The World's Largest Partitioned Column with Trays—Experiences from Conceptual Development to Successful Start-Up," Reports on Science and Technology 62/2000, pages 42-48. The microchannel distillation units used with the inventive process can be employed in these distillation processes. An advantage of using the inventive process is that microchannel distillation columns or apparatuses disclosed herein can be built on smaller scales that consume significantly less energy and still produce the same level of product output and purity as conventional distillation systems. Another advantage of using the microchannel distillation columns or apparatuses disclosed herein relates to the ability to closely space partitions within these microchannel distillation columns or apparatuses or to closely space thermally coupled streams by integration of such thermally coupled streams with adjacent columns or apparatuses or within adjacent or nearly adjacent layers in the same column or apparatus. The close spacing of the thermally coupled streams may reduce one or more of thermal response times, control feedback times, and start-up times needed for achieving steady-state operations for continuous distillation processes.

Figure 13:
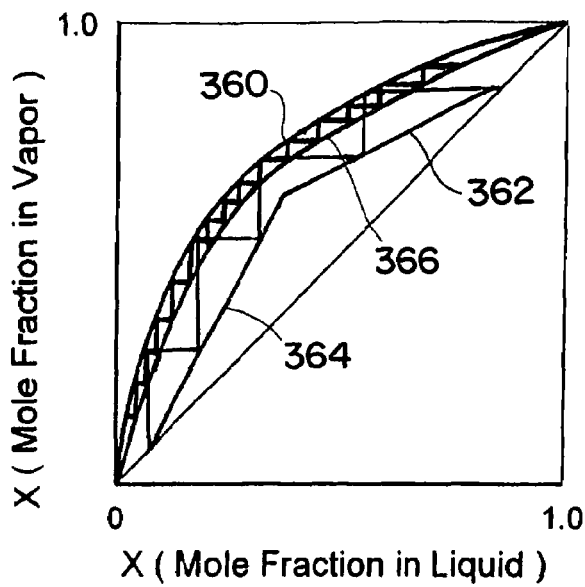
FIG. 13 is a diagram illustrating the McCabe-Thiele graphical method for calculating the number of distillation sections or stages for a distillation unit.

The number of theoretical sections or stages for effecting a desired separation for two components in a distillation process may be calculated using the McCabe-Thiele graphical method which is illustrated in FIG. 13. Referring to FIG. 13, an equilibrium line 360 for the vapor phase and the liquid phase of component X is plotted. The operating lines 362 and 364 for a conventional distillation process are depicted in FIG. 13 for purposes of comparison. Line 362 would be the rectifying operating line while line 364 would be the stripping operating line. The number of theoretical sections or stages required for the distillation can be calculated using the horizontal and vertical lines extending from the rectifying line 362 and stripping line 364 to the equilibrium line 360. Operating line 366 which is also shown in FIG. 13 would correspond to an operating line which closely approaches a reversible distillation process. A process following operating line 366 would not be economical using conventional technology due to the prohibitive cost of adding separation sections or stages and heat exchangers. While no chemical process is reversible in a thermodynamic sense, and entropy always increases, an advantage of the inventive process is that reversible distillation can be closely approached. With the inventive process, the difference in temperature between the vapor and liquid phases in each microchannel distillation section can be minimized. A longitudinal temperature profile in the microchannel distillation unit can be imposed by external heating or cooling via a thermally conducting column housing heat exchange channels adjacent to some or all of the microchannel distillation sections. This makes it possible to achieve a temperature profile that is very close to the equilibrium line 360 shown in FIG. 13. The heat exchange channels used in the microchannel distillation columns or apparatuses may impose tailored temperature profiles for individual microchannel distillation sections or groups of microchannel distillation sections. Computational design methods for multicomponent fractionations are known in the art and may be applied to this invention where heat exchange channels are used to create a close approach to equilibrium.

The height of an equivalent theoretical plate (HETP) ratio may be used for calculating the mass transfer efficiency of hardware for effecting vapor-liquid contacting processes. In conventional distillation processes, the HETP is typically on the order of about 2 feet (about 61 cm) for trays and packing. On the other hand, with the inventive process the HETP may be less than about 1 foot (about 30.5 cm), and in one embodiment less than about 6 inches (15.24 cm), and in one embodiment less than about 2 inches (5.08 cm), and in one embodiment less than about 1 inch (about 2.54 cm), and in one embodiment in the range from about 0.01 to about 1 cm. This provides the inventive process with the advantage of employing more theoretical distillation sections or stages in a more compact system than conventional processes and yet achieve similar separation and product throughput results. For example, for the separation of ethane from ethylene in the production of >99% by volume pure ethylene, the microchannel distillation unit used with the inventive process may be less than about 20 meters (about 65 feet), and in one embodiment less than about 3 meters (about 9.8 feet), while with conventional processes the same separation may require a distillation column that may be hundreds of feet high.

In one embodiment, the microchannel column or apparatus (e.g., microchannel distillation column or apparatus 110 or 210) may contain one or more microchannel distillation units having the construction of microchannel distillation unit 400 illustrated in FIG. 14. Referring to FIG. 14, microchannel distillation unit 400 comprises process microchannel 410 and liquid channel 430. Liquid channel 430 is adjacent to process microchannel 410. Microchannel distillation unit 400 contains three microchannel distillation sections or stages, namely, microchannel distillation sections 450, 450a and 450b. It will be understood, however, that microchannel distillation unit 410 may contain any desired number of microchannel distillation sections, for example, four, five, six, eight, ten, tens, hundreds, thousands, etc. Each of the microchannel distillation sections comprises an interior wall (451, 451a, 451b), a capture structure (452, 452a, 452b), a liquid outlet (454, 454a, 454b), and a liquid inlet (456, 456a, 456b). The interior wall may function as a wetted wall. The capture structures and the liquid exits are adjacent to each other and are suitable for permitting the flow of liquid from the microchannel 410 to the liquid channel 430. The liquid inlets are positioned upstream from the liquid outlets and are suitable for permitting liquid to flow from the liquid channel 430 into the microchannel 410. The liquid channel 430 comprises a wicking region 432. The wicking region 432 comprises a wick and/or a wicking surface. The wicking region 432 includes flow passages (e.g., grooves) which allow liquid to flow through the wicking region from the liquid outlet (for example, liquid outlet 454b) of each microchannel distillation section to the liquid inlet (for example, liquid inlet 456a) of the next adjacent upstream microchannel distillation section.

In operation, a liquid phase containing components X and Y flows through flow passages in the wicking region 432 in the liquid channel 430. The flow of the liquid phase may be driven by gravitational force and/or a pressure differential. The pressure differential may be effected by a pump, a suction device, or other apparatus or techniques known in the art. In one embodiment, a combination of gravitational force and pumping may be used. The liquid phase flows from the wicking region 432 through liquid inlet 456b, as indicated by arrow 433. The liquid phase enters microchannel distillation section 450b and flows along interior wall 451b as a thin film, as indicated by arrow 453b, until it contacts capture structure 452b. A vapor phase containing components X and Y flows through capture structure 452a into microchannel distillation section 450b, as indicated by arrow 413, and flows through microchannel distillation section 450b until it contacts capture structure 452b. The flow of the liquid phase along the interior wall 451b may be driven by capillary force and/or drag from the flow of the vapor phase through the microchannel distillation section 450b. The flow of liquid may also be driven by an external pump that either pushes or pulls the liquid through the microchannel distillation unit. This mode of force, liquid pumping, may be broadly applied to other structures described herein. In the microchannel distillation section 450b the liquid phase and the vapor phase contact each other. Part of the more volatile component Y transfers from the liquid phase to the vapor phase to form a component Y rich vapor phase. Part of the less volatile component X transfers from the vapor phase to the liquid phase to form a component X rich liquid phase. The vapor phase flows through capture structure 452b, as indicated by arrow 414. The liquid phase flows from capture structure 452b through liquid outlet 454b. The flow of the liquid phase through the liquid outlet 454b may be as a result of capillary force. The liquid phase flows through flow passages in the wicking region 432, as indicated by arrow 434, and then through liquid inlet 456a. The flow of the liquid phase through the liquid inlet 456a may be driven by gravitational force, a pressure differential as a result of the flow of the vapor phase near the liquid inlet 456a, and/or a wetting effect resulting from the flow of the liquid phase along the interior wall 451a. The liquid phase flowing through liquid inlet 456a enters microchannel distillation section 450a and flows along interior wall 451a as a thin film, as indicated by arrow 453a, until it contacts capture structure 452a. The vapor phase flows through capture structure 452 into microchannel distillation section 450a, as indicated by arrow 412, and flows through microchannel distillation section 450a until it contacts capture structure 452a. The vapor phase flow may be driven by a pressure differential. Within microchannel section 450a, the liquid phase and the vapor phase contact each other. Part of the more volatile component Y transfers from the liquid phase to the vapor phase to form a component Y rich vapor phase. Part of the less volatile component X transfers from the vapor phase to the liquid phase to form a component X rich liquid phase. The vapor phase flows through capture structure 452a into microchannel distillation section 450b, as indicated by arrow 413. The liquid phase flows from capture structure 452a through liquid outlet 454a through flow passages in the wicking region 432 in liquid channel 430, as indicated by arrow 435, into liquid inlet 456. The liquid phase flows through liquid inlet 456 into microchannel distillation section 450 and along interior wall 451 as a thin film, as indicated by arrow 453, until it contacts capture structure 452. The vapor phase flows into microchannel distillation section 450, as indicated by arrow 411, and flows through microchannel distillation section 450 until it contacts capture structure 452. Within the microchannel distillation section 450 the liquid phase and the vapor phase contact each other. Part of the more volatile component Y transfers from the liquid phase to the vapor phase to form a component Y rich vapor phase. Part of the less volatile component X transfers from the vapor phase to the liquid phase to form a component X rich liquid phase. The component X rich liquid phase flows from capture structure 452 through liquid outlet 454 into liquid channel 430, as indicated by arrow 436. The liquid phase flowing along line 436 has a higher concentration of component X and a lower concentration of component Y than the liquid phase flowing downwardly through liquid channel 430 into liquid inlet 456b, as indicated by arrow 433. The vapor phase flowing through capture structure 452b, as indicated by arrow 414, has a higher concentration of component Y and a lower concentration of component X than the vapor phase entering microchannel distillation section 450, as indicated by arrow 411. Within the liquid channel 430 the more volatile component Y may vaporize and form vapor bubbles that rise upwardly through the wicking region in the liquid channel 430. This vapor may be drawn into one or more of the microchannel distillation sections (450, 450a, 450b) through the liquid inlets (456, 456a, 456b) and combined with the vapor phase flowing through the microchannel distillation sections (450, 450a, 450b).

Figure 15:
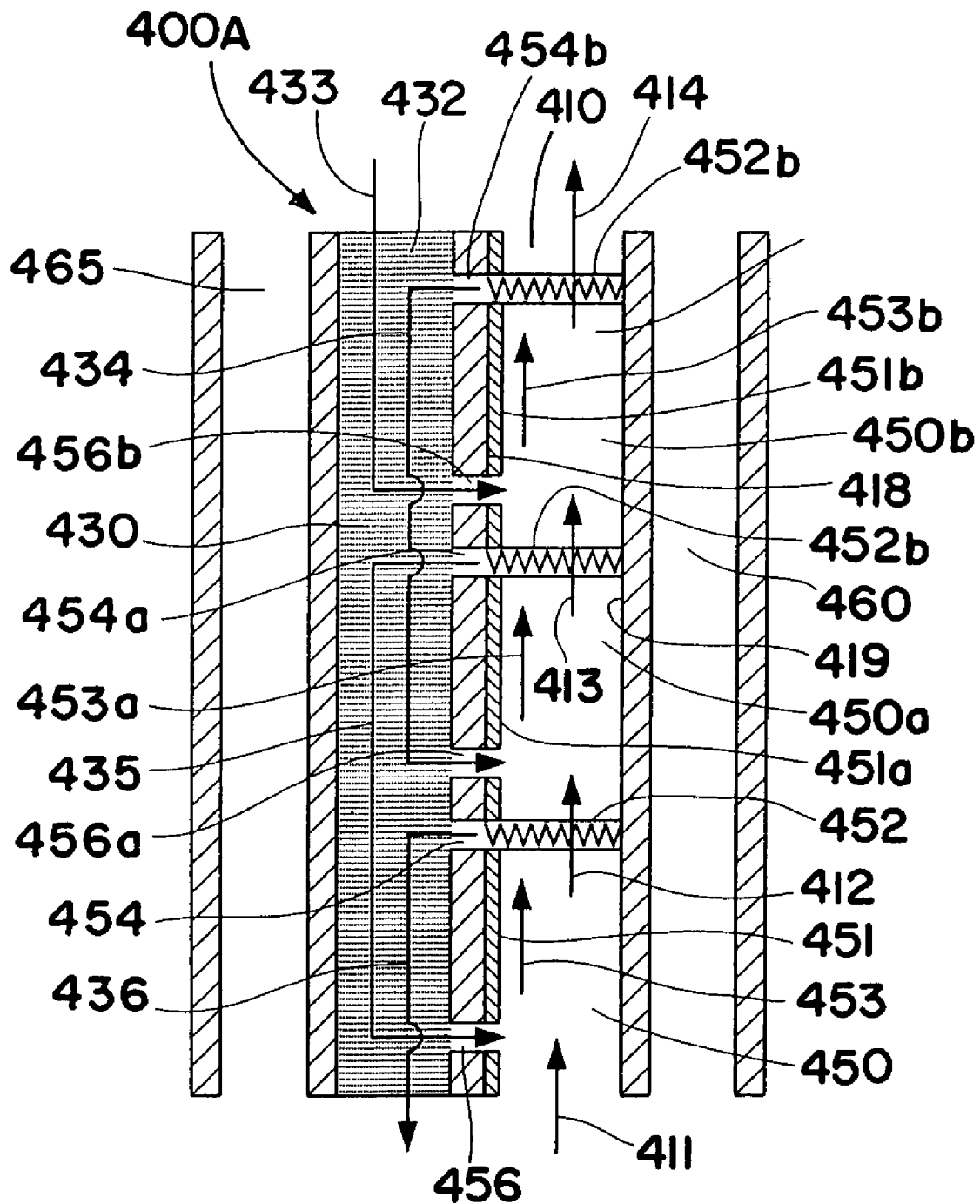
FIG. 15 is a schematic illustration of an alternate embodiment of a microchannel distillation unit that can be used in accordance with the inventive process.

The microchannel distillation unit 400A depicted in FIG. 15 is identical to the microchannel distillation unit 400 depicted in FIG. 14 with the exception that heat exchange channel 460 is adjacent to process microchannel 410 and heat exchange channel 465 is adjacent to liquid channel 430. Heat exchange fluid flows through heat exchange channels 460 and 465 in a direction that may be co-current or counter-current to the flow of the vapor phase through the process microchannel 410. In one embodiment, the flow of heat exchange fluid through heat exchange channel 460 may be in one direction and the flow of heat exchange fluid through heat exchange channel 465 may be in the opposite direction. The heat exchange fluid heats or cools the process fluids in the process microchannel 410 and the liquid channel 430.

Figure 16:
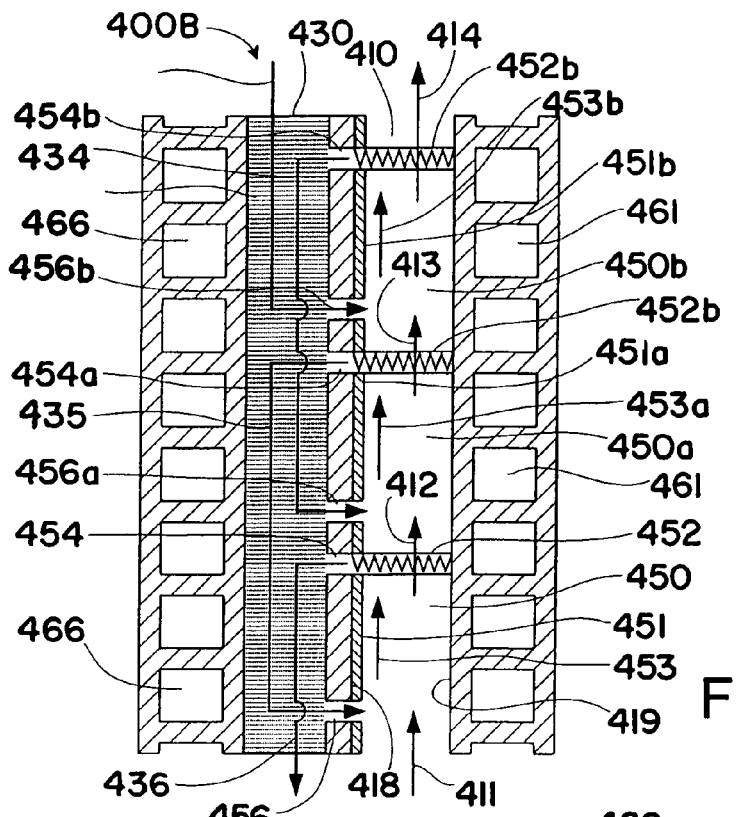
FIG. 16 is a schematic illustration of an alternate embodiment of a microchannel distillation unit that can be used in accordance with the inventive process.

The microchannel distillation unit 400B illustrated in FIG. 16 is identical in design and operation to the microchannel distillation unit 400A illustrated in FIG. 15 with the exception that the heat exchange fluid flows in a cross-current direction relative to the flow of the vapor phase through the process microchannel 410. The heat exchange fluid flows through heat exchange channels 461 and 466 and provides heating or cooling to the process fluids in the process microchannel 410 and liquid channel 430.

Figure 17:
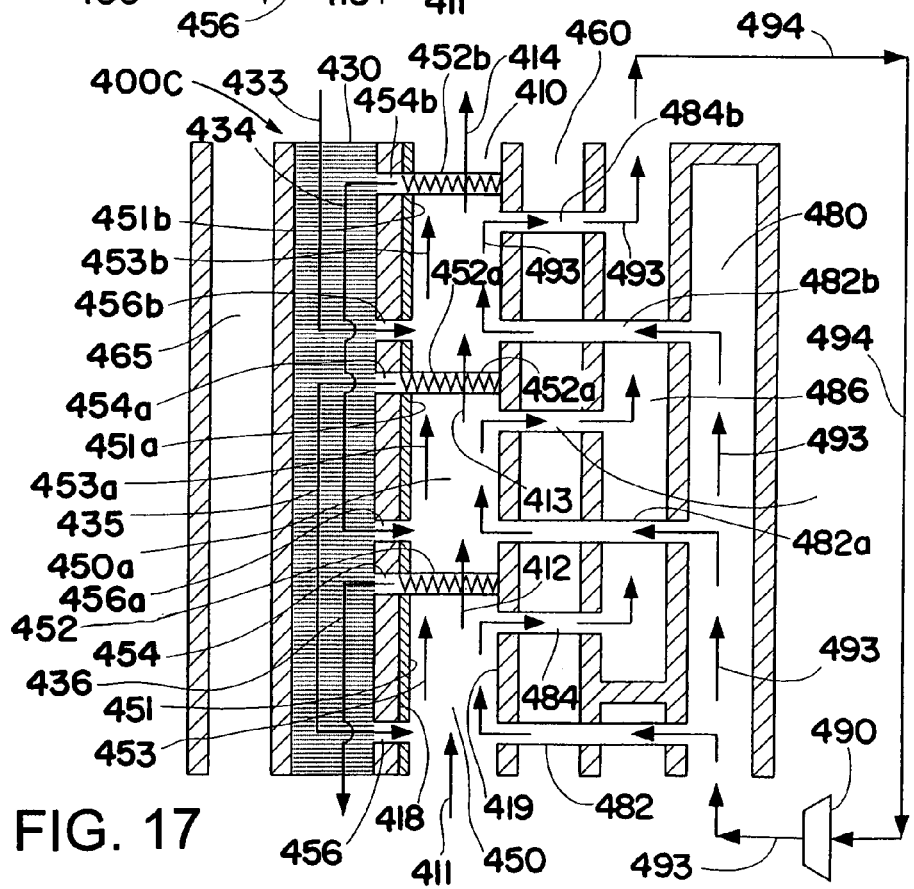
FIG. 17 is a schematic illustration of an alternate embodiment of a microchannel distillation unit that can be used in accordance with the inventive process.

The microchannel distillation unit 400C illustrated in FIG. 17 is identical in design and operation to the microchannel distillation unit 400A illustrated in FIG. 15 with the exception that the microchannel distillation unit 400C includes supplemental vapor channels 480 and 486, and compressor 490. Vapor channel 486 is adjacent to heat exchange channel 460. Vapor channel 480 is adjacent to vapor channel 486. Each of the microchannel distillation sections (450, 450a, 450b) has a supplemental vapor inlet, for example, a channel or tube (482, 482a, 482b) extending from the vapor phase channel 480 to the microchannel 410. Each of the microchannel distillation sections (450, 450a, 450b) also has a supplemental vapor outlet, for example, a channel or tube (484, 484a, 484b) extending from the microchannel 410 to the vapor phase channel 486. The vapor phase channels 480 and 486 may be microchannels, and each may have the same dimensions as the microchannel 410 or the liquid channel 430. The operation of the microchannel distillation unit 400C is the same as the microchannel distillation unit 400A with the exception that the vapor phase is recirculated through the microchannel distillation unit 400C as a vapor phase rather than being condensed and recirculated through the microchannel distillation unit 400A as a liquid phase. The vapor phase flows from compressor 490, as indicated by arrows 493, through vapor phase channel 480, and from vapor phase channel 480 through each of the vapor phase inlet channels or tubes (482, 482a, 482b) into each of the microchannel distillation sections (450, 450a, 450b) where it combines with vapor phase flowing from the reboiler, the vapor phase flowing from the reboiler being indicated by arrows 411, 412, 413 and 414. In the microchannel distillation sections (450, 450a, 450b) the vapor phase contacts the liquid phase flowing along the interior walls (451, 451a, 451b ). The liquid phase and the vapor phase undergo a mass transfer in each of the distillation sections (450, 450a, 450b) as described above. Part of the vapor phase flows through the capture structure (452, 452a, 452b) and part of the vapor phase exits the microchannel distillation sections (450, 450a, 450b) through the vapor phase outlet channels (484, 484a, 484b) and flows into vapor phase channel 486. The vapor phase flows from vapor phase channel 386 back to compressor 490 as indicated by line 494.

Figure 18:
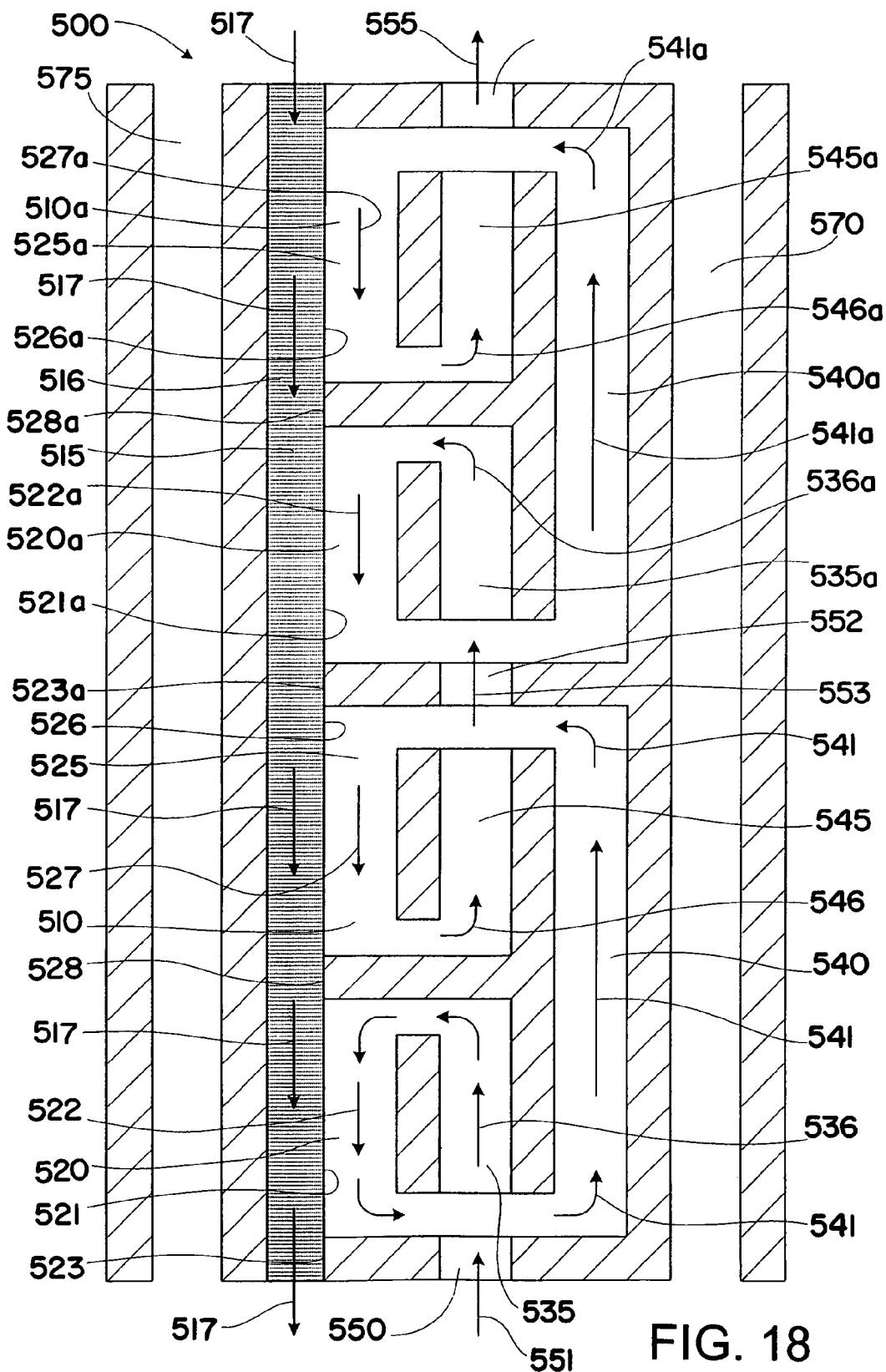
FIG. 18 is a schematic illustration of an alternate embodiment of a microchannel distillation unit that can be used in accordance with the inventive process.

In one embodiment, the microchannel distillation column or apparatus (e.g., column or apparatus 110 or 210) may contain one or more microchannel distillation units having the construction of microchannel distillation unit 500 illustrated in FIG. 18. Referring to FIG. 18, microchannel distillation unit 500 comprises: liquid channel 515; process microchannels 520, 525, 520a and 525a; vapor channels 535, 540, 545, 535a, 540a and 545a; vapor inlet/outlets 550, 552 and 554; and heat exchange channels 570 and 575. Liquid channel 515 contains wicking region 516. The microchannel distillation unit 500 illustrated in FIG. 18 comprises two microchannel distillation sections, namely, microchannel distillation sections 510 and 510a. It will be understood, however, that although the illustrated embodiment depicts two microchannel distillation sections, the microchannel distillation unit 500 may comprise any desired number of microchannel distillation sections, for example, three, four, five, six, seven, eight, ten, tens, hundreds, thousands, etc. Each of the microchannel distillation sections (510, 510a) comprises a first process microchannel (520, 520a), a second process microchannel (525, 525a), a first vapor channel (535, 535a), a second vapor channel (540, 540a), and a third vapor channel (545, 545a). Microchannel distillation section 510 includes vapor inlet/outlets 550 and 552. The vapor outlet 552 also functions as a vapor inlet for microchannel distillation section 510a. Microchannel distillation section 510a includes vapor inlet/outlets 552 and 554. The process microchannels (520, 525, 520a, 525a) are adjacent to liquid channel 515. Part of the wicking region 516 functions as a wall (521, 526, 521a, 526a) for the process microchannels (520, 525, 520a, 525a). While not wishing to be bound by theory, it is believed that capillary forces in the wicking region (516) maintain a separation between the liquid phase in the wicking region (516) and the vapor phase in the adjacent process microchannels (520, 525, 520a, 525a), while still allowing for mass transfer to occur at the interface between the wicking region and the process microchannels. The lower interior first vapor channels (535, 535a) are adjacent to the lower process microchannels (520, 520a). The upper interior third vapor channels (545, 545a) are adjacent to the upper process microchannels (525, 525a). The outer second vapor channels (540, 540a) are adjacent to the inner first and third vapor channels (535, 545, 535a, 545a). Heat exchange channel 570 is adjacent to the outer vapor channels 540 and 540a, and heat exchange channel 575 is adjacent to liquid channel 515. It will be understood that if the microchannel distillation unit 500 is repeated in a microchannel distillation assembly, each repetition of the microchannel distillation unit 500 may share a heat exchange channel with the next adjacent microchannel distillation unit 500, thus each repetition of the microchannel distillation unit 500 may have one heat exchange channel. For example, the heat exchange channel 570 of one microchannel distillation unit 500 may also function as the heat exchange channel 575 of the next adjacent microchannel distillation unit 500. The first and third vapor channels (535, 545, 535a, 545a) and the second vapor channels (540, 540a) may be positioned in different planes as illustrated in FIG. 18, or they may be positioned side by side in the same plane. In regions where the second vapor channel (540, 540a) and the first vapor channel (535, 535a) or third vapor channel (545, 545a) appear to cross over one another in FIG. 18, the flow of the vapor phase streams may be maintained in separate planes. For example, the streams shown flowing horizontally in FIG. 18 may flow above the plane of the page, while the streams shown flowing vertically in FIG. 18 may flow below the plane of the page. These streams may be sealed from crossing the plane of the page in such a way as to prevent vapor flow from bypassing any of the microchannel distillation sections (510, 510a). Each of the microchannel distillation sections (510, 510a) contains junctions (523, 528, 523a, 528a) wherein the vapor phase contacts a wall which forms a seal with the liquid phase in the wicking region 516. This seal in combination with capillary forces in the wicking region 516 may prevent vapor from intruding into the wicking region 516 or from bypassing any of the microchannel distillation sections (510, 510a).

In operation, a liquid phase containing components X and Y flows downwardly through the wicking region 516 in the liquid channel 515, as indicated by arrows 517. A vapor phase containing components X and Y flows through vapor inlet/out 550, as indicated by arrow 551, into and through first vapor channel 535 as indicated by arrow 536, and into and through process microchannel 520, as indicated by arrow 522. In the process microchannel 520 the vapor phase contacts at least part of the liquid phase in the wicking region 516. Part of the more volatile component Y transfers from the liquid phase to the vapor phase to form a component Y rich vapor phase. Part of the less volatile component X transfers from the vapor phase to the liquid phase to form a component X rich liquid phase. The vapor phase flows from process microchannel 520 to and through second vapor channel 540, as indicated by arrows 541, and from second vapor channel 540 into and through process microchannel 525, as indicated by arrow 527. In the process microchannel 525, the vapor phase contacts at least part of the liquid phase in the wicking region 516. Part of the more volatile component Y transfers from the liquid phase to the vapor phase to form a component Y rich vapor phase. Part of the less volatile component X transfers from the vapor phase to the liquid phase to form a component X rich liquid phase. The vapor phase flows from process microchannel 525 to and through third vapor channel 545, as indicated by arrow 546, and then to and through vapor inlet/outlet 552, as indicated by arrow 553. The vapor phase flows from vapor inlet/outlet 552 into and through first vapor channel 535a, as indicated by arrow 536a, into and through process microchannel 520a, as indicated by arrow 522a. In the process microchannel 520a, the vapor phase contacts at least part of the liquid phase in the adjacent wicking region 516. Part of the more volatile component Y transfers from the liquid phase to the vapor phase to form a component Y rich vapor phase. Part of the less volatile component X transfers from the vapor phase to the liquid phase to form a component X rich liquid phase. The vapor phase flows from the process microchannel 520a to and through the second vapor channel 540a, as indicated by arrow 541a, and then to and through process microchannel 525a, as indicated by arrow 527a. In the process microchannel 525a, the vapor phase contacts at least part of the liquid phase in the wicking region 516. Part of the more volatile component Y transfers from the liquid phase to the vapor phase to form a component Y rich vapor phase. Part of the less volatile component X transfers from the vapor phase to the liquid phase to form a component X rich liquid phase. The vapor phase flows from the process microchannel 525a to and through the third vapor channel 545a, as indicated by arrow 546a, and to and through vapor inlet/outlet 554, as indicated by arrow 555. The flow of the vapor phase through the microchannel distillation sections (510, 510a) may be driven by a static pressure differential. The flow of the liquid phase through the wicking region 516 may be driven by one or more of gravity, shear force from the vapor phase flowing through the process microchannels (520, 525, 520a, 525a), capillary forces in the wicking region 516, and a pressure differential within liquid held in the wicking region 516 by capillary forces (e.g., inducing flow from the wicking region 516 by suction after the liquid phase in the wicking region 516 separates from the vapor phase in the process microchannels (520, 525, 520a, 525a) and is cooled).

The flow of heat exchange fluid through heat exchange channel 570 may be co-current, cross-current or counter-current relative to the flow of vapor through the second vapor channels (540, 540a). The flow of heat exchange fluid through heat exchange channel 575 may be co-current, cross-current or counter-current relative to the flow of liquid through the liquid channel 515. Each of the heat exchange channels 570 and 575 may be used to form a single or multiple temperature zones along the length of the heat exchange channels 570 and 575. For example, a separate heat exchange zone may be employed for each of the microchannel distillation sections (510, 510a). That is, each of the microchannel distillation sections (510, 510a) may be operated at a different temperature.

Figure 19:
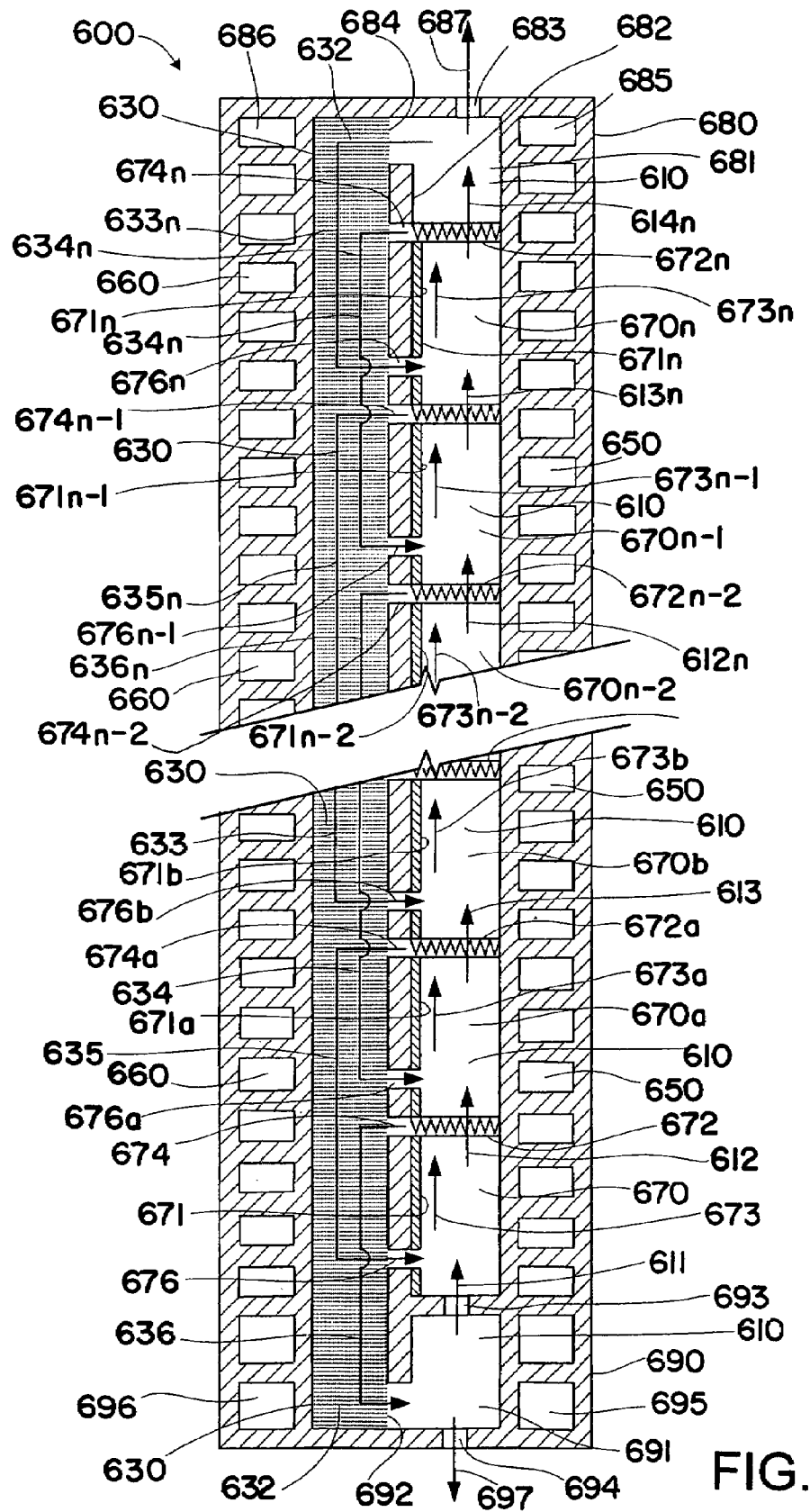
FIG. 19 is a schematic illustration of an alternate embodiment of a microchannel distillation unit that can be used in accordance with the inventive process.

The microchannel distillation assembly 600 illustrated in FIG. 19 is the same as the microchannel distillation assembly 100 illustrated in FIG. 1 employing the microchannel distillation unit 400B illustrated in FIG. 16 except that more detail is provided in FIG. 19. In FIG. 19, microchannel distillation assembly 600 includes process microchannel 610, liquid channel 630, microchannel condenser 680 and microchannel reboiler 690. The microchannel distillation assembly 600 illustrated in FIG. 19 contains n microchannel distillation sections 670, that is, microchannel distillation sections 670, 670a, 670b ... 670n-2, 670-1 and 670n, wherein n is a number that can be of any value, for example, 5, 10, 20, 50, 100, 500, 1000, 10000, etc. The broken space in FIG. 19 indicates that distillation sections 670 beyond those illustrated may be provided. The process microchannel 610 and liquid channel 630 employed in microchannel distillation assembly 600 have the same construction and function in the same manner as the process microchannel 410 and liquid channel 430 illustrated in FIG. 16. A feed comprising a fluid mixture comprising components X and Y enters microchannel distillation assembly 600. Within the microchannel distillation assembly 600, a vapor phase flows through a series of microchannel distillation sections 670 in a direction towards the microchannel condenser 680 and a liquid phase flows through a series of microchannel distillation sections 670 and the liquid channel 630 in a direction towards the microchannel reboiler 690. In each microchannel distillation section 670 the vapor phase and the liquid phase contact each other with the result being a mass transfer between the phases. In each microchannel distillation section 670 part of the more volatile component Y transfers from the liquid phase to the vapor phase, and part of the less volatile component X transfers from the vapor phase to the liquid phase. The vapor phase, which is progressively enriched with the more volatile component Y, flows through microchannel distillation sections 670 towards the microchannel condenser 680 and into the microchannel condenser 680. The liquid phase, which is progressively enriched with the less volatile component X, flows through the microchannel distillation sections 670 and the liquid channel 630 towards the microchannel reboiler 690 and into the microchannel reboiler 690.

The microchannel condenser 680 illustrated in FIG. 19 comprises portions of process microchannel 610 and liquid channel 630, the latter including a portion of wicking region 632. The microchannel condenser 680 also comprises microchannel condenser space 681, interior wall 682, distillate outlets 683 and 684, and heat exchange channels 685 and 686. The microchannel condenser space 681 may have the same dimensions of height and width as the process microchannel 610. The heat exchange channels 685 and 686 may have the same dimensions as the heat exchange channels 650 and 660. In operation, the vapor phase from microchannel distillation section 670n flows through capture structure 672n, as indicated by arrow 614n, into microchannel condenser space 621 wherein the vapor phase is condensed. Part or all of the condensed vapor phase, which may be referred to as distillate product D, flows from microchannel condenser 680 through distillate outlet 683, as indicated by arrow 687. Part or all of the distillate product D may flow through distillate outlet 684 into wicking region 632, and through wicking region 632 to liquid entrance 676n, as indicated by arrow 633n. From that point, the liquid phase flows through the liquid channel 630 and the series of microchannel sections 670n to 670 towards the microchannel reboiler 690.

The microchannel reboiler 690 illustrated in FIG. 19 comprises portions of process microchannel 610 and liquid channel 630, the latter including a portion of wicking region 632. The microchannel reboiler 690 also includes microchannel reboiler space 691, liquid inlet 692, vapor outlet 693, liquid outlet 694, and heat exchange channels 695 and 696. The microchannel reboiler space 691 may have the same dimensions of height and width as the process microchannel 610. The reboiler heat exchange channels 695 and 696 may have the same dimensions as the heat exchange channels 650 and 660. In operation, the liquid phase from microchannel distillation section 670 flows through liquid inlet 692, as indicated by arrow 636, into microchannel reboiler space 691 wherein part or all of the liquid phase may be vaporized and the remainder remains in liquid form. The part that remains in liquid form, which may be referred to as bottoms product B, flows out of microchannel reboiler 690 through liquid outlet 694, as indicated by arrow 697. The part of the liquid product that is vaporized flows through vapor outlet 693, as indicated by arrow 611, into microdistillation section 670. From that point, the vapor phase flows through the process microchannel 610 and the series of microchannel sections 670 to 670n towards the microchannel condenser 680.

Figure 45:
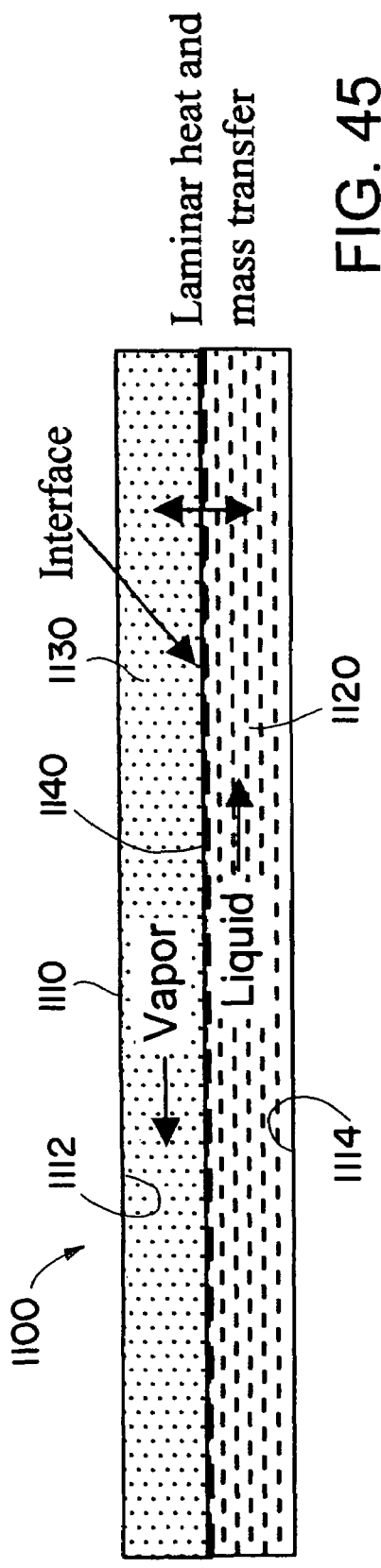
FIG. 45 is a schematic illustration of an alternate embodiment of a microchannel distillation unit that can be used in accordance with the inventive process.

In one embodiment, the microchannel distillation column or apparatus (e.g., microchannel distillation column or apparatus 110 or 210) may contain one or more microchannel distillation units having the construction of microchannel distillation unit 1100 illustrated in FIG. 45. Referring to FIG. 45, microchannel distillation unit 1100 comprises process microchannel 1110 which includes liquid region 1120 and vapor region 1130. The liquid region 1120 and vapor region 1130 are separated by wicking layer 1140. A heat exchange channel may be positioned on one or both sides of the process microchannel 1110. The overall height or gap of the process microchannel from wall 1112 to wall 1114 may be in the range from about 0.05 to about 10 mm, and in one embodiment about 0.1 to about 5 mm. The height or gap between the wall 1114 and the wicking layer 1140 may be in the range up to about 5 mm, and in one embodiment in the range up to about 1 mm. The wicking layer 1140 may float on the surface of the liquid in the liquid region 1120 and may have a thickness in the range from about 0.01 to about 5 mm, and in one embodiment in the range from about 0.05 to about 2 mm. The wicking layer 1140 may be made of any of the wicking materials discussed below. Examples include sintered metals, metal screens, metal foams, or polymer fibers such as cellulosic fibers. The wicking layer may comprise a metal shim or foil that is stacked and laminated. In one embodiment, structures in the wicking layer may be through features in the shim, or partially etched into the shim, or a combination thereof.

The liquid may flow horizontally and counter-current to the vapor. The flow of the liquid may be at a velocity in the range from about 0.001 to about 10 meters per second (m/s), and in one embodiment in the range from about 0.01 to about 1 m/s. The Reynolds number for the flow of the liquid may be in the range from about 10 to about 4000, and in one embodiment in the range from about 50 to about 2000. The flow of the vapor may be at a velocity in the range from about 0.01 to about 100 m/s, and in one embodiment in the range from about 0.1 to about 10 m/s. The Reynolds number for the flow of the vapor may be in the range from about 10 to about 4000, and in one embodiment in the range from about 100 to about 2000. Heat and mass transfer between the liquid and vapor. The mass is transferred from vapor to liquid via interface and vice-versa. The wicking layer 1140 may reduce or eliminate drag on the flow of the liquid by the flow of the vapor. The wicking layer 1140 may help promote contact between the vapor and the liquid. In one embodiment, the liquid flow is not constrained to occur within the wicking layer 1140, but rather convective mixing induced by surface features on the walls adjacent to the wall in the vapor region, or adjacent to the heat transfer wall, or between the liquid and vapor interface, or a combination of any of the foregoing. The surface features may be used to overcome mass transport resistance in both the liquid and vapor phases. This is shown in FIG. 46.

Figure 46:
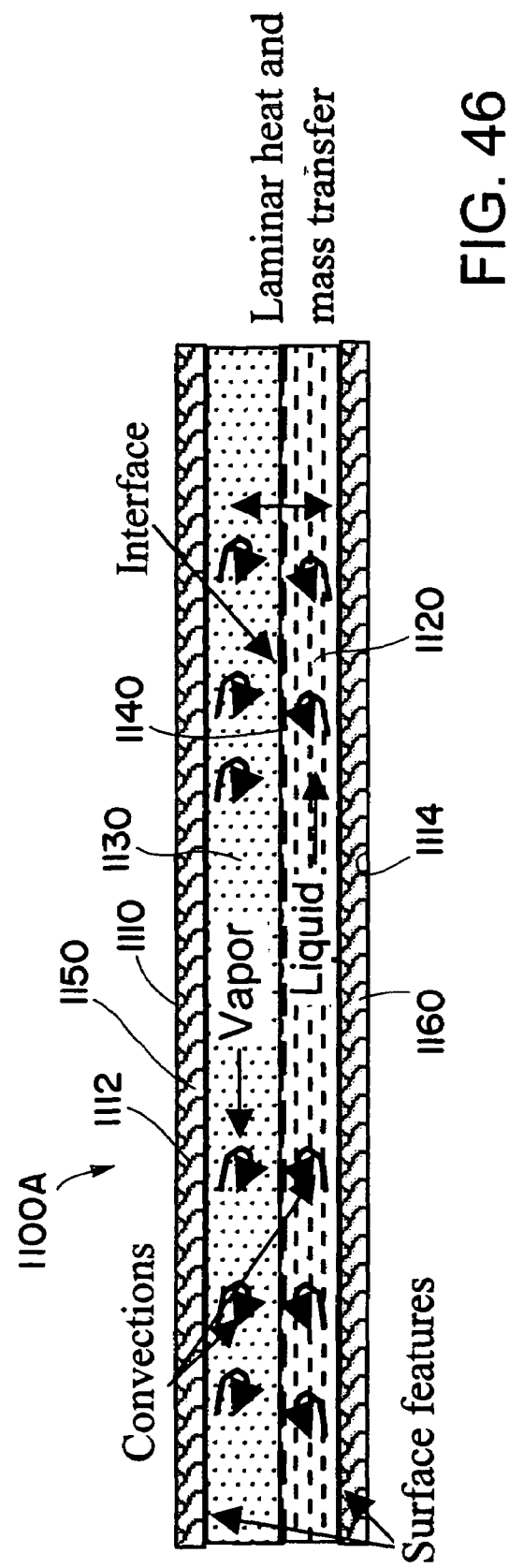
FIG. 46 is schematic illustration of another alternate embodiment of a microchannel distillation unit that can be used in accordance with the inventive process.
Figure 47:
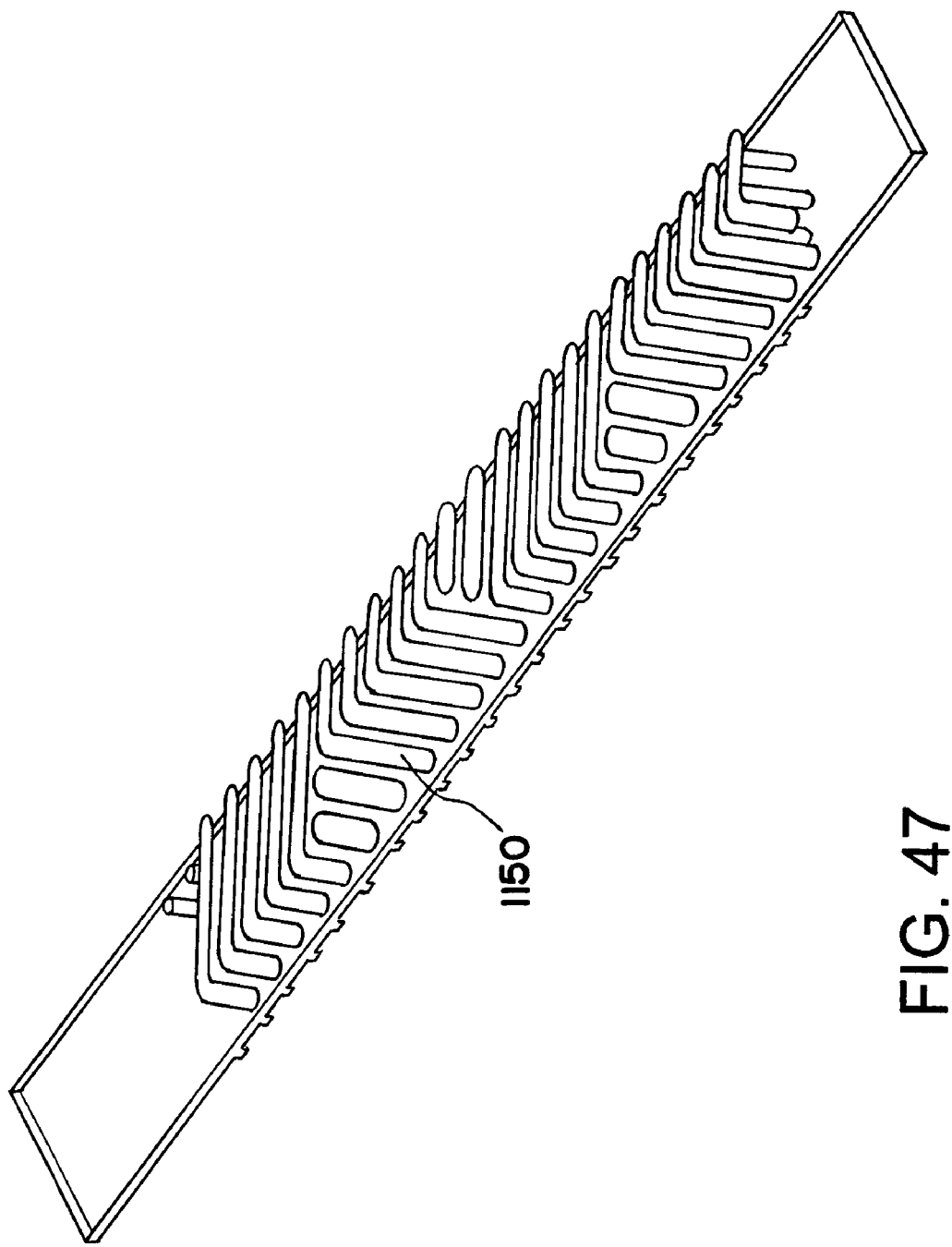
FIG. 47 is a schematic illustration of surface features (or grooves and protrusions) that can be used in the microchannel distillation unit illustrated in FIG. 46.
Figure 48:
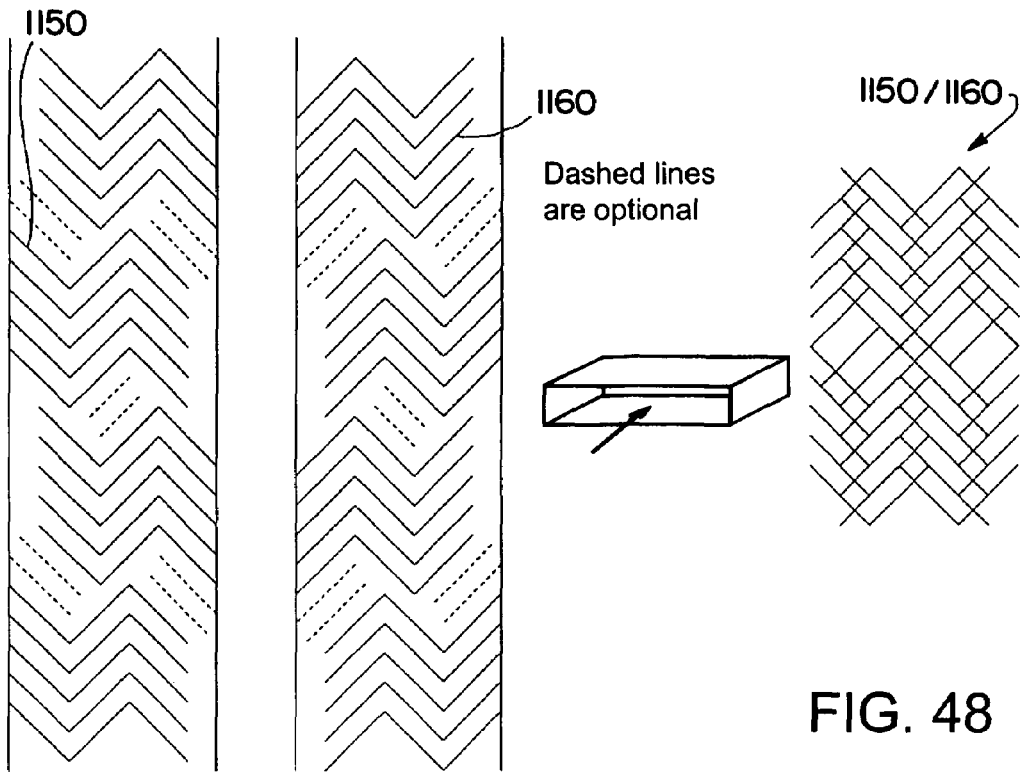
FIGS. 48 and 49 are schematic illustrations of alternate embodiments of the surface features that can be used in the microchannel distillation unit illustrated in FIG. 46. In each of these figures the surface features for positioning in the vapor region of the microchannel distillation unit illustrated in FIG. 46 are shown on the left, and the surface features for use in the liquid region are shown on the right. Next to each of these figures are schematic illustrations showing the surface features as they overlap and complement one another.
Figure 49:
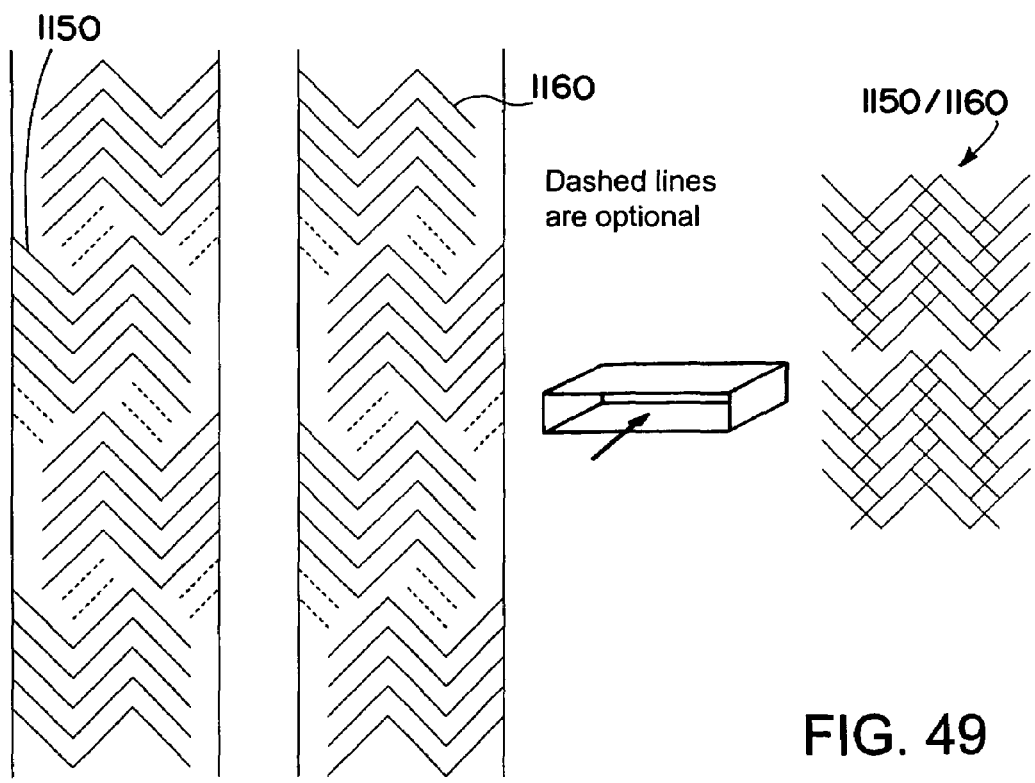
Figure 50:
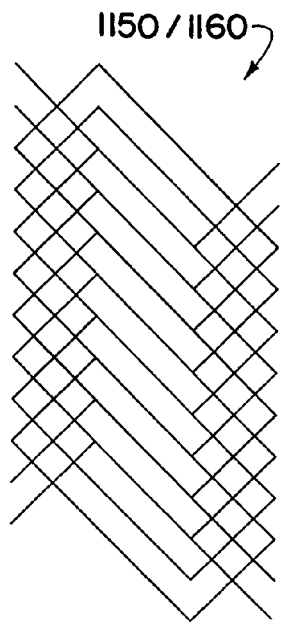
FIGS. 50 and 51 are schematic illustrations of alternate embodiments of the surface features that can be used in the microchannel distillation unit illustrated in FIG. 46. Each of these figures show the complementing nature of the surface features.
Figure 51:
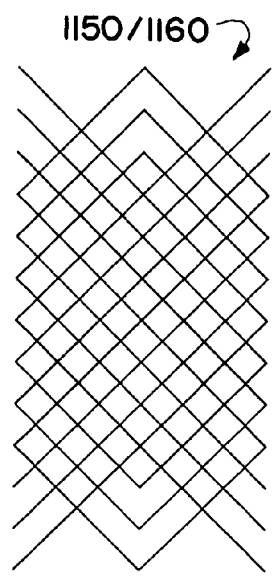

Referring to FIG. 46, microchannel distillation unit 1100A is the same as the microchannel distillation unit 1100 illustrated in FIG. 45 except that the microchannel distillation unit 1100A includes surface features 1150 and 1160 on opposing walls 1112 and 1114, respectively, of process microchannel 1110. The surface features 1160 improve the mixing of liquid while surface features 1150 improve the mixing of vapor. The surface features 1150 and 1160 may be in the form of grooves or protrusions in the microchannel walls 1112 and 1114. The grooves may have depths in the range from about 1 to about 5000 microns, and in one embodiment in the range from about 10 to about 1000 microns. The protrusions may have heights in the range from about 1 to about 5000 microns, and in one embodiment in the range from about 10 to about 1000 microns. The grooves in wall 1112 may be positioned opposite protrusions in wall 1114, and vice versa, so as to complement each other. The grooves and opposite protrusions may be used to promote continuous and well-dispersed mixing in the process microchannel 1110. The grooves and protrusions divert the liquid in a direction towards the vapor region 1130. Similarly, the grooves and protrusions divert the vapor in a direction towards the liquid region 1120. This reduces the mass transfer resistance for both the liquid and the vapor. Different surface feature geometries may be required for the liquid and vapor regions. FIG. 47 shows an example of surface features that may enable convective flow in a direction perpendicular to the direction of flow and thereby improve mass transfer. Alternate surface feature geometries are illustrated in FIGS. 48-51.

Alternatively, surface features may be used to churn, rotate, or otherwise create a non-traditional parabolic laminar flow profile within the liquid and/or vapor phase while maintaining a relatively calm interface between the two phases. The liquid phase may be held adjacent the heat transfer or other microchannel wall by the use of vertically aligned or diagonally weaving capillary features, wherein the surface features are recessed or protruding within the capillary features or protrude to a shorter height than the height of the capillary features. By this method, the flow capacity per channel or rate of the liquid film may be maintained at a higher level than that of a thin film on a wall or that which uses capillary features alone because the surface features create transverse and perpendicular advection within the otherwise thick liquid film such that the otherwise large liquid mass transfer limitation is reduced. Mass within the liquid film may be moved throughout the film predominantly by advection rather than the slow diffusion found in a laminar liquid film.

Figure 52:
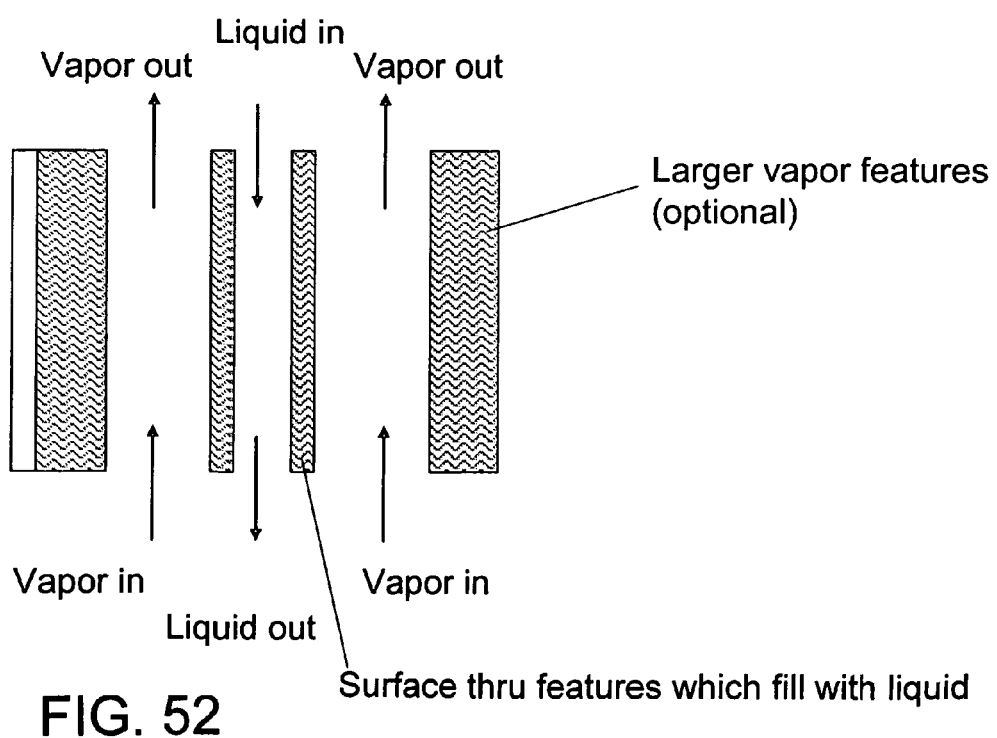
FIGS. 52-55 are schematic illustrations of microchannel distillation units that employ surface features on their sidewalls for enhancing the mixing of the vapor and liquid phases.
Figure 53:
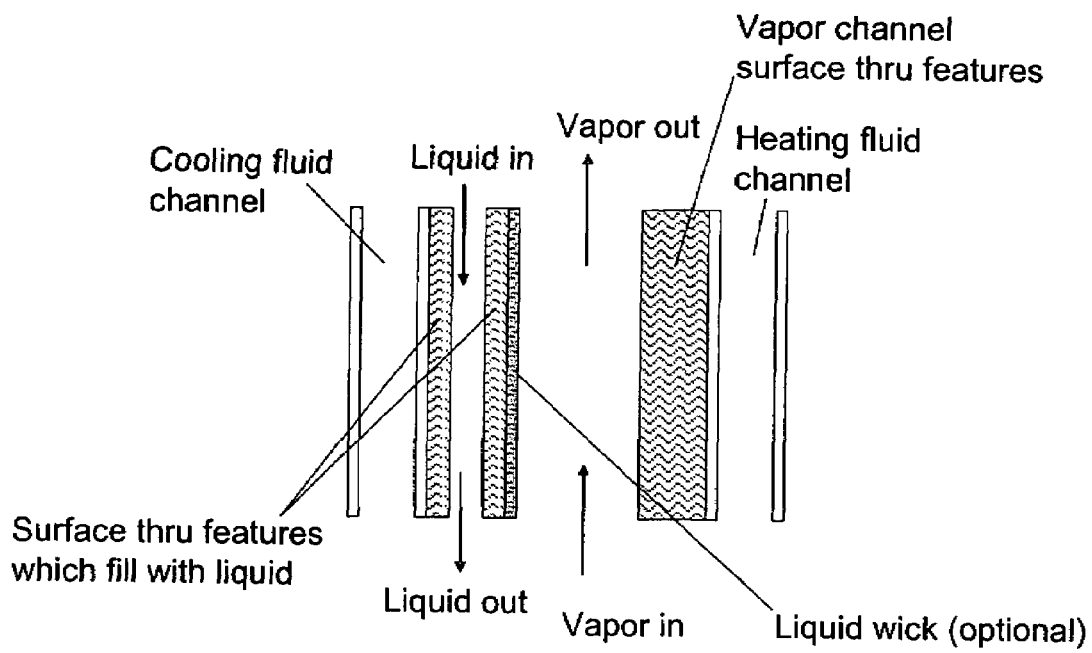
Figure 54:
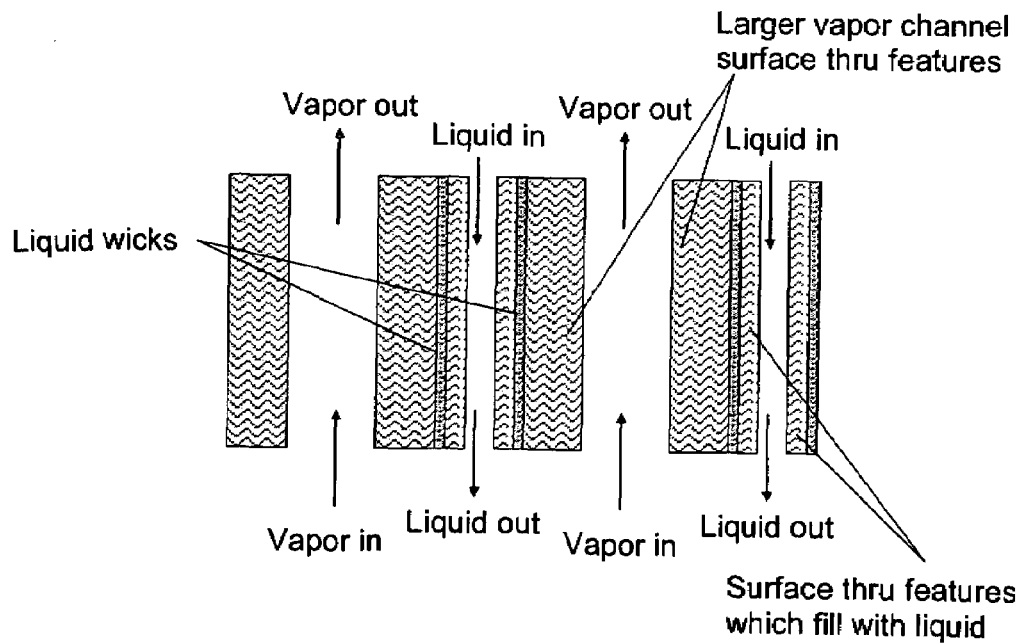
Figure 55:
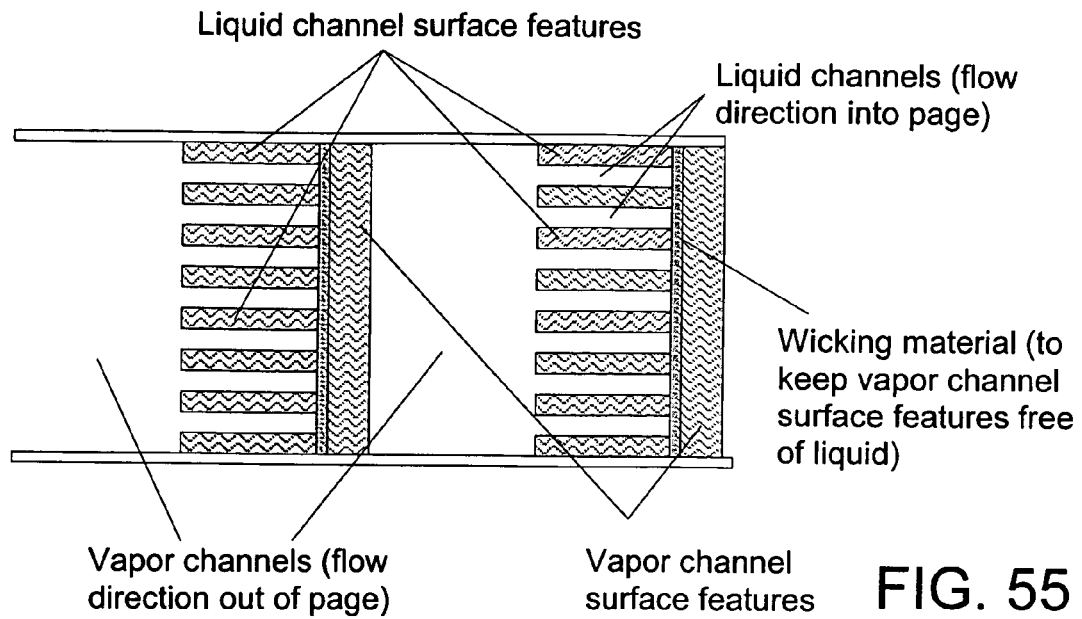

FIGS. 52-55 illustrate various microchannel distillation units that employ surface features on their side walls to enhance mixing of the vapor and liquid. FIGS. 53-55 illustrate embodiments wherein a fine pore size wicking material (that is, with thru features) is used behind vapor channel surface features to keep the surface features from filling with condensing liquid. Liquids in the system may include slurries of very fine particles. FIG. 52 shows vertically oriented distillation channels, and FIG. 53 shows the same with adjacent heat exchange channels. In this embodiment the cooling channel is not adjacent to the vapor channel. This is to prevent condensation inside the vapor channel surface features. FIG. 54 shows an alternate embodiment wherein a fine pore size porous wicking material separates the liquid and vapor channels (or the surface thru features of those channels).

FIG. 55 shows an alternate embodiment of arrangements of liquid and vapor layers of surface features, fine pore size porous wicking material, and open channels. Advantages of this embodiment include the openness of the liquid/vapor interface at one edge of the vapor channel, and the depth of the liquid channel which is possible with this arrangement. The surface features in between the open liquid flow channels provide good "side to side" mixing (left to right in FIG. 55). This embodiment may have the advantage of being able to turn down the flow or deal with variable flow rates (internal flow rates can vary along the length of the column) with better resistance to dry out and flooding.

Figure 56:
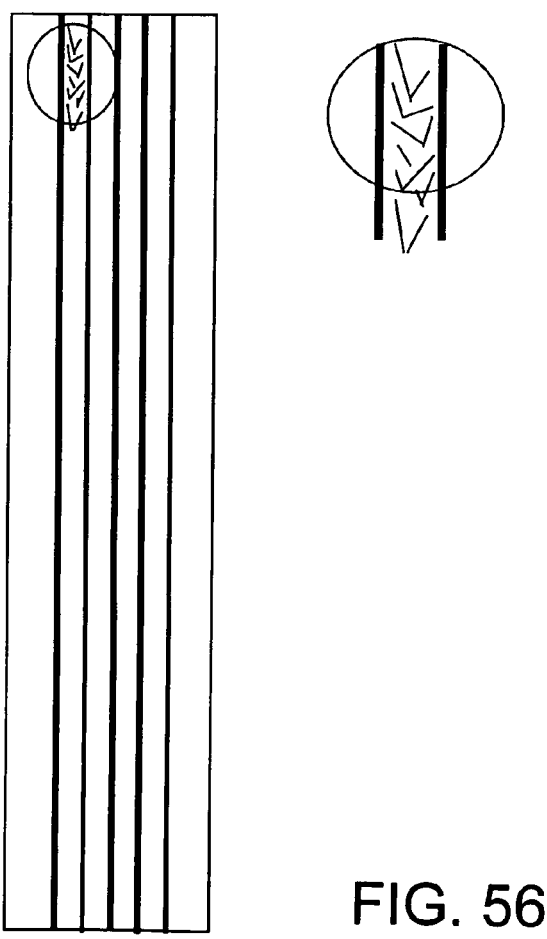
FIG. 56 is a schematic illustration of a wall of a microchannel that employs dual depth surface features that promote capillary retention and mixing.

FIG. 56 shows dual depth features to promote capillary retention and mixing. As shown in FIG. 56, surface features that are narrowly spaced (in width) and aligned parallel with the direction of flow to permit counter-current flow of gas and liquid. The surface features may extend from the microchannel wall to the gas-liquid interface. A second set of surface features is embedded within the first and is aligned non-parallel with the direction of flow. Flow enters the surface features and is forced up into the liquid stream resulting from the feature oblique angle. A slow rotation and or swirl of the liquid stream occurs within its bulk flow path. The flow path may also be similar to a rip tide that is moving the flow beneath the surface, but with more rotation.

Although only one microchannel distillation unit is illustrated in FIGS. 1-3, 14-19, 45, 46 and 52-55, there is practically no upper limit to the number of microchannel distillation units into and out of these figures and from left to right in these figures that may be used in a microchannel distillation column or apparatus for conducting the inventive process. For example, one, two, three, four, five, six, eight, ten, twenty, fifty, one hundred, hundreds, one thousand, thousands, ten thousand, tens of thousands, one hundred thousand, hundreds of thousands, millions, etc., of the microchannel distillation units described above may be used. The microchannels and associated liquid channels and heat exchange channels may be aligned side-by-side or stacked one above another. In embodiments where more than one microchannel distillation unit is present, the feed may be distributed among the microchannel distillation units and introduced into each microchannel distillation unit at a location that is intermediate between the microchannel reboiler and condenser. This can be accomplished through the addition of feed channels to carry the distributed feed fluids to each microchannel distillation unit or by partitioning off unused portions of existing microchannel distillation units (such as heat exchange channels) which are not used in the region of the microchannel distillation unit where feed is to be distributed and introduced. Those skilled in the art can determine desirable locations along the length of the microchannel distillation unit at which the feed might be introduced. The feed distribution might be accomplished through the aid of a wick distribution structure if a liquid, or through other means, such as distribution through an array of orifices.

Although FIGS. 1-12, 14-19 and 52-55 depict essentially vertical flow through the channels, these distillation units may be aligned horizontally to provide for horizontal flow through the channels, or they may be aligned at an inclined angle from the horizontal.

Figure 20:
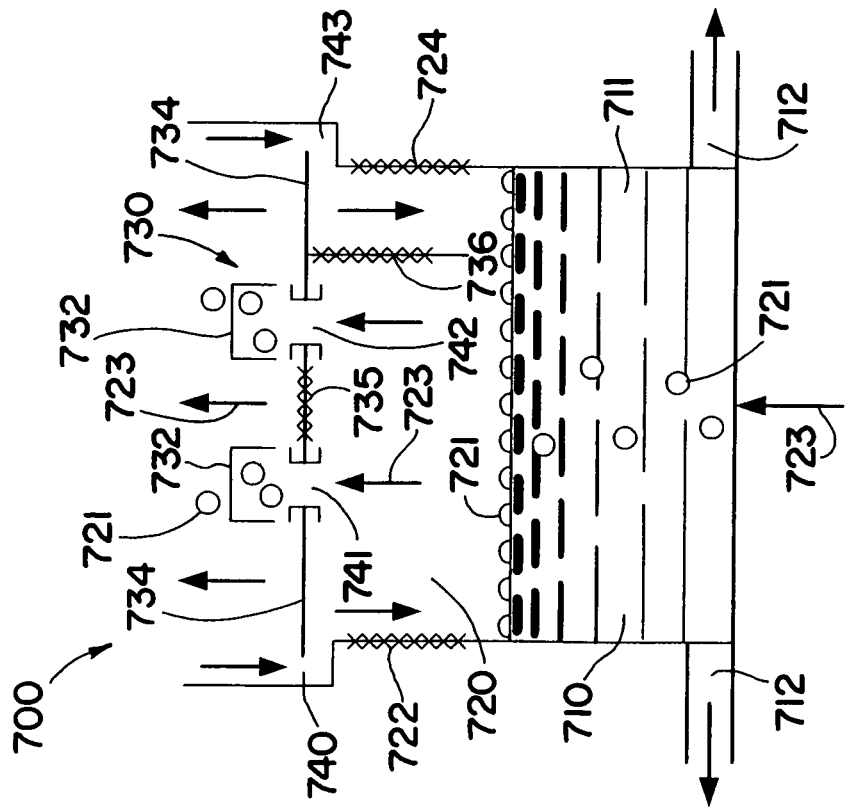
FIG. 20 is a schematic illustration of a microchannel distillation section or stage that can be used in accordance with the inventive process, the microchannel distillation section being in the form of bubble cap unit.

In one embodiment, each of the microchannel distillation sections (eg., microchannel distillation sections 220) may be in the form of a bubble cap and liquid removal structure such as the bubble cap and liquid removal structure 700 illustrated in FIG. 20. The bubble cap and liquid removal structure 700 includes liquid region 710, vapor region 720 which is positioned above liquid region 710, and bubble cap tray 730 which is positioned above vapor region 720. The liquid region includes liquid outlets 712. The bubble cap tray 730 includes bubble caps 732, platform structures 734, capture structures 735 and 736, and openings 740, 741, 742 and 743. The vapor region 720 includes capture structures 722 and 724. In operation, liquid 711 is contained within liquid region 710 and vapor flows upwardly through the liquid 711 in the form of bubbles 721 in the direction indicated by arrows 723. The bubbles 721 pass through the liquid 711 into the vapor region 720 and then through the bubble caps 732 into the next adjacent downstream bubble cap and liquid removal structure. Liquid collects on the bubble cap tray 730 and flows downwardly along the sidewalls of the vapor region 720 into the liquid region 710. The liquid then flows from the liquid region 710 through liquid outlets 712 into the next adjacent upstream bubble cap and liquid removal structure. In the liquid region 710 the vapor bubbles 721 and the liquid 711 contact each other and the less volatile component X transfers from the vapor phase to the liquid phase, and the more volatile component Y transfers from the liquid phase to the vapor phase.

Figure 21:
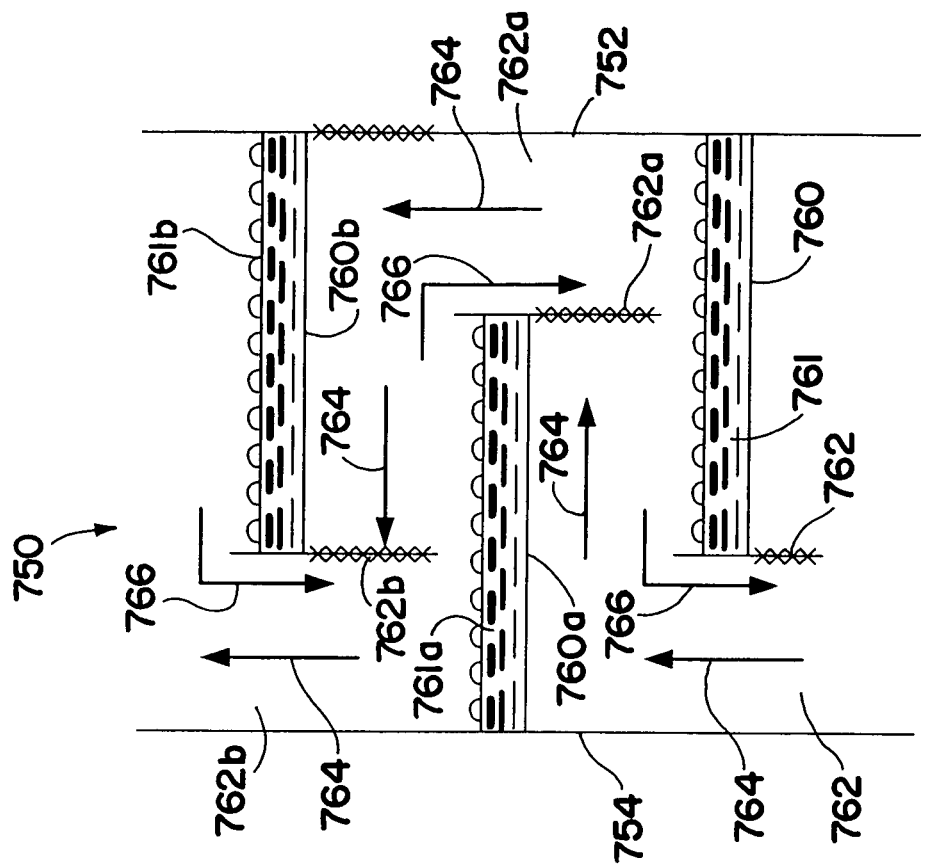
FIG. 21 is a schematic illustration of two microchannel distillation sections or stages that can be used in accordance with the inventive process, the microchannel distillation sections being divided by microchannel distillation trays, each of the trays comprising a capture structure for collecting liquid and an opening for permitting the flow of a vapor phase through the tray.

In one embodiment, each of the microchannel distillation sections (e.g., microchannel distillation section 220) may comprise a distillation tray such as the distillation trays positioned in the microchannel 750 illustrated in FIG. 21. The microchannel 750 may include sidewalls 752 and 754. Distillation trays 760 and 760b may project inwardly into the process microchannel 750 from microchannel wall 752, and distillation tray 760a may project inwardly into the process microchannel 750 from microchannel wall 754. Open spaces 762, 762a and 762b are positioned adjacent to the distillation trays 760, 760a and 760b, respectively. Distillation trays 760, 760a and 760b include reservoirs 761, 761a and 761b for collecting liquid. The distillation trays 760, 760a and 760b include capture structures 762, 762a and 762b which depend from distillation trays 760, 760a and 760b, respectively. In operation, the vapor phase flows upwardly through the process process microchannel 750 in the direction indicated by arrows 764. The liquid phase flows through the process microchannel 750 in the direction indicated by arrows 766. The vapor phase contacts the capture structures 762, 762a and 762b as it flows through the process microchannel 750 and liquid in the vapor phase is captured by the capture structures 762, 762a and 762b as the vapor flows through the capture structures. The liquid flows downwardly from the capture structures 762, 762a and 762b to the tray reservoirs positioned below such capture structures. The vapor phase flowing in the direction indicated by arrows 764 and the liquid phase flowing in the direction indicated by arrows 766 contact each other in the capture structures as well as in the liquid reservoirs with the result being the transfer of the more volatile component Y from the liquid phase to the vapor phase, and the transfer of the less volatile component X from the vapor phase to the liquid phase.

Figure 22:
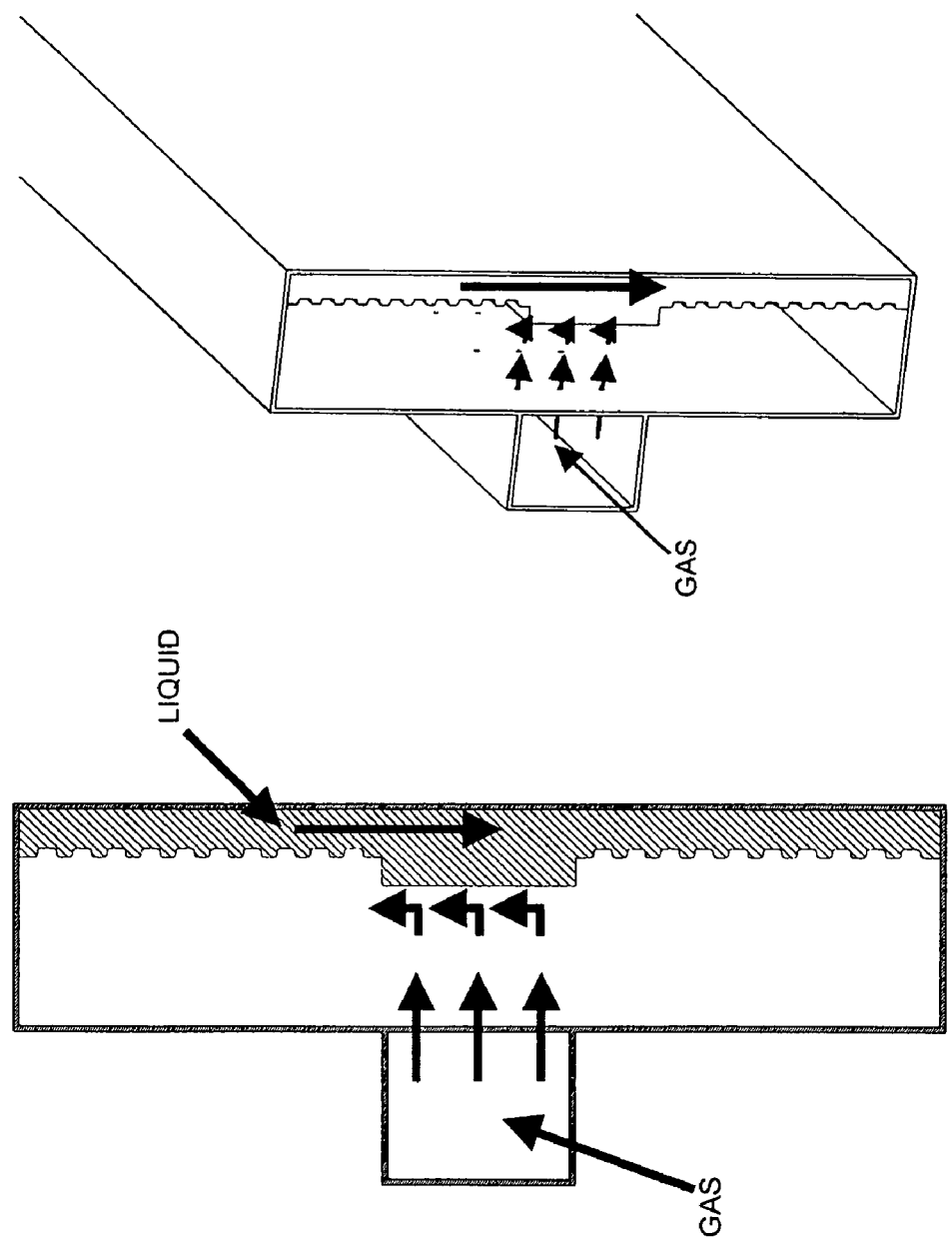
FIG. 22 is a schematic illustration showing a method for introducing gaseous feed into a microchannel distillation unit that can be used in accordance with the invention.
Figure 23:
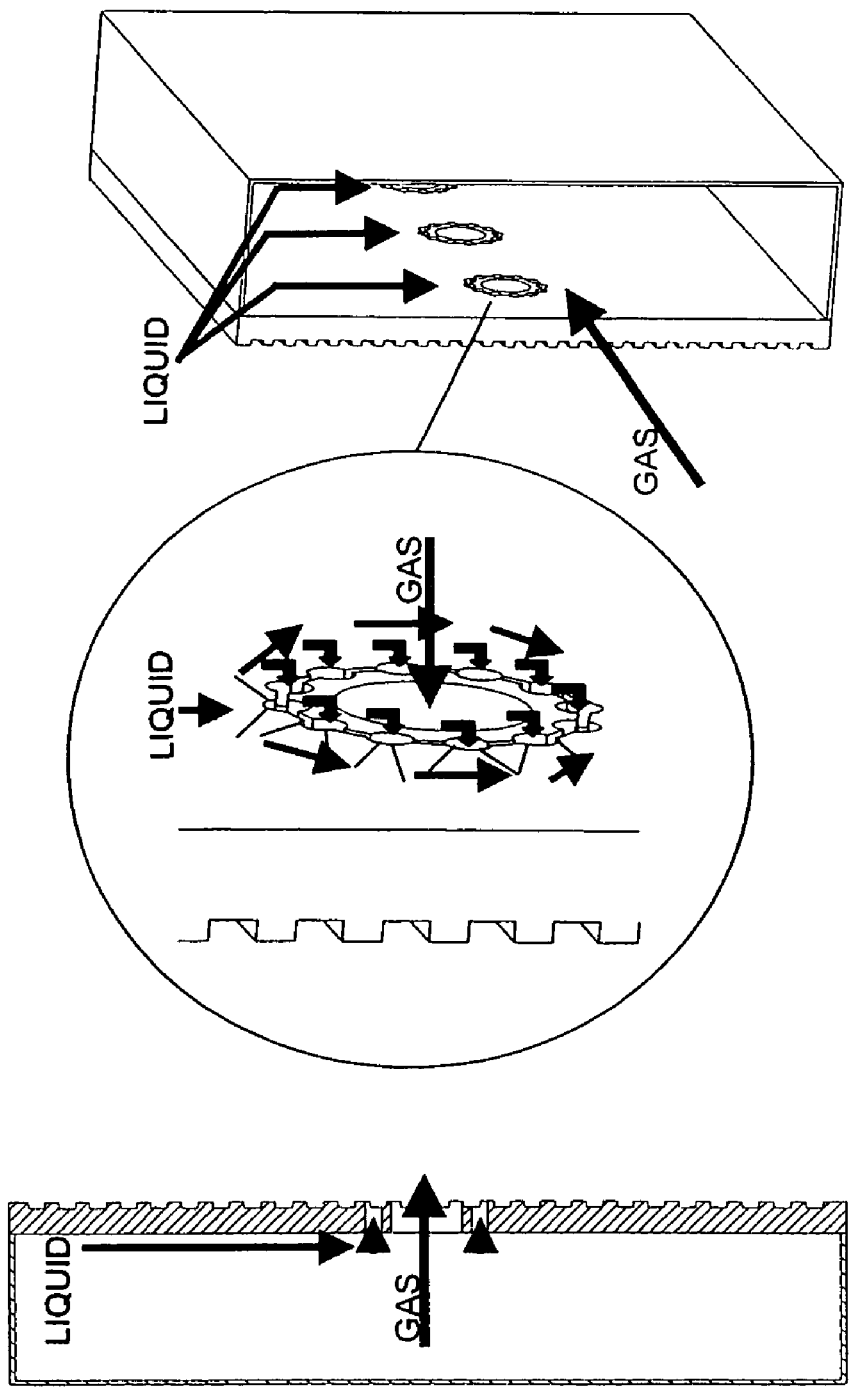
FIGS. 23 and 24 are schematic illustrations showing methods for introducing a two-phase feed stream comprising a gas and a liquid into a microchannel distillation unit that can be used in accordance with the invention.
Figure 24:
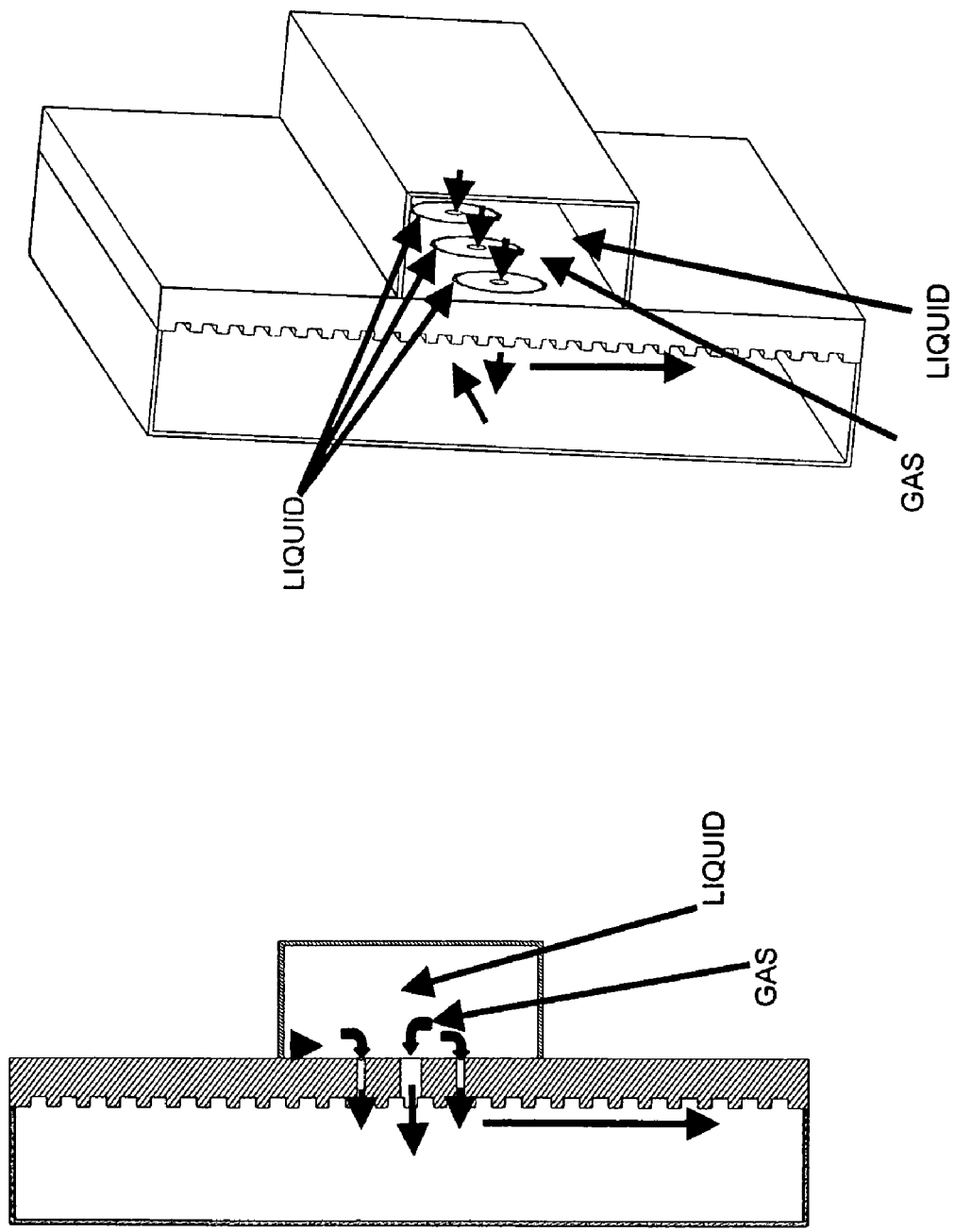
Figure 25:
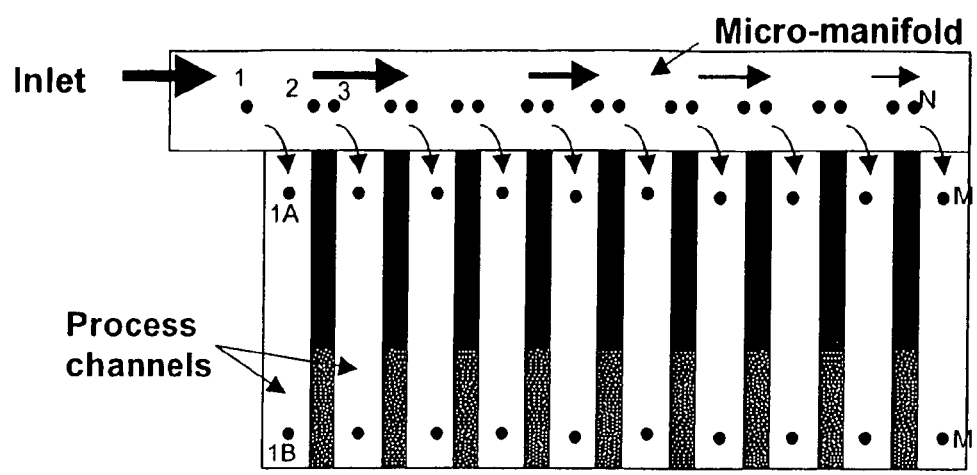
FIG. 25 is a schematic illustration of a flow distribution network that can be used in accordance with the invention.
Figure 26:
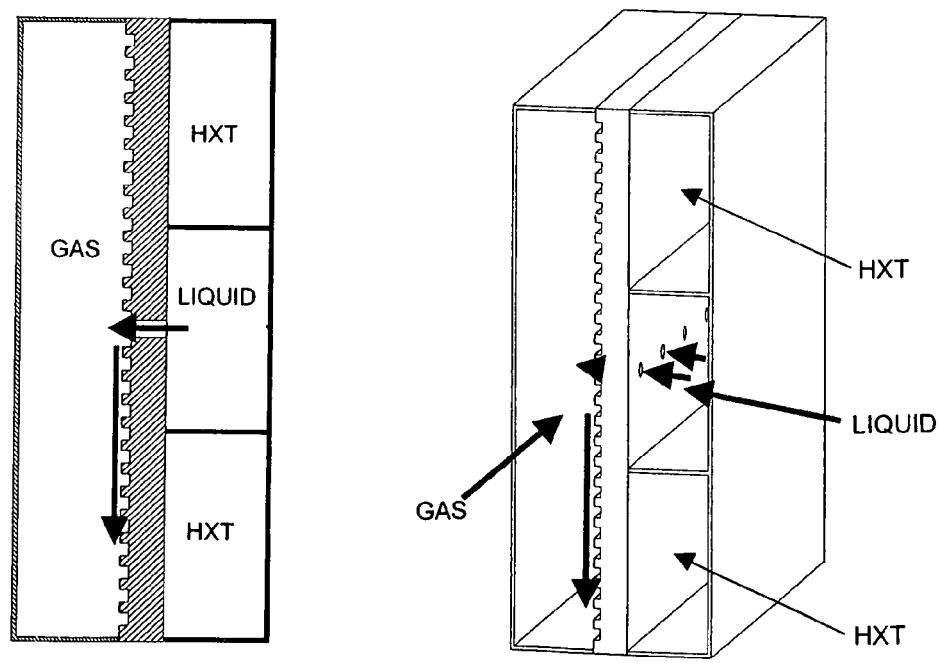
FIG. 26 is a schematic illustration showing a method for introducing a liquid feed stream into a microchannel distillation unit that can be used in accordance with the invention.

The feed stream F may be introduced into the microchannel distillation units using a number of different methods. These methods are dependent, in part, on whether the feed F is a gas or liquid, or whether it is a two-phase mixture comprising a gas and a liquid. Some of these methods are illustrated in FIGS. 22-26. FIG. 22 shows a method for introducing a gaseous feed. FIGS. 23 and 24 show methods for introducing a two-phase feed. FIG. 25 shows a micromanifold for introducing a homogeneous feed (gas, liquid or mixture). FIG. 26 shows a method for introducing a liquid feed.

The feed stream F may be distributed to the plurality of process microchannels (e.g., process microchannels 410, 610) within each microchannel distillation unit column or apparatus (e.g., 110, 210, 310) through a process flow channel. The feed inlet may enter on one side of the microchannel distillation unit and the flow should traverse the width and/or depth of the microchannel distillation unit. As flow traverses the width of the microchannel distillation unit it may flow orthogonal to the direction of the process flow streams in the microchannels and liquid channels. This may create a challenge if the feed inlet port is in away from either end of the microchannel distillation unit. For the case where the feed inlet port is substantially away from the end, the flow distribution to each microchannel may be performed in an adjacent or nearby layer that is either above or below the process flow channel.

The feed F (either gaseous, liquid, or mixed phase) may traverse the microchannel distillation unit width in one or more separate flow passages that are either substantially open with flat walls or may alternatively contain microgrooves or wicks that assist with directing flow to the plurality of microchannels along the width of the microchannel distillation unit.

For the case of a liquid feed F, the liquid may be introduced adjacent to or nearby (for example, within about 5 microchannels) the process liquid flow path. The feed flow may move up or down a layer to the process liquid path through openings or apertures that connect the flow paths. The apertures may abut grooves or wick structures to facilitate liquid distribution into the process liquid removal structure. The abutting grooves or wick structures to the flow distribution apertures may be substantially similar or different in cross section, depth, height, or other physical characteristic to the process liquid removal structures. The abutting grooves may create passages that direct flow laterally (or along the width of the microchannel distillation unit) to the process liquid removal structures that substantially direct flow longitudinally (along the length of the microchannel distillation unit).

For the case of a gaseous feed F, the feed may be introduced adjacent or nearby to the process gaseous flow path. The feed flow may move up or down a layer, laminate, or shim to join the gaseous process flow stream. The gaseous feed when introduced into the process gaseous flow stream may be introduced in a way that does not directly impinge on the liquid flowing in the liquid removal structure. The gaseous feed may impinge upon a barrier wall that allows the feed flow stream to turn and substantially flow in the same direction as the gaseous process stream. (FIG. 22). Alternatively, the feed flow may be introduced into the process gaseous flow channel aligned with the direction of flow rather than orthogonal to the direction of flow.

The microchannel distillation unit may have one, two, three, or more feed inlet ports (e.g., inlet port 230) for feed F to be added to the microchannel distillation unit. The feed may be at a different temperature at different feed ports. The feed ports may be located at different axial heights of the microchannel distillation unit that represent different microchannel distillation section numbers, where the first section is located at the bottoms end of the microchannel distillation unit (or near the highest temperature) and the final section is located at the distillate end of the microchannel distillation unit (or near the cold end). The number of outlet ports may match the number of inlet ports, or may be larger or smaller. The outlet ports may be attached to an external heating or cooling source and reintroduced into the microchannel distillation unit.

The number of inlet and outlet ports may be greater than two in embodiments where a multi-component distillation occurs and multiple product streams are drawn from the process. In one embodiment, a three component mixture may be fed to the microchannel distillation unit and three product streams may be removed. In this case, one component may be stripped from two others. A final section of the microchannel distillation unit may be used for the binary separation of the final constituents. In one embodiment, four or more components may be fed to the microchannel distillation unit. Each product stream may be removed at a different temperature than the others and as such may be represented by an outlet port corresponding to a different microchannel distillation section.

For some distillation applications, the feed stream F may be multi-phase and should be distributed sufficiently uniformly to the plurality of microchannels in the microchannel distillation unit. Multi-phase feed streams may be separated into single phase feed streams either external or internal of the microchannel distillation unit and subsequently each feed stream (gas or liquid) may be routed to the process gas or liquid flow path respectively. One method for separating the phases may include driving the two phase mixture into an annular flow regime, where the liquid flows along the walls and the gas flows along the center of the inlet, or internal flow chamber of the microchannel distillation unit. See, FIG. 23. The liquid stream may be retained along the walls of the inlet or internal flow chamber by the aid of a second set of capillary features that direct flow toward the process liquid flow stream. A first set of capillary features may be aligned with the process flow path where the distillation process occurs and are substantially orthogonal to the second set of capillary features used to aide the flow distribution of a two-phase feed.

The capillary features used for the inventive distillation process may be aligned with the direction of flow or aligned with an angle that is less than 90 degrees. The capillary features may be oriented vertically and run substantially parallel with the process liquid flow. The capillary features may align at an angle with the direction of flow. The angled capillary features may be connected in a manner that creates a continuous flow circuit in the vertical direction. The capillary features may be aligned laterally or orthogonal to the direction only if there are additional capillary features that connect the substantially horizontal capillary features such that there is a connected flow circuit in the vertical direction.

In an alternate embodiment, the two-phase feed mixture may be fed directly to the process gaseous flow path. The liquid present in the feed stream will diffuse to the flowing liquid retained within the first set of capillary features (or liquid removal structure or capture structure).

The method of distributing the two-phase flow may be selected through analysis of the relative mass fraction of gas to liquid in the feed stream. Feed streams that are primarily gaseous in nature (>60% by volume) may be manifolded and distributed as a gas. The design of the manifolding system may be such that the mixture flows in a regime that is not segregated, slugging, or stratified, but rather flows as a fine mist or droplets of liquid in a gas. The more homogeneous mixture may distribute as a gaseous stream where flow follows the lowest pressure drop path. Distribution features, including those disclosed in U.S. application Ser. No. 10/695, 400, filed Oct. 27, 2003, which is incorporated herein by reference, may be useful in distributing the gas-like flow stream.

If the two-phase feed stream is primarily a liquid (for example, greater than about 60% by volume liquid), then the flow distribution methodology may entrain fine gas bubbles within the liquid feed carrier flow stream. The more homogeneous mixture may be distributed again by controlling the pressure drop in each flow circuit or to each feed introduction point adjacent to the liquid removal structure (or first set of capillary features) in the process flow stream.

The two-phase mixture may be either homogenized to avoid segregation, stratification, slugging within the flow distribution network and prior to the introduction of feed to either the process gaseous or liquid flow path, or the two-phase feed mixture may be phase separated before or after entering the microchannel distillation unit. It is not recommended to distribute a slugging or chaotically stratified two-phase mixture along a flow network that feeds multiple parallel process microchannels.

As shown in FIG. 25, a homogeneous inlet feed F may be introduced through an inlet micro-manifold. This technique may be used to distribute or deliver feed to a plurality of parallel process microchannels. The homogeneous feed may be single phase, or an homogenized two-phase feed, where one phase is substantially uniformly distributed within the second phase to an appropriate extent such that the flow mixture follows steady-state predictions of pressure drop along the inlet micro-manifold. A spatially homogeneous mixture may be either mixed throughout the feed micromanifold, as in the case of gaseous bubbles dispersed in a liquid stream or fine liquid droplets or mist in a gaseous stream. A temporarily homogeneous feed mixture may by used. A temporarily homogeneous mixture may be defined as a spatially stratified two-phase flow stream that does not substantially fluctuate with time. In the latter case, the two-phase feed stream that flows in an annular flow regime, where liquid flows along the wall and gas along the micro-manifold center, may be considered a temporary-homogeneous feed stream. Local temporary variations in flow patterns of a two-phase stream may give rise to flow maldistribution, as in the case of a slug that forms and dissipates as it flows along the micro-manifold.

Figure 32:
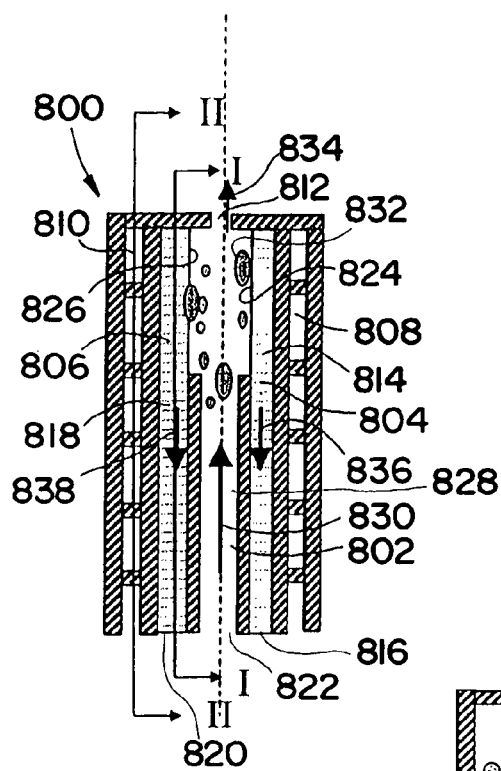
FIG. 32 is a schematic illustration of a microchannel condenser that can be used with the inventive process.
Figure 33:
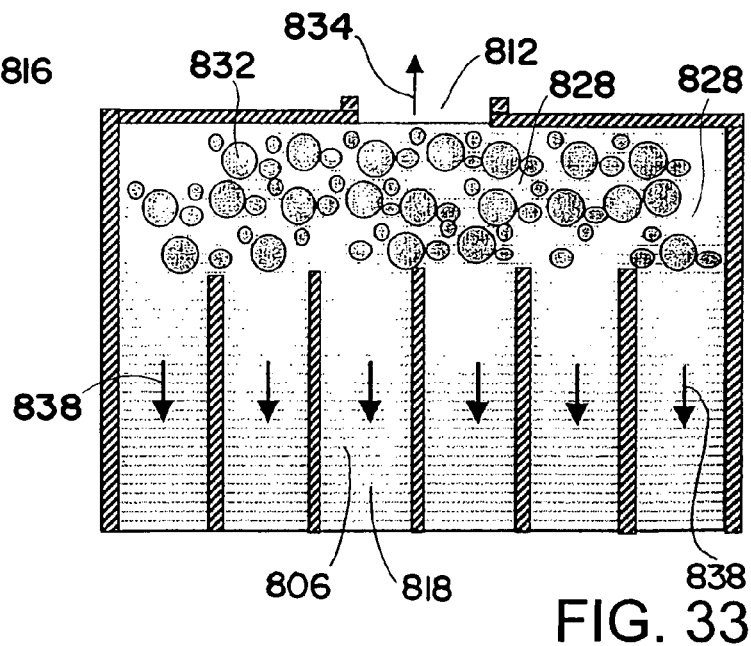
FIG. 33 is a schematic illustration of the microchannel condenser illustrated in FIG. 32 taken along line I-I in FIG. 32.
Figure 34:
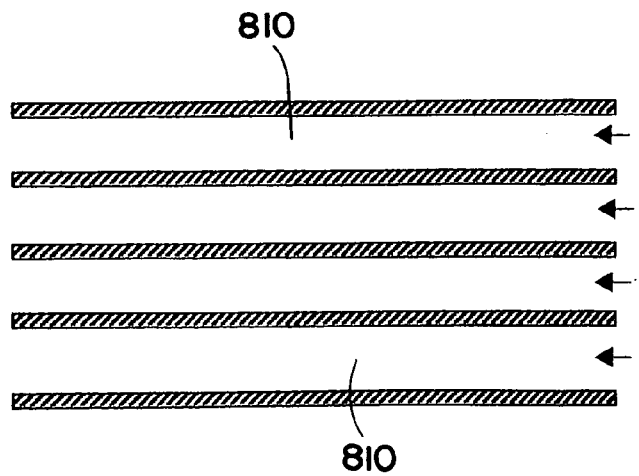
FIG. 34 is a schematic illustration of the microchannel condenser illustrated in FIG. 32 taken along line II-II in FIG. 32.

The microchannel condenser 120 illustrated in FIG. 1 or microchannel condenser 240 illustrated in FIGS. 2 and 3 may have the construction illustrated in FIGS. 32-34. Referring to FIGS. 32-34, microchannel condenser 800 comprises process microchannel 802, liquid channels 804 and 806, heat exchange channels 808 and 810, and outlet 812. Liquid channel 804 includes wicking region 814 and outlet 816, and liquid channel 806 includes wicking region 818 and outlet 820. Process microchannel 802 is positioned between liquid channels 804 and 806. Heat exchange channels 808 are adjacent to liquid channel 804. Heat exchange channels 810 are adjacent to liquid channel 806. Process microchannel 802 includes inlet 822 for permitting vapor to flow into the process microchannel 802, and outlets 824 and 826 for permitting condensed vapor to flow from microchannel 802 into wicking regions 814 and 818, respectively. In operation, vapor 828 flows through inlet 822 into process microchannel 802 in the direction indicated by arrow 830 and condenses to form condensed vapor 832 which may be referred to as the distillate product D. Heat exchange fluid flows through heat exchange channels 808 and 810 in a direction that is crosscurrent relative to the flow of vapor in the process microchannel 802. Part or all of the condensed vapor may flow through outlet 812, as indicated by arrow 834. The remaining condensed vapor may flow through outlets 824 and 826 into wicking regions 814 and 818, respectively. The distillate product flowing in the wicking regions 814 and 818 flows in the direction indicated by arrows 836 and 838 through outlets 816 and 820, respectively.

Figure 35:
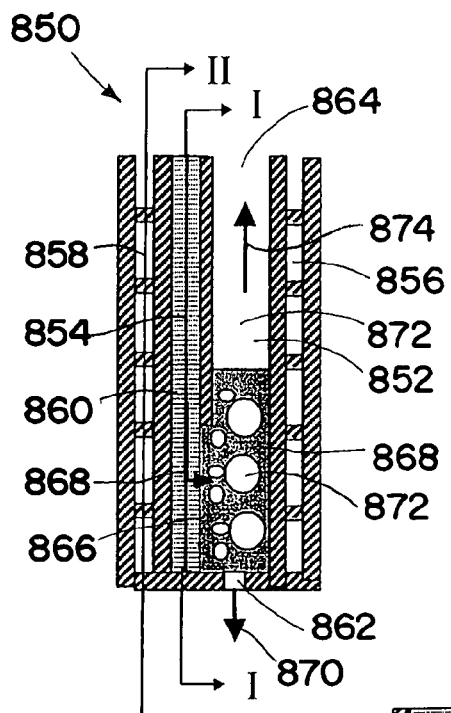
FIG. 35 is a schematic illustration of a microchannel reboiler that can be used with the inventive process.
Figure 36:
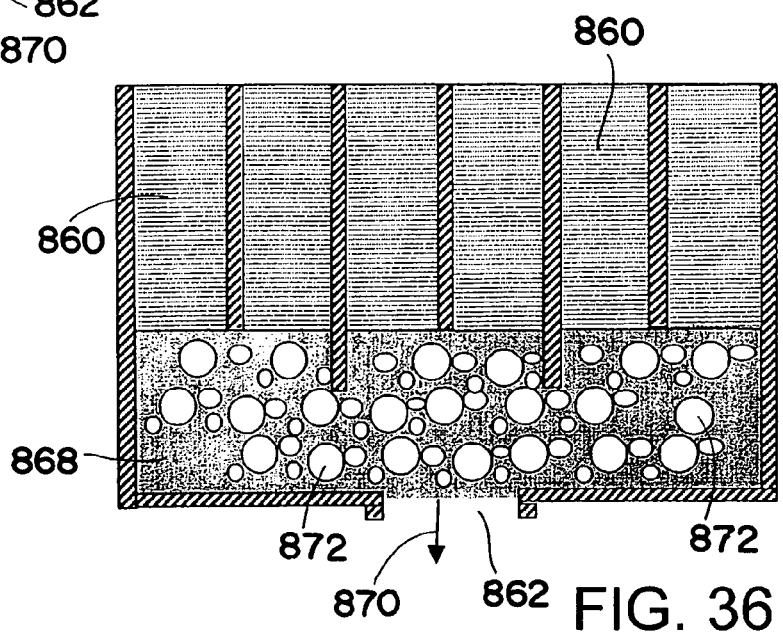
FIG. 36 is a schematic illustration of the microchannel reboiler illustrated in FIG. 35 taken along line I-I in FIG. 35.
Figure 37:
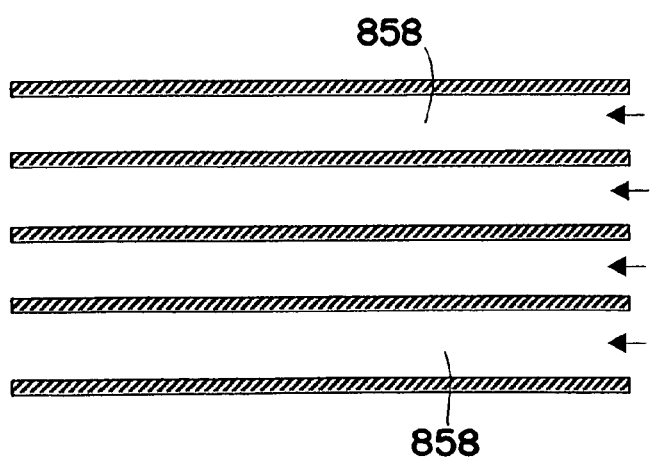
FIG. 37 is a schematic illustration of the microchannel reboiler illustrated in FIG. 35 taken along line II-II in FIG. 35.

The microchannel reboiler 130 illustrated in FIG. 1 or microchannel reboiler 270 illustrated in FIGS. 2 and 3 may have the construction illustrated in FIGS. 35-37. Referring to FIGS. 35-37, microchannel reboiler 850 comprises process microchannel 852, liquid channel 854, and heat exchange channels 856 and 858. Liquid channel 854 includes wicking region 860. Process microchannel 852 is positioned between liquid channel 854 and heat exchange channels 856. Heat exchange channels 858 are adjacent to liquid channel 854. Process microchannel 852 includes outlets 862 and 864, and inlet 866. In operation, liquid 868 flows through wicking region 860 to inlet 866, and through inlet 866 into process microchannel 852, as indicated by arrow 868. Heat exchange fluid flows through heat exchange channels 856 and 858 in a direction that is crosscurrent relative to the flow of liquid through the wicking region 860. Part or all of the liquid 868, which is in the form of bottoms product B, may flow through outlet 862, as indicated by arrow 870. The remainder of the bottoms product B may be vaporized. The vapor 872 flows through process microchannel 852 in the direction indicated by arrow 874 and out of process microchannel 852 through outlet 864.

Figure 38:
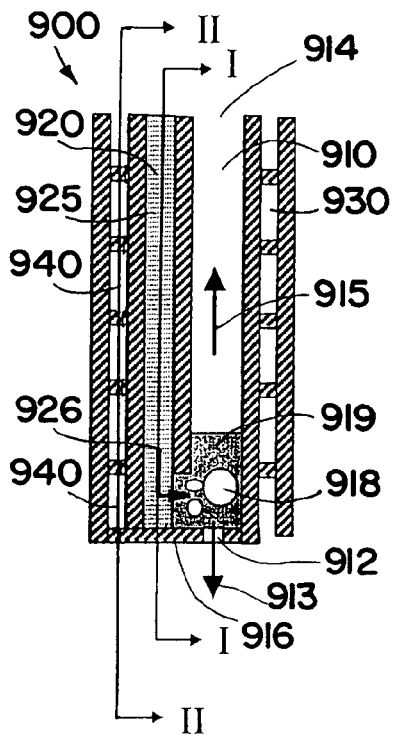
FIG. 38 is a schematic illustration of an alternate embodiment of a microchannel reboiler that can be used with the inventive process.
Figure 39:
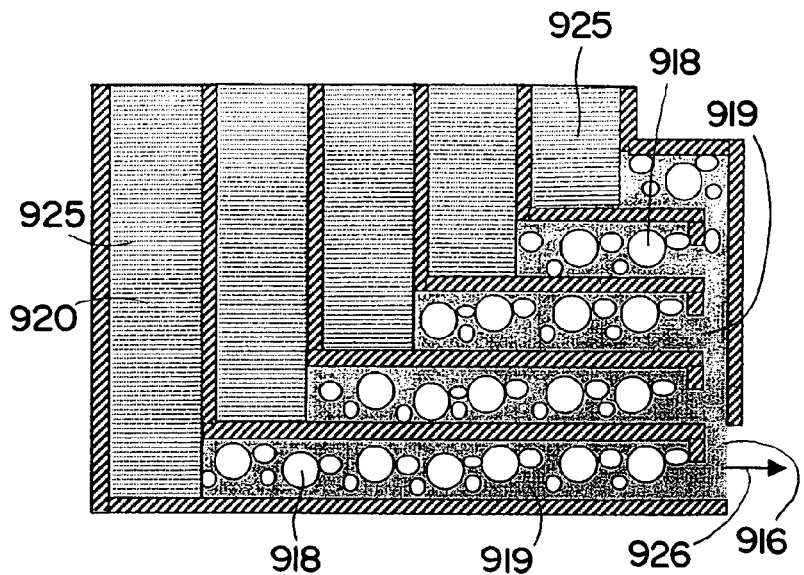
FIG. 39 is a schematic illustration of the microchannel reboiler illustrated in FIG. 38 taken along line I-I in FIG. 38.
Figure 40:
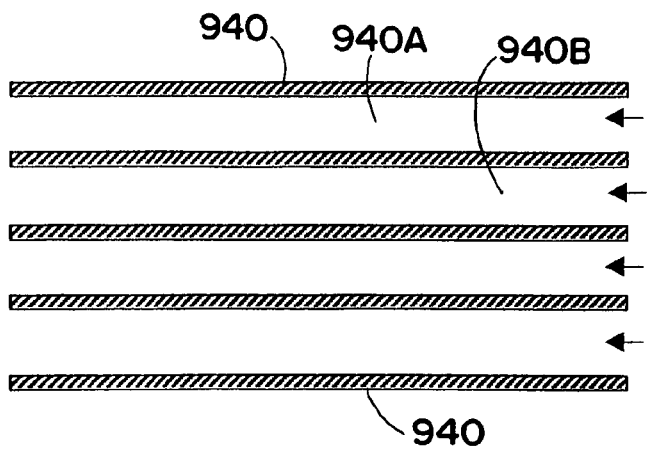
FIG. 40 is a schematic illustration of the microchannel reboiler illustrated in FIG. 38 taken along line II-II in FIG. 38

An alternate embodiment of the microchannel reboiler 130 illustrated in FIGS. 38-40 or microchannel reboiler 270 illustrated in FIGS. 2 and 3 and the microchannel reboiler 690 illustrated in FIG. 19 is disclosed in FIGS. 38-40. Referring to FIGS. 38-40, microchannel reboiler 900 comprises process microchannel 910, liquid channel 920, and heat exchange channels 930 and 940. Liquid channel 920 includes wicking region 925. Process microchannel 910 is positioned between liquid channel 920 and heat exchange channels 930. Heat exchange channels 940 are adjacent to liquid channel 920. Process microchannel 910 includes outlets 912 and 914, and inlet 916. In operation, liquid 919 flows through wicking region 925 to inlet 916, and through inlet 916 into process microchannel 910, as indicated by arrow 926. Heat exchange fluid flows through heat exchange channels 930 and 940 in a direction that is crosscurrent relative to the flow of liquid through the wicking region 925. Part or all of the liquid 919, which is in the form of bottoms product B, may flow through outlet 912, as indicated by arrow 913. The remainder of the bottoms product B may be vaporized. The vapor 918 flows through process microchannel 910 in the direction indicated by arrow 915 and out of process microchannel 910 through outlet 914.

The microchannel condenser and microchannel reboiler as components of the inventive microchannel distillation unit can be integrated into the manifolds (header and footer) of the microchannels and liquid channels. An example of manifolding with an integrated microchannel reboiler is shown in FIGS. 35-37. The liquid from the last section of the liquid channel (stream 636 in FIG. 19) flows into the footer/reboiler section at the unit end and is heated by the heat exchange channels 856 and 858. Vapor is formed and flows upwards, as indicated by arrow 874, back into the microchannels via buoyancy. Part of the liquid is drained through the common outlet 862 at the bottom as the bottoms product so that a splitting of boil-up ratio can be controlled by the flow conditions and configuration of the microchannel reboiler. Another example is illustrated in FIGS. 38-40 where the common outlet of the process channels' footer is located at the side. To prevent carryover of the vapor by the liquid to be drained as product, an extruded edge may be made at the end of each horizontal separation wall. As the heat transfer area is different from channel to channel in a single layer of the unit, the duty of the reboiler microchannel may have to be different. For example, the duty in heat exchange channel 940A may have to be higher than in channel 940B, as horizontal channel 940A is shorter than 940B. Control of the duty in an individual microchannel reboiler heat exchange channel can be made by changing flow rate, inlet temperature and/or pressure.

The manifold (header) may be located at the end of the unit (FIGS. 32-34) where vapor is cooled and partly condensed by the integrated microchannel condenser. The condensation occurs on the wicking structure surface as heat is removed from the wick by the integrated condenser. The condensate may be enriched in the less volatile component and is sucked in by the wicking structure and transported along the liquid channel. The uncondensed vapor leaves the outlet of the manifold so that a reflux is realized. The reflux ratio can be controlled by controlling the duty of the microchannel condenser.

Each of the process microchannels (e.g., process microchannels 410, 610, etc.) may have a cross section that has any configuration, for example, square, rectangular, circular, oval, trapezoidal, etc. Each of these process microchannels has at least one internal dimension of height or width of up to about 10 mm, and in one embodiment from about 0.05 to about 10 mm, and in one embodiment about 0.001 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.5 mm. The other internal dimension of height or width may be of any value, for example, it may range from about 0.01 cm to about 10 cm, and in one embodiment from about 0.01 to about 1 cm, and in one embodiment from about 0.1 to about 1 cm. The length of each of the process microchannels may be of any value, for example, it may range from about 1 to about 200 cm, and in one embodiment about 1 to about 50 cm, and in one embodiment about 2 to about 10 cm.

The height of each microchannel distillation section (e.g., microchannel distillation sections 220, 450, 670, etc.) may be in the range from about 0.1 to about 1000 mm, and in one embodiment from about 1 to about 100 mm.

The height of each of the microchannel distillation sections 510 and 510a for microchannel distillation unit 500 from one vapor inlet/outlet to the next, for example, from inlet/outlet 550 to inlet/outlet 552, may be in the range from about 0.1 to about 1000 mm, and in one embodiment about 1 to about 100 mm.

The interior walls (e.g., 451 and 671) of the process microchannel (e.g., 410 and 610) may be formed of a material that is suitable for establishing a wetted wall. These materials enhance the adherence of the liquid phase to it as the liquid flows along the interior wall as a thin film. Examples of useful materials include steel (e.g., carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; telflex; or a combination of two or more thereof. The wetted wall material may be in the form of a coating or layer of one of the foregoing materials on the surface of microchannel wall, the coating or layer having a thickness of about 0.1 to about 500 microns, and in one embodiment about 0.1 to about 250 microns, and in one embodiment about 0.1 to about 100 microns, and in one embodiment about 0.1 to about 50 microns, and in one embodiment about 0.1 to about 10 microns. In one embodiment, the interior wall may be partially wetted with intermittent or continuous non-wetted portions. The thin film flowing along the interior wall may have a thickness of about 0.1 to about 500 microns, and in one embodiment about 0.1 to about 250 microns, and in one embodiment about 0.1 to about 150 microns, and in one embodiment about 0.1 to about 75 microns, and in one embodiment about 1 to about 50 microns.

The liquid channels (e.g., 430 and 630) may comprise microchannels although they may have larger dimensions that would not characterize them as microchannels. Each of these channels may have a cross section that has any configuration, for example, square, rectangular, circular, oval, trapezoidal, etc. Each liquid channel may have an internal dimension of height or width in the range up to about 10 mm, and in one embodiment about 0.05 to about 10 mm, and in one embodiment about 0.05 to about 5 mm, and in one embodiment from about 0.05 to about 2 mm, and in one embodiment from about 0.5 to about 1 mm. The other internal dimension may be in the range from about 1 mm to about 100 mm, and in one embodiment about 5 mm to about 50 mm, and in one embodiment about 10 mm to about 20 mm. The length of the liquid channels may be in the range from about 1 cm to about 200 cm, and in one embodiment about 1 cm to about 50 cm, and in one embodiment about 2 to about 10 cm. The separation between each microchannel (eg., 410, 610) and the next adjacent liquid channel (eg., 430, 630) may be in the range from about 0.05 mm to about 5 mm, and in one embodiment about 0.2 mm to about 2 mm.

The capture structures may comprise any structure that captures liquid and permits vapor to flow through it. Alternatively, the capture structure may not permit vapor flow throughout but be aligned adjacent to the vapor flow. The capture structures may comprise a wire mesh or projecting surface features or cones. The capture structure may comprise inverted cones, liquid-nonwetting porous structures, liquid-wetting porous structures, and/or fibers such as found in demisters or filter media. The capture structure may comprise one or more of sintered metal, metal screen, metal foam, and polymer fibers. Mechanisms for capturing dispersed liquid particles include impingement (due to flow around obstructions), Brownian capture (long residence time in high surface area structure), gravity, centrifugal forces (high curvature in flow), or incorporating fields, such as electrical or sonic fields, to induce aerosol particle motion relative to the flow field.

In one embodiment, the capture structures may comprise perforated foil, for example, a perforated foil in the form of expanded tetrahedrally configured filaments. Examples include Delker expanded screens such as 10 AL 16-125 P and 5 Cu 14-125 P. These screens can have one or two orders of magnitude higher permeability than conformist woven screens. In addition, aluminum, copper, and other metal forms of these screens have relatively high thermal conductivities and also enhance heat transfer.

Another use for the capture structure may be to enhance heat transfer. If the capture structure has a high thermal conductivity, it can act as an extended surface for heat transfer. By being in thermal contact with heat exchange channels, the capture structure may promote heat transfer between the heat exchange channel and the liquid and vapor phases in the microchannel distillation unit.

The wicking region may comprise a wick and/or a wicking surface. The wicking region may preferentially retain a wetting fluid by capillary forces. The wicking region may comprise multiple continuous channels or grooves through which liquids may travel by capillary flow. The channels or grooves may be regularly or irregularly shaped. Liquid may migrate through a dry wick, while liquid in a liquid-containing wick can be transported by gravitational force or by applying a pressure differential, to the wick. The capillary pore size in the wicking material may be selected based on the contact angle of the liquid, the intended pressure gradient within the liquid channel and the surface tension of the liquid.

The wick in the wicking region may be made of different materials depending on the liquid that is intended to be transported through the wicking region. The wicking material may be a uniform material, a mixture of materials, a composite material, or a gradient material. For example, the wicking material may be graded by pore size or wettability to help drain liquid in a desired direction. Examples of wicking materials that may be used include: sintered metals, metal screens, metal foams, polymer fibers including cellulosic fibers, as well as other wetting porous materials. The capillary pore or opening sizes in the wicking materials may be in the range of about 10 nm to about 2 mm, and in one embodiment about 100 nm to about 0.1 mm, where these sizes are the largest pore diameters in the cross-section of the wicking material observed by scanning electron microscopy (SEM). The wicking region may comprise a wicking surface formed on one or more interior walls of the process microchannels or liquid channels. The wicking surface may comprise one or a plurality of grooves formed in one or more interior walls of the liquid channels. The grooves may be formed in the wall separating the liquid channel and the next adjacent process microchannel and/or heat exchange channel. The grooves may be used to assist with liquid capture and/or enhance heat transfer. The grooves may be straight or have tortuous configurations. The grooves may have serpentine configurations. The grooves may be tapered. The grooves may be hemispherical. The grooves may be formed using any suitable technique including etching, sawing, electrodischarge machining, etc. The grooves may be of any length. The grooves may have a depth of about 1 to about 1000 microns, and in one embodiment about 10 to about 500 microns. The grooves may have a width of about 1 to about 1000 microns, and in one embodiment about 10 to about 100 microns. The number of grooves in the wicking region may be in the range from 1 to about 1000 grooves per centimeter as measured across the widths of the grooves, and in one embodiment from 1 to about 100 grooves per centimeter. In one embodiment, the grooves may have a constant or decreasing width from the top to the bottom of the grooves. In one embodiment, the grooves may form a mouth to larger diameter pores for liquid transport. Liquid may migrate through the grooves as a result of capillary flow. The flow of liquid in the grooves may be parallel (co-current or counter-current) or tangential (cross-current) to the flow of vapor in the adjacent process microchannels. The grooves may be oriented to direct the flow of liquid within the liquid channels and/or direct the flow of liquid between microchannel distillation sections. The grooves may be used to manifold the liquid from one microchannel distillation section to another microchannel distillation section. The microchannel distillation sections may be connected through the grooves in parallel or series, upstream or downstream from one another.

In one embodiment, the wicking region may comprise a wick positioned within the process microchannel or the liquid channel and a wicking surface (e.g., grooves) formed in one or more of the interior walls of the process microchannel or liquid channel.

Figure 27:
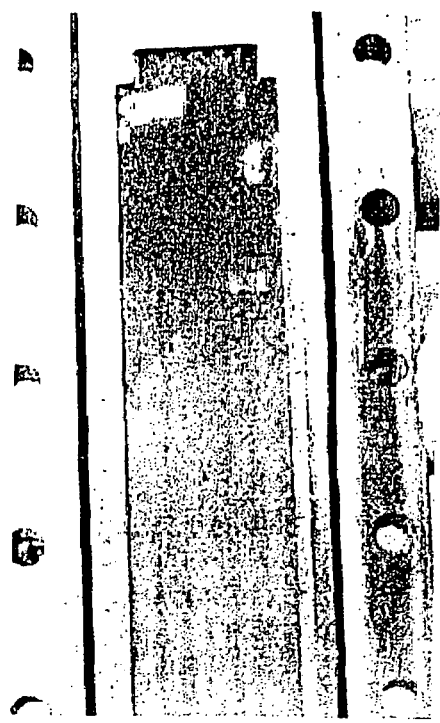
FIG. 27 is a photograph of a wicking region that can be used in accordance with the inventive process, the wicking region comprising a wire mesh that is resistance welded to the surface of a process microchannel wall.

In one embodiment, the wicking region may comprise a wire mesh that is resistance welded to the interior surface of a process microchannel or liquid channel wall (FIG. 27).

Figure 28:
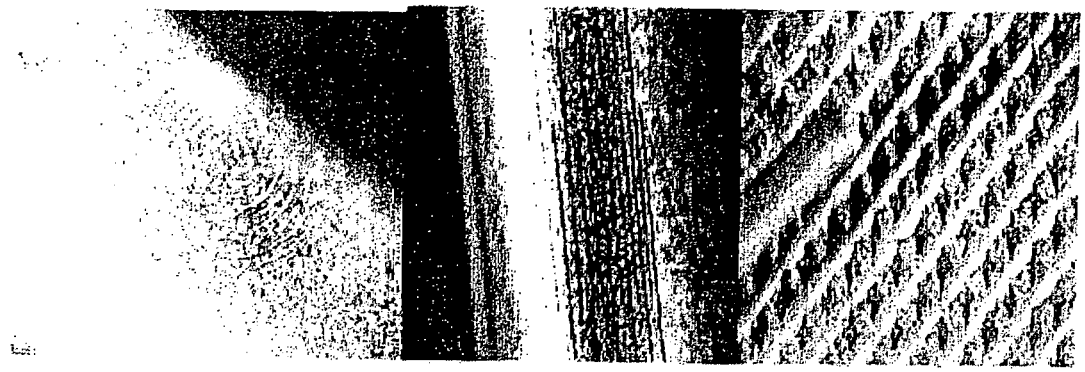
FIG. 28 is a photograph of a wicking region that can be used in accordance with the inventive process, the wicking region comprising a plurality of thin, laser etched channels that can be formed in shims used in making the process microchannels for the inventive process.

In one embodiment, the wicking region may comprise a plurality of thin, laser etched or otherwise formed channels that can be formed in shims used in making the process microchannels for the microchannel distillation units (FIG. 28).

In operation, the wicking region may be filled with liquid. When wet or saturated, the wick transports liquid through porous flow passages to a lower pressure zone, such as a lower pressure created by suction.

Punctured and punctured/expanded foils may be used as the wicking material in the wicking region and/or as capture structures. Useful foils include Ultra Thin MicroGrid Precision-Expanded Foils, available from Delker Corporation. These materials are made in a flattened form and a three-dimensional expanded form. Although similar to conventional wire mesh screens, these materials are made from a single thin sheet by punching an array of holes while pulling the material. In the flattened form the holes are an array of diamonds. In the expanded form, the filaments are in a regular tetrahedral configuration. These materials can be made in thicknesses as small as about 0.0015 inch (1.5 mil) and from a variety of metals, including copper, aluminum and nickel.

Fresnel lenses may be used as the wicking material. Wicks that have microchannels having depths of less than about 100 microns, and in one embodiment about 50 to about 100 microns may be used to promote rapid mass transfer.

The wicking region may be prepared by laser machining grooves into a ceramic tape in the green state. These wicks can be made, for example, with grooves less than 50 microns deep with openings less than 100 microns wide. These grooves typically have a rectangular shape. Ceramic wicks have a high surface energy, are chemically inert, and have high temperature stability. Another material that may be used is an intermetallic formed from two or more metals placed in intimate contact during a bonding process and which combine to form an alloy, compound, or metal solution. Useful intermetallics have properties similar to the ceramic materials. An advantage of engineered structures is fine control of the length-scale for mass transfer in the liquid phase which is desirable for distillation.

In one embodiment, the wicking region may not be permitted to dry out during operation since this could result in vapor escaping through the wicking region. One approach to avoid vapor intrusion into the wicking region may be to add a flow restriction in capillary contact with the wick structure entrance, such as a porous structure with a smaller pore size than the wick structure and limiting the magnitude of the suction pressure such that the non-wetting phase(s) cannot displace the wetting phase from the flow restriction. This type of flow restriction may be referred to as a pore throat. In one embodiment, a pore throat may be provided between the wicking region and the liquid outlets (e.g., 454, 674) and/or liquid inlets (eg., 456, 676).

A heat exchanger may be used for cooling, heating or both cooling and heating. The heat exchanger may comprise one or more heat exchange channels, electric heating elements, resistance heaters and/or non-fluid cooling elements. These may be adjacent to the process microchannels. In one embodiment, the heat exchanger may not be in contact with or adjacent to the process microchannels, but rather may be remote from the process microchannels. In one embodiment, the heat exchanger may exchange heat with some but not all of the process microchannels. In one embodiment, the heat exchanger may exchange heat with some but not all of the microchannel distillation sections. In one embodiment, a single heat exchange channel may be used to heat or cool two or more, for example, two, three, four, five, six, eight, ten, twenty, etc., process microchannels. The electric heating element, resistance heater and/or non-fluid cooling element may be used to form one or more walls of the process microchannels. The electric heating element, resistance heater and/or non-fluid cooling element may be built into one or more walls of the process microchannels. The electric heating elements and/or resistance heaters may be thin sheets, rods, wires, discs or structures of other shapes embedded in the walls of the process microchannels. The electric heating elements and/or resistance heaters may be in the form of foil or wire adhered to the process microchannel walls, liquid channel walls, and/or vapor channel walls. Heating and/or cooling may be effected using Peltier-type thermoelectric cooling and/or heating elements. Multiple heating and/or cooling zones may be employed along the length of the process microchannels. Similarly, multiple heat exchange fluids at different temperatures may be employed along the length of the process microchannels. The heat exchanger may be used to provide precise temperature control within the process microchannels. The heat exchanger may be used to provide a different operating temperature for each microchannel distillation section.

Figure 31:
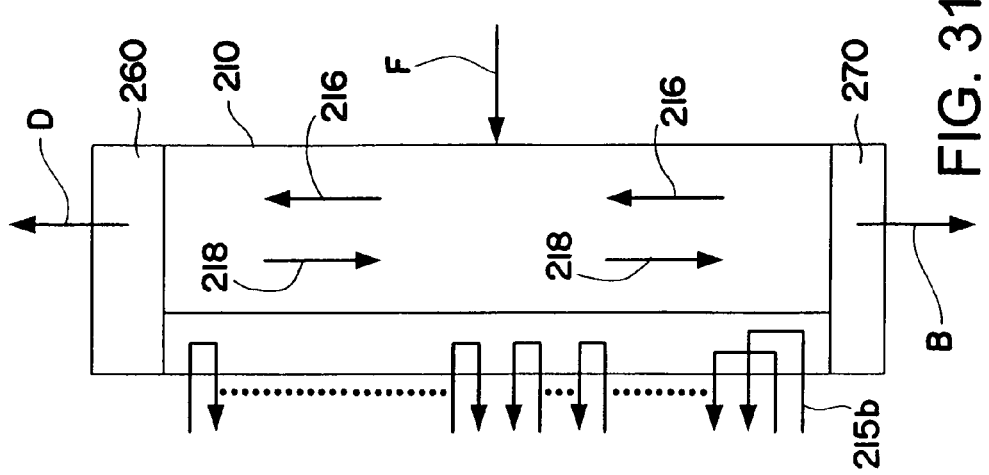
FIG. 31 is a schematic illustration of a microchannel distillation unit which can be used in accordance with the inventive process, the microchannel distillation unit comprising a process microchannel and an adjacent heat exchange channel, the heat exchange channel comprising separate heat exchange zones wherein separate heating or cooling loops are used to heat or cool the separate heat exchange zones, some of the heating or cooling loops being nested with other heating or cooling loops.
Figure 30:
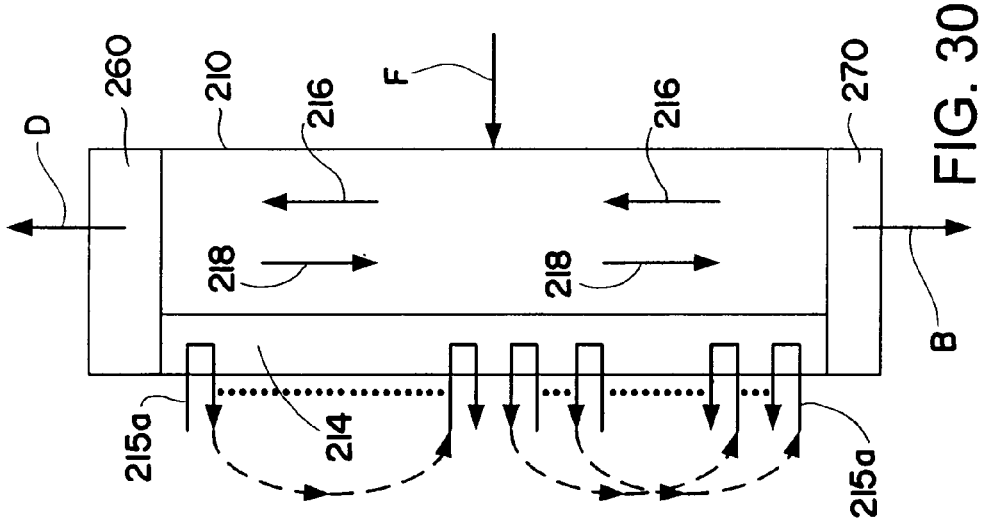
FIG. 30 is a schematic illustration of a microchannel distillation unit which can be used in accordance with the inventive process, the microchannel distillation unit comprising a process microchannel and an adjacent heat exchange channel, the heat exchange channel comprising separate heat exchange zones wherein separate heating or cooling loops are used to heat or cool the separate heat exchange zones, the outlets of some of the heating or cooling loops being used as feed for other heating or cooling loops.
Figure 29:
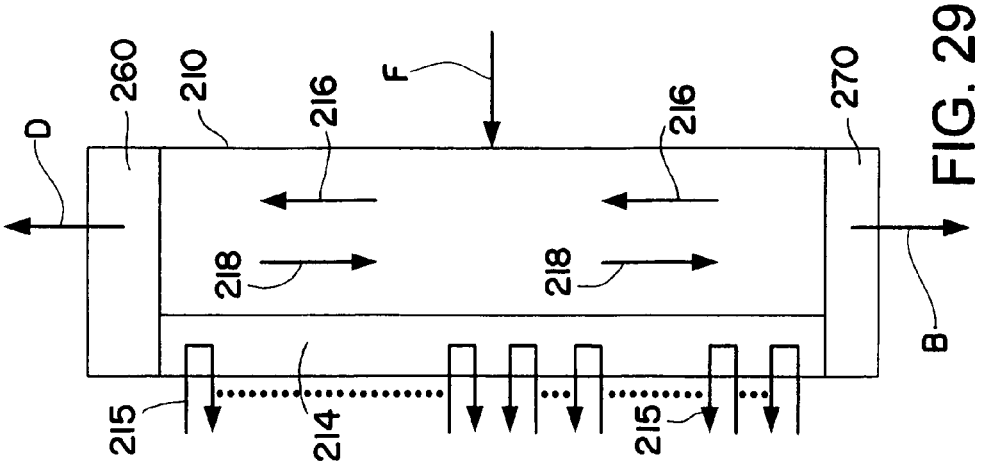
FIG. 29 is a schematic illustration of a microchannel distillation unit which can be used in accordance with the inventive process, the microchannel distillation unit comprising a process microchannel and an adjacent heat exchange channel, the heat exchange channel comprising separate heat exchange zones wherein separate heating or cooling loops are used to heat or cool the separate heat exchange zones.

Cooling and/or heating elements in the heat exchange channels may be used to provide varying temperatures along the length of the microchannel distillation units. This is illustrated in FIGS. 29-31. These figures show various embodiments for cooling and/or heating the microchannel distillation columns or apparatuses, for example, the columns or apparatuses 210 illustrated in FIGS. 2, 3 and 12. These cooling and/or heating elements are also applicable to the other microchannel distillation units disclosed herein. The cooling and/or heating elements may be in the form of separate heating and/or cooling (e.g., refrigerant) loops 215 (FIG. 29), loops using the outlets of other loops 215*a* as feed (FIG. 30), and/or nested loops 215*b* (FIG. 31).

The heat exchange channels may be microchannels although they may have larger dimensions that would not characterize them as microchannels. Each of the heat exchange channels may have an internal dimension of height or width of up to about 10 mm, and in one embodiment about 0.05 to about 10 mm, and in one embodiment about 0.05 to about 5 mm, and in one embodiment from about 0.05 to about 2 mm, and in one embodiment from about 0.5 to about 1 mm. The other internal dimension may be of any value, for example, from about 1 mm to about 50 cm, and in one embodiment about 1 mm to about 10 cm, and in one embodiment about 5 mm to about 5 cm. The length of the heat exchange channels may be of any value, for example, from about 5 mm to about 200 cm, and in one embodiment about 1 cm to about 200 cm, and in one embodiment about 1 cm to about 50 cm, and in one embodiment about 2 cm to about 10 cm. The separation between each process microchannel or liquid channel or vapor channel and the next adjacent heat exchange channel may range from about 0.05 mm to about 5 mm, and in one embodiment about 0.2 mm to about 2 mm.

The microchannel distillation columns or apparatuses (e.g., 110, 210, 310) may have rectangular cross sections and be aligned in side-by-side vertically oriented interleaved planes or horizontally oriented interleaved stacked planes. These planes can be tilted at an inclined angle from the horizontal. These configurations may be referred to as parallel plate configurations. An array of these rectangular channels can be easily arranged in a compact unit for scale-up.

The flow rate of the vapor phase flowing through the microchannel distillation units may be in the range from about 0.001 to about 10,000 liters per minute (lpm), and in one embodiment about 0.01 to about 2000 lpm, and in one embodiment about 0.1 to about 20 lpm. The velocity of the vapor phase flowing through these channels may be in the range from about 0.001 to about 100 meters per second (m/s), and in one embodiment about 0.01 to about 50 m/s, and in one embodiment about 0.1 to about 20 m/s. The Reynolds Number for the vapor phase flowing through these channels may be in the range from about 100 to about 50,000 and in one embodiment about 1 to about 5,000. The pressure within these channels may be in the range from about 0.01 to about 1,000 atmospheres, and in one embodiment about 0.01 to about 100 atmospheres, and in one embodiment from about 30 to about 100 atmospheres, and in one embodiment about 50 to about 100 atmospheres.

The flow rate of the liquid phase flowing in the microchannel distillation sections (e.g., 450, 670) may be in the range from about 0.00001 to about 10 lpm, and in one embodiment about 0.001 to about 0.1 lpm. The velocity of the thin film flowing in the distillation sections may range from about 0.0001 to about 5 m/s, and in one embodiment about 0.001 to about 2 m/s, and in one embodiment about 0.01 to about 1 m/s. The Reynolds Number for the thin film flowing in the distillation sections may range from about 0.01 to about 5000 and in one embodiment about 0.1 to about 1000, assuming the hydraulic diameter of the film is defined as the average film thickness.

The flow rate of the liquid phase flowing through the wicking region in the liquid channels may be in the range from about 0.0001; to about 1 lpm, and in one embodiment about 0.001 to about 0.1 lpm. The velocity of the liquid phase flowing through the liquid channels may be in the range from about 0.0001 to about 5 m/s, and in one embodiment about 0.001 m/s to about 2 m/s. The Reynolds Number for the liquid phase flowing through the liquid channels may be in the range from about 0.01 to about 5,000 and in one embodiment about 1 to about 2,400. Superfacial velocity may be used to define liquid velocity. The pressure within the wicking region in the liquid channels may be in the range of about 0.01 to about 1,000 atmospheres, and in one embodiment about 0.01 to about 200 atmospheres. The pressure differential across the wicking region may range from about 0.0001 to about 10 atmospheres, and in one embodiment about 0.0001 to about 1 atmospheres.

The gas to liquid Reynolds number may be in the range from about $500\times$(Suratmann Number)$^{-0.67}$ to about $4500\times$(Suratmann Number)$^{-0.67}$.

The heat exchange fluid entering the heat exchange channels may have a temperature of about $-190°$ C. to about $600°$ C., and in one embodiment about $-100°$ C. to about $200°$ C. The heat exchange fluid exiting the heat exchange channels may have a temperature in the range of about $-100°$ C. to about $300°$ C., and in one embodiment about $-50°$ C. to about $250°$ C. The pressure drop for the heat exchange fluid as it flows through the heat exchange channels may range from about 0.0001 to about 5 atmospheres per meter of length of the heat exchange channel (atm/m), and in one embodiment from about 0.001 to about 1 atm/m. The Reynolds Number for the flow of heat exchange fluid flowing through the heat exchange channels may be in the range from about 1 to about 100,000, and in one embodiment about 200 to about 10,000.

The heat exchange fluid may be any fluid. These include air, steam, liquid water, gaseous nitrogen, liquid nitrogen, other gases including inert gases, carbon monoxide, molten salt, oils such as mineral oil, and heat exchange fluids such as Dowtherm A and Therminol which are available from Dow-Union Carbide. The heat exchange fluid may comprise one or more of the liquids or liquid mixtures being separated.

In one embodiment, the heat exchange channels comprise process channels wherein an endothermic or exothermic process is conducted. These heat exchange process channels may be microchannels. Examples of endothermic processes that may be conducted in the heat exchange channels include steam reforming and dehydrogenation reactions. In one embodiment, the incorporation of a simultaneous endothermic reaction to provide an improved heat sink may enable a typical heat flux of roughly an order of magnitude or more above the convective cooling heat flux. Examples of exothermic processes that may be conducted in the heat exchange channels include water-gas shift reactions, methanol synthesis reactions and ammonia synthesis reactions.

In one embodiment, the heat exchange fluid undergoes a phase change as it flows through the heat exchange channels. This phase change provides additional heat addition or removal from the process microchannels or liquid channels beyond that provided by convective heating or cooling. For a liquid heat exchange fluid being vaporized, the additional heat being transferred would result from the latent heat of vaporization required by the heat exchange fluid. An example of such a phase change would be an oil or water that undergoes boiling. In one embodiment, the heat exchange fluid boils or undergoes partial boiling in the heat exchange channels. In one embodiment, the amount of heat exchange fluid boiling in the heat exchange channels may be in the range from about 1 to about 99% by volume of the total amount of heat exchange fluid in the heat exchange channel, and in one embodiment about 5 to about 50% by volume.

The heat flux for convective heat exchange or convective heating in the microchannel distillation unit may range from about 0.01 to about 125 watts per square centimeter of surface area of the process microchannels (W/cm$^2$) in the microchannel distillation unit, and in one embodiment from about 0.1 to about 50 W/cm$^2$, and in one embodiment from about 1 to about 25 W/cm$^2$, and in one embodiment from about 1 to about 10 W/cm$^2$. The heat flux for phase change heat exchange may range from about 1 to about 250 W/cm$^2$, and in one embodiment, from about 1 to about 100 W/cm$^2$, and in one embodiment from about 1 to about 50 W/cm$^2$, and in one embodiment from about 1 to about 25 W/cm$^2$, and in one embodiment from about 1 to about 10 W/cm$^2$.

In one embodiment, each microchannel distillation section (e.g., microchannel distillation sections 450 or 670) may be operated at or near isothermal conditions. That is, the temperature within each microchannel distillation section may be maintained at a level that varies by no more than about 5° C., and in one embodiment no more than about 2° C. In one embodiment, the temperature in each microchannel distillation section, microchannel condenser, and/or microchannel reboiler may be controlled by employing partially boiling heat exchange fluids in the heat exchange channels adjacent to the microchannel distillation sections, microchannel condenser and/or microchannel reboiler. The heat exchange channels may be divided into separate heat exchange channel zones. The heat exchange channel zones within each heat exchange channel may be formed by dividing the heat exchange channel into separate heat exchange channel zones using passive structures (i.e., obstructions), orifices at the inlet and outlet of each heat exchange channel zone, and/or by using mechanisms that control the flow rate and/or pressure of the heat exchange fluid in each of the heat exchange channel zones. Each heat exchange channel may be divided into any number of separate heat exchange channel zones, for example, from 2 to about 2000 heat exchange channel zones, and in one embodiment from 2 to about 200 heat exchange channel zones. Each of the heat exchange channel zones may provide heat exchange with any number of microchannel distillation sections. The number of microchannel distillation sections exchanging heat with each heat exchange channel zone may be in the range from 1 to about 100, and in one embodiment from 1 to about 10. In one embodiment, each microchannel distillation section exchanges heat with a separate heat exchange channel zone. The pressure within each heat exchange channel zone may be controlled using the foregoing passive structures, orifices and/or mechanisms. By controlling the pressure within each heat exchange channel zone, the temperature within each heat exchange channel zone can be controlled. A higher inlet pressure for each heat exchange fluid may be used where the passive structures, orifices and/or mechanisms let down the pressure to the desired heat exchange channel zone pressure. By controlling the temperature within each heat exchange channel zone, the temperature in the adjacent microchannel distillation section or sections can be controlled. Thus, for example, each microchannel distillation section may be operated at a desired temperature by employing a specific pressure in the heat exchange channel zone adjacent to the microchannel distillation section. This provides the advantage of precisely controlled temperatures for each microchannel distillation section. The use of precisely controlled temperatures for each microchannel distillation section provides the advantage of a tailored temperature profile and an overall reduction in the energy requirements for the distillation process. In one embodiment, this process may approach the energy requirements for a reversible distillation process.

The vapor phase and the liquid phase may contact each other in each microchannel distillation sections (e.g., microchannel distillation sections 220, 450 or 670) for a sufficient period of time to achieve at least about 25% by volume of the equilibrium composition for the fluid mixture being treated, and in one embodiment at least about 50% by volume, and in one embodiment at least about 70% by volume. The contact time for the contacting of the vapor and the liquid within each microchannel distillation section may be in the range from about 1 to about 200 milliseconds (ms), and in one embodiment from about 1 to about 10 ms.

The microchannel distillation assemblies, microchannel distillation columns or apparatuses, microchannel distillation units, microchannel condensers and microchannel reboilers may be made of any material that provides sufficient strength, dimensional stability and heat transfer characteristics to permit the operation of the inventive process. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; silicon carbide; boron carbide; metal carbides such as aluminum carbide; silicon nitride; boron nitride; metal nitrides such as aluminum nitride; or a combination of two or more thereof. The microchannel distillation units may be fabricated using known techniques including wire electrodischarge machining, conventional machining, laser cutting, photochemical machining, electrochemical machining, molding, water jet, stamping, etching (for example, chemical, photochemical or plasma etching) and combinations thereof. The microchannel distillation units may be constructed by forming sheets or layers of material with portions removed that allow flow passage. A stack of sheets may be assembled via diffusion bonding, laserwelding, diffusion brazing, and similar methods to form an integrated device. The microchannel distillation units may be assembled using a combination of sheets or laminae and partial sheets or strips. In this method, the channels or void areas may be formed by assembling strips or partial sheets to reduce the amount of material required. The assembly method may include the addition of wicking structures held adjacent to the liquid channel walls. The microchannel distillation units have appropriate manifolds, valves, conduit lines, etc. to control the flow of process fluids and heat exchange fluids. These are not shown in the drawings, but can be provided by those skilled in the art.

The inventive process may be used to separate any two or more fluids that have different volatilities. The process is particularly suitable for handling difficult separations such as ethane from ethylene wherein the fluids being separated have very similar volatilities. Examples of the separations that can be advantageously effected using the inventive process include, in addition to ethane from ethylene, styrene from ethylbenzene separation and associated purification of styrene monomer in an ethylbenzene dehydrogenation plant, separation of oxygen from nitrogen in the cryogenic towers of an air separation plant, separation of cyclohexane from cyclohexanol/cyclohexanone in a nylon monomers plant, deisobutanizers in a gasoline alkylation plant, naphtha splitters upstream from a naphtha reforming plant, and the like. The process may be used to separate hexane from cyclohexane. The process may be used to separate benzene from toluene, methanol from water, or isopropanol from isobutanol.

In one embodiment, the inventive process may be operated at a higher pressure and with more microchannel distillation sections (e.g., microchannel distillation sections 220, 450, 670) than conventional processes not employing microchannel distillation sections. With higher pressures and more microchannel distillation sections, the inventive process can be operated using higher temperature heat exchange fluids as compared to conventional processes. This reduces the amount of cryogenic heat exchange fluid required for many separations. For example, for the separation of ethane from ethylene, conventional processes operating at pressures of about 10 to about 25 atmospheres employ heat exchange fluids at temperatures as low as about −150° C., while with the inventive process operating at higher pressures, for example gauge pressures in the range of about 30 to about 100 atmospheres, and in one embodiment about 50 to about 100 atmospheres, heat exchange fluids at a temperature of about −30° C. to about 200° C. may be used to effect separation. With the inventive process operating in the above-indicated pressure range and using higher temperature heat exchange fluids, the separation of ethane from ethylene at a purity level of about 99 mole % or higher can be effected using about 10 to about 500 microchannel distillation sections. On the other hand, conventional ethane/ethylene separations at pressures of about 10 to about 25 atmospheres using a heat exchange fluid at temperatures in the range of about −150° C. to about 0° C. typically require about 200 distillation sections. The cost of additional distillation sections using conventional processes to operate at the higher pressures and temperatures indicated above for the inventive process would typically be significantly higher than with the inventive process. On the other hand, the cost of additional microchannel distillation sections with the inventive process are typically relatively low. The use of higher temperature heat exchange fluids with the inventive process should lower the operating cost of the process.

A disadvantage of conventional hardware used for vapor-liquid contacting unit operations is that conventional trays and packing may be difficult to operate or operate less efficiently when the process is operated at feed rates below about 50% design capacity. An advantage of the present invention relates to an ability to operate the process in a modular fashion for effective operation at a wide range of capacities. The inventive process may be designed with numerous modules and sections of modules. Turndown operation can be achieved with directing flows to active modules and sections of modules, where the process channels are operating efficiently at close capacity. For example, an overall process may be operating at 50% capacity, but the active microchannel distillation units may be operating at 80-90% capacity. In one embodiment, the overall process may be operating at a capacity that is at least about 10% less than the operation in at least one microchannel unit. For example, the overall process may be operating at about 50% or less capacity while one or more of the microchannel distillation units may be operating at about 60% of capacity or higher. Thus, in one embodiment the microchannel distillation assembly may comprise a plurality of microchannel distillation units, some of the microchannel distillation units being active and some of the microchannel distillation units being inactive.

In one embodiment, the present invention may provide for the separation of ethylene from a fluid mixture comprising ethylene and ethane in a microchannel distillation column or apparatus having a height of up to about 20 meters, and in one embodiment up to about 10 meters, and in one embodiment up to about 5 meters, and in one embodiment up to about 3 meters, with purity levels of ethylene of at least about 95% by volume, and in one embodiment at least about 98% by volume, and in one embodiment at least about 99% by volume.

In one embodiment, the inventive process exhibits a microchannel fast response to a step change. The test criterion for determining whether a system exhibits a microchannel fast response to a step change may be measured by either of the following Tests 1 or 2.

Test 1

The steady-state distillate and bottoms compositions and flow rates are measured. Then a step change decrease of 10% is made to the total inlet flow rate fed to the distillation column (time=0 minutes). After twenty minutes (t=20 minutes), the distillate and bottoms compositions and flow rates are measured. After 6 hours (time=380 minutes), the distillate and bottoms compositions and flow rates are measured again. Changes in flow rate and mole fraction of key light (the component which just prior to time=0 minutes has the largest mole fraction in the distillate) are compared for the time interval 0 to 20 minutes and 0 to 380 minutes in the bottoms and in the distillate. If the change in flow rate or mole fraction of light key for the time interval 0 to 20 minutes is greater than 80% of the change in flow rate or mole fraction of light key for the time interval 0 to 380 minutes for either the bottoms or distillate product streams, then the device exhibits microchannel fast response to a step change.

Test 2

The steady-state distillate and bottoms compositions and flow rates are measured. Then a step change increase of 10% is made to the mole fraction of light key (the component which just prior to time=0 minutes has the largest mole fraction in the distillate) in the stream fed to the distillation column (time=0 minutes). After twenty minutes (time=20 minutes), the distillate and bottoms compositions and flow rates are measured. After 6 hours (time=380 minutes), the distillate and bottoms compositions and flow rates are measured again. Changes in flow rate and mole fraction of key light (the component which just prior to time=0 minutes has the largest mole fraction in the distillate) are compared for the time interval 0 to 20 minutes and 0 to 380 minutes in the bottoms and in the distillate. If the change in flow rate or mole fraction of light key for the time interval 0 to 20 minutes is greater than 80% of the change in flow rate or mole fraction of light key for the time interval 0 to 380 minutes for either the bottoms or distillate product streams, then the device exhibits microchannel fast response to a step change.

Figure 41:
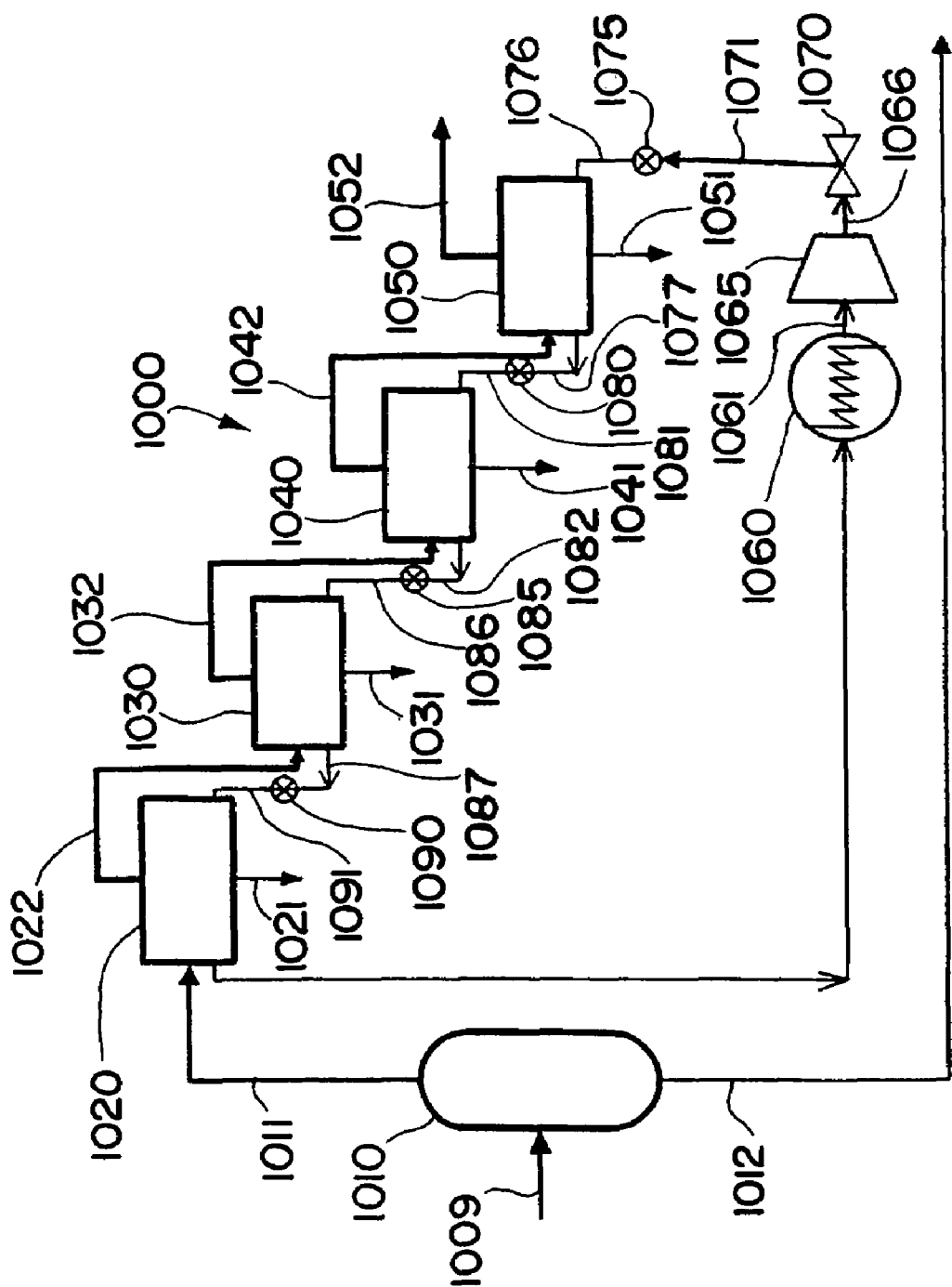
FIG. 41 is a schematic illustration showing a process using the inventive microchannel distillation units for separating water, butanes or butylenes, propanes or propylenes, and ethane or ethylene, from raw natural gas.

The inventive process may be employed in a process for making liquefied natural gas. This is illustrated in FIG. 41. The separation system illustrated in FIG. 41 involves the use of a series of cascaded microchannel distillation units for separating water and higher molecular weight materials such as ethane or ethylene, propanes or propylene, and butanes or butylene, from the raw natural gas. Referring to FIG. 41, separation system 1000 includes the use of bulk liquids separator 1010, microchannel distillation columns or apparatuses 1020, 1030, 1040 and 1050, condenser 1060, compressor 1065, valve 1070, and expansion devices 1075, 1080, 1085 and 1090. Each of the microchannel distillation columns or apparatuses 1020, 1030, 1040 and 1050 may be similar in design and operation to the microchannel distillation columns or apparatuses 110, 210 or 310 discussed above. A raw natural gas product mixture comprising methane, water and hydrocarbons containing two or more carbon atoms, enters bulk liquids separator 1010 through line 1009. Hydrocarbons of about 5 carbon atoms and above are separated from the raw natural gas product mixture and advanced to storage or further processing through line 1012. The remainder of the raw natural gas product mixture containing water and hydrocarbons of 1 to about 4 carbon atoms is advanced through line 1011 to microchannel distillation apparatus 1020. Water is separated from the product mixture in microchannel distillation apparatus 1020 and is removed from microchannel distillation apparatus 1020 through line 1021. The remainder of the raw natural gas product mixture flows through line 1022 to microchannel distillation apparatus 1030. Butanes and butylenes are separated from the natural gas product mixture in microchannel distillation apparatus 1030 and flow from microchannel distillation apparatus 1030 through line 1031. The remainder of the raw natural gas product mixture flows through line 1032 to microchannel distillation apparatus 1040 where propanes and propylene are separated from the product mixture. Propanes and propylene flow from the microchannel distillation apparatus 1040 through line 1041. The remainder of the product mixture flows through line 1042 to microchannel distillation apparatus 1050. In microchannel distillation apparatus 1050 ethane and ethylene are separated from the product mixture and flow from microchannel distillation apparatus 1050 through line 1051. The remaining product comprises methane which flows from microchannel distillation apparatus 1050 through line 1052. The raw natural gas product mixture flowing through line 1009 to bulk liquids separator 1010 may be at a pressure of about 10 to about 5000 psig, and in one embodiment about 10 to about 2500 psig; and a temperature of about −250 to about 500° C., and in one embodiment about −50 to about 300° C. The product mixture flowing through line 1011 to microchannel distillation apparatus 1020 may be at a pressure of about 10 to about 5000 psig, and in one embodiment about 10 to about 2500 psig; and a temperature of about −250 to about 500 ° C., and in one embodiment about −50 to about 300° C. The product mixture flowing through line 1022 to microchannel distillation apparatus 1030 may be at a pressure of about 10 to about 5000 psig, and in one embodiment about 10 to about 2500 psig; and a temperature of about −250 to about 500° C., and in one embodiment about −200 to about 300° C. The product mixture flowing through line 1032 to microchannel distillation apparatus 1040 may be at a pressure of about 10 to about 5000 psig, and in one embodiment about 10 to about 2500 psig; and a temperature of about −225 to about 500° C., and in one embodiment about −200 to about 300° C. The product mixture flowing through line 1042 to microchannel distillation apparatus 1050 may be at a pressure of about 10 to about 5000 psig, and in one embodiment about 10 to about 2500 psig; and a temperature of about −245 to about 500° C., and in one embodiment about −200 to about 300° C. The methane flowing from microchannel distillation apparatus 1050 through line 1052 may be at a pressure of about 10 to about 5000 psig, and in one embodiment about 10 to about 2500 psig; and a temperature of about −245 to about 300° C., and in one embodiment about −200 to about 300° C.

The refrigerant used in the separation system 1000 illustrated in FIG. 41 may be any refrigerant. The refrigerant flows through line 1059 to condenser 1060, through condenser 1060 to line 1061, through line 1061 to compressor 1065, through compressor 1065 to line 1066, through line 1066 to valve 1070, through valve 1070 to line 1071, through line 1071 to expansion device 1075, through expansion device 1075 to line 1076, through line 1076 to microchannel distillation apparatus 1050, through apparatus 1050 to line 1077, through line 1077 to expansion device 1080, through expansion device 1080 to line 1081, through line 1081 to microchannel distillation apparatus 1040, through microchannel distillation apparatus 1040 to line 1082, through line 1082 to expansion device 1085, through expansion device 1085 to line 1086, through line 1086 to microchannel distillation apparatus 1030, through microchannel distillation apparatus 1030 to line 1087, through line 1087 to expansion device 1090, through expansion device 1090 to line 1091, through line 1091 to microchannel distillation apparatus 1020, through microchannel distillation apparatus 1020 to line 1059, and through line 1059 back to condenser 1060 where the cycle starts all over again. The refrigerant flowing through line 1059 from microchannel distillation apparatus 1020 to condenser 1060 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1061 from condenser 1060 to compressor 1065 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1066 from compressor 1065 to valve 1070 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1071 from valve 1070 to expansion device 1075 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1076 from expansion device 1075 to microchannel distillation apparatus 1050 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1077 from microchannel distillation apparatus 1050 to expansion device 1080 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1081 from expansion device 1080 to microchannel distillation apparatus 1040 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1082 from microchannel distillation apparatus 1040 to expansion device 1085, may be at a pressure of about 10 to about 3000 psig, and in one embodiment about 20 to about 2500 psig; and a temperature of about −250 to about 300° C., and in one embodiment about −225 to about 300° C. The refrigerant flowing through line 1086 from expansion device 1085 to microchannel distillation apparatus 1030 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1087 from microchannel distillation apparatus 1030 to expansion device 1090 may be at a pressure of about 10 to about 3000 psig, and in one embodiment about 20 to about 2500 psig; and a temperature of about −250 to about 300° C., and in one embodiment about −225 to about 300° C. The refrigerant flowing through line 1091 from expansion device 1090 to microchannel distillation apparatus 1020 may be at a pressure of about 10 to about 3000 psig, and in one embodiment about 20 to about 2500 psig; and a temperature of about −250 to about 300° C., and in one embodiment about −225 to about 300° C.

Figure 42:
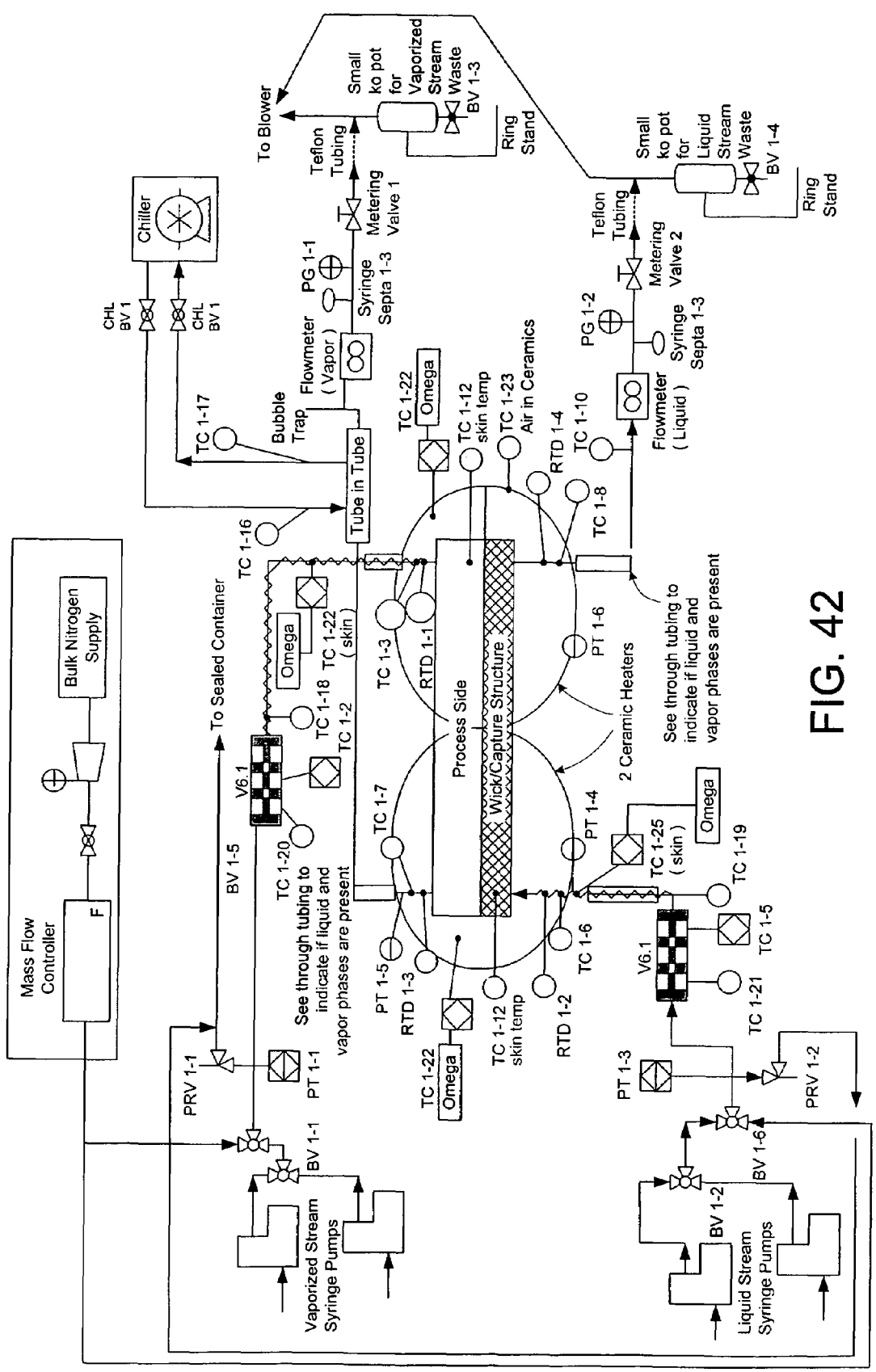
FIG. 42 is a flow sheet illustrating a process for distilling a fluid mixture in accordance with the inventive process.

FIG. 42 provides a flow sheet illustrating the inventive process. In FIG. 22 and the following description, the abbreviations indicated below are used:
BRR=Back Pressure Regulator
BV=Ball Valve
KO Pot=Knock Out Pot (catch container)
PG=Pressure Gauge
PRV=Pressure Relief Valve
PT=Pressure Transducer
RTD=Resistance Temperature Detectors
HXER=Heat Exchanger
TC=Thermocouple The following procedure may be used for operating the microchannel distillation process illustrated in FIG. 42. The procedure includes the use of metering valves in conjunction with BPRs and flexible tubing to reach and maintain a good separation of vapor and liquid phases. The microchannel distillation device does not include any heat exchange channels but includes a liquid removal structure.

(1) Turn on chiller to 5° C. and allow it to pump through the vapor side tube-in-tube Hxer.

(2) Position both KO Pots below the device. These are used to collect the products.

(3) Position valves to purge all feed lines of air and to start liquid flow to the system at room temperature.

(4) Product streams: Open metering valves and BPRs at the vapor and liquid outlets, and close the ball valves on the KO drain lines.

(5) Liquid-side feed:
  (a) Turn the syringe pump on at 1.5 ml/min and monitor the liquid feed flow meter for liquid flow. Once liquid flow is established, turn off syringe pump, switch the 3-way ball valve to the other syringe pump and start liquid flow at 1.5 ml/min to the system with the syringe pump.
  (b) After air is purged from the device upstream and downstream tubing for liquid and only liquid is seen at the liquid feed flowmeter, lower the liquid side flow rate to that specified in the run plan.
  (c) Monitor the liquid product flow meter.

(6) Vapor-side Feed:
  (a) Turn the syringe pump on at 1.5 ml/min and monitor the vapor feed flow meter for liquid flow. Once liquid flow is established, turn off syringe pump, switch the 3-way ball valve to the other syringe pump and start liquid flow at 1.5 ml/min to the system with this syringe pump. Take out the flow from the top of the device to remove all the air from the system and wet the inside of the device completely.
  (b) To purge the system of air/nitrogen, close metering valves and allow pressure to increase to 5 psig, open both metering valves at the same time. If bubbles are seen at the rotameters, repeat process. Also check the bubble trap tubing between the tub-in-tube Hxer and metering valve on the vapor side. Open cap and allow liquid to fill the tubing at least half way. A syringe may also be used to draw out some of the air/nitrogen so that it does not interfere with the vapor outer ratameter.
  (c) After air is purged from this line and only liquid is seen at the vapor feed flow meter, lower the vapor side flow rate to that specified in the run plan. Monitor the product flow meters for expected liquid flow at each. If product flow rates need corrected, adjust the downstream metering valves accordingly. Adust the BPR's to −0.5 psig less than that specified in the Run Plan and adjust location of the liquid side KO pot to attain equilibrium liquid phase flow on both product lines, seen at the Telfon tubing downstream of the BPR's. Set the ceramic heaters to heat to the temperature specified in the Run Plan. The bottom ceramic heater may have a setpoint higher than the top ceramic heater. Start heating the vapor and liquid feed lines using heat tapes at ≦5° C./min., making sure to slow down as run conditions are approached.
  (d) Minimize the overshoot or undershoot on the liquid and vapor feed temperatures, respectively, into the device at given desired pressure so as to achieve saturated condition. Adust all heat sources as needed to attain Run Plan conditions. Also adjust metering valves and BPRs as needed to maintain desired operating pressure and single-phase product in the product lines (i.e., vapor phase on the vapor side and liquid phase on the liquid side). To check for single-phase flow on both the inlets and the outlets, pull back some insulation immediately upstream and downstream of the device to inspect both the liquid and vapor sides clear, plastic tubing. The ceramic heater temperatures should not exceed the inlet temperatures.

(7) Once system has stabilized (i.e. <0.5 ° C. fluctuations on the inlet, outlet and device skin temperatures, <+/− 0.1 mi/min on all 4 flow meters and <+/− 0.1 psig fluctuations on the inlet and outlet pressures over a 10 minute interval), proceed with the following:
  (a) Record measurements taken from low meters.
  (b) Monitor all pressures and temperatures and record all observations and changes during the run. Monitor the clear tubing for good phase separation. Record data. Withdraw liquid samples from each line to be used on gas chromatograph, being careful not to "dry out" the tube. Withdraw a sample 10 minutes later before moving on to the next run.

(8) Items to check periodically:
  (a) Empty the small KO pots periodically. As the syringe in the syringe pumps on each side empties, redirect the ball valves and turn on the other syringe pump so that there is continuous flow for both streams. Refill syringes as necessary to complete run plan.

(9) Shut down
  (a) Turn off all heaters and pumps, drain the knock out pots, switch feed ball valves to purge nitrogen through system being careful not to blow liquid out the top of the knock out pots to the vent line, drain knock out pots again when the lines appear to be mostly cleared of liquid and then leave nitrogen purge on during the rest of the cool down. Once cool (<60° C.), turn off nitrogen purge and the chiller.

EXAMPLE

Figure 43:
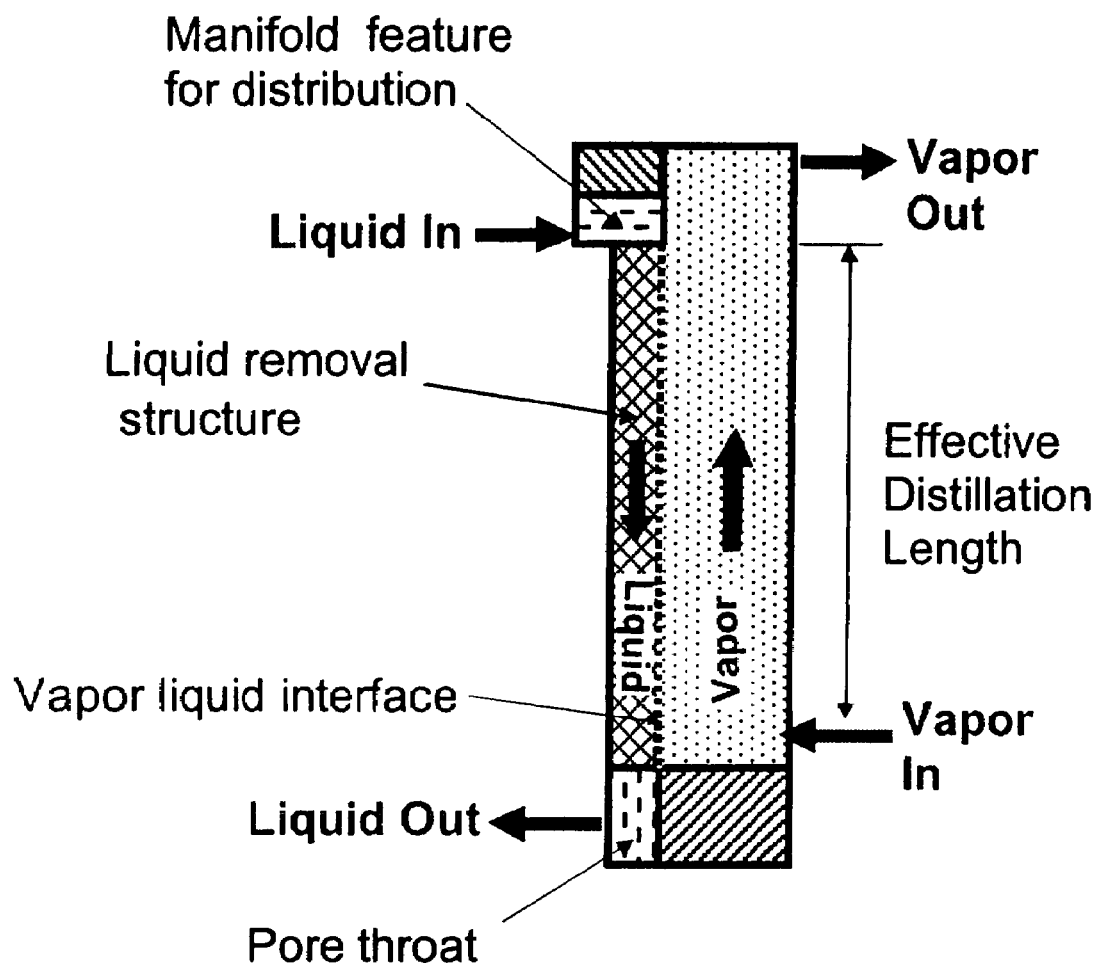
FIG. 43 is a schematic illustration of microchannel distillation unit that can be used in accordance with the inventive process.

A microchannel distillation unit comprises an assembly of two plates—a liquid plate and a vapor plate. The unit is schematically illustrated in FIG. 43. The plates are made out of Stainless Steel 316. The liquid plate has a channel for liquid flow while the vapor plate has a channel for vapor flow. The overall dimensions of liquid plate are 7.6 cm wide×1 cm thick×22.9 cm long. The overall dimensions of the liquid channel in the liquid plate are 2.9 cm width×1.0 mm height× 14 cm long. The liquid removal structure is a 72×72 stainless steel mesh. The overall thickness of the mesh is 0.36 mm. The mesh is spot welded on the wall of the liquid channel. The liquid enters the device at one end of the liquid removal structure and exits the device at the other end of the liquid removal structure as shown in FIG. 43. At the liquid inlet, a manifold having the dimensions of 2.5 cm wide×2.5 mm high×2.5 mm deep is provided for uniform flow distribution over the entire width of the liquid removal structure. The distribution of liquid from the manifold to the liquid removal structure is through 6×1.5 mm diameter holes. At the outlet of the liquid, a fine mesh made from Pall Supramesh (stainless steel, 25 micron pore size) is placed. The fine mesh acts as a pore throat to prevent vapor breakthrough in to the liquid. The dimensions of the pore throat are 2.5 cm×2.5 cm×0.36 mm. The overall dimensions of vapor plate are 7.6 cm wide×0.7 cm thick×22.9 cm long. The vapor channel dimensions are 2.2 cm wide×0.5 mm height×11 cm long.

The plates are assembled together using bolts and nuts. A gasket is placed between the plates to prevent leakages to outside. The inlets and outlets for liquid and vapor are designed such that during the assembly of device, the liquid inlet and outlet are offset from vapor inlet and outlet by 1 cm.

The desired feed composition for liquid and vapor is achieved by mixing measured quantities of n-hexane and cyclohexane. Both n-hexane and cyclohexane are obtained from Sigma-Aldrich and have greater than 99% purity. Pressures are measured using a pressure tranducer (Manufacturer—NoShok Model No: 100-30-2-1-2-7) with accuracy of ±0.07 psi, range 0-30 psig. The temperatures are measured using RTD (Manufacturer—Omega, Model No: KMQSS-010U-18) with a temperature measurement range from −220° C. to 220° C. and accuracy of ±0.2° C. The flow composition is measured using Gas Chromatograph (Manufacturer—Agilent Technologies, Model No: 6890N) with temperature range from 4° C. to 450° C. The flow is supplied by syringe pumps (Manufacturer—Cole Parmer, Model No: 74900-00) with flow rate from 0.2 μL/hr to 500 mL/hr and accuracy of ±0.5%. The flow rate is measured with flow meters (Manufacturer—Cole Parmer, Model: EW-03268-09), full scale range of 1.75 ml/min with accuracy of ±2% of full scale.

The feed inlet composition, temperature, pressures and flow rate of the liquid stream are maintained at 83.9% n-hexane by mass, 67.6° C., 0.1 psig and 1.01 L ml/min respectively. The feed composition, temperature, pressures and flow rate of the vapor stream are maintained at 8.5% n-hexane by mass, 84.2° C., 0.1 psig and 1.00 L ml/min respectively. The heat loss from the system is reduced by placing the device in a furnace. The furnace space temperature is set at 55° C. The wall temperature of the device is controlled using strip heaters. The strip heaters are located 0.5 inch' above the vapor inlet location on both vapor and liquid plate. The voltage settings in the heaters are set such that the metal temperature near the vapor inlet is approximately 77° C. while the metal temperature near the liquid inlet is approximately 73° C. The steady state condition is maintained for 25 minutes before recording the outlet flow conditions and collecting outlet samples for composition analysis. The data is recorded using Data Acquisition System (Lab-view). The data is recorded every three seconds.

The outlet composition, temperature, pressures and flow rate of the liquid stream are maintained at 9% n-hexane by mass, 75.1° C., 0.1 psig and 1.01 L ml/min respectively. The outlet composition, temperature, pressures and flow rate of the vapor stream are maintained at 8.5% n-hexane by mass, 72.7° C., 0.1 psig and 1.00 L ml/min respectively. From the measured outlet composition and known inlet composition and flow rate, outlet flow rate is estimated. The experimental data is then used to develop a ChemCAD simulation to predict the number of equilibrium stages. The number of equilibrium stages for the device and operating conditions is 10 which gave an HETP of 0.5 inch.

Pore throat plays an important role in fluid separation. As a result of separation, heavier components are rich in liquid phase while lighter components are rich in vapor phase. The heavier components are removed from micro-channels through dense structure called pore throat. The pore throat prevents vapor break-through into the liquid. The capacity of the microchannel and the phase separation is determined by the pore throat. Some examples of pore throat but not limited to, are—Pall Supramesh (25 microns pore size), 72×72 stainless steel mesh, liquid pool etc.

Figure 44:
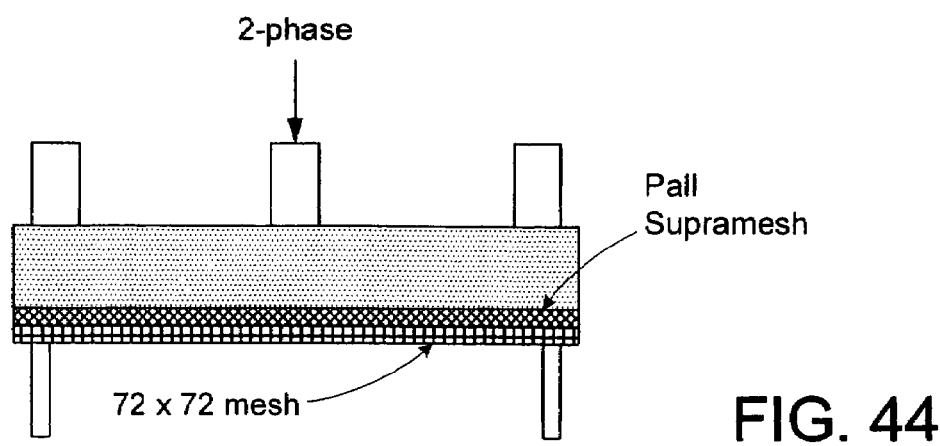
FIG. 44 is a schematic illustration of a mesh arrangement that can be used in a microchannel distillation unit with the inventive process.

In PCT International Publication No. WO 03/049835 A1, which is incorporated herein by reference, it is disclosed that the Suratmann coefficient in the micro-channel determines the efficiency of liquid and vapor mixture phase separation using liquid removal structures (wicking structures). It is disclosed that a good phase separation of liquid and vapor mixture is obtained for ratio of gas phase Reynolds number to liquid phase Reynolds number greater than $(4500)\times(\text{Suratmann number})^{-0.67}$. However, the pore throat also plays an important role in the efficiency of phase separation in microchannels using liquid removal structures. Experiments conducted with air-water mixture show the effect of pore throat in phase separation. A hardware as described in the example in WO 03/049835 A1, is fabricated and tested for air-water mixture separation. One modification is made in the arrangement of liquid removal structures (wicking structures). The arrangement of Pall Supramesh and 72×72 mesh are reversed as shown in FIG. 44. The orientation of the device is horizontal. The air-water mixture is made by mixture water flowing at 80 ml/min and air flowing at 0.35 SLPM. The suction heat for the liquid is 25.4 cm. The ratio of gas phase Reynolds number to liquid phase Reynolds number is $(1030)\times(\text{Suratmann number})^{-0.67}$ and the liquid phase recovered is 85%. The ratio of gas Reynolds number to liquid Reynolds number is 0.27.

Another experiment is run with the same arrangement of the device. The air-water mixture is made by mixing water flowing at 80 ml/min and air flowing at 5.0 SLPM. The suction heat for the liquid is 10 cm. The ratio of gas phase Reynolds number to liquid phase Reynolds number is $(14740)\times(\text{Suratmann number})^{-0.67}$. The liquid phase recovered is 0.3%. The ratio of gas Reynolds number to liquid Reynolds number is 3.9. Unlike conventional distillation columns where the heating and cooling are provided by condenser and reboiler located at the top and the bottom of the column respectively, in the microchannel distillation units provided for herein the wall temperature may be precisely controlled by heat exchange fluids flowing in the heat exchange channels. An advantage offered by this technology is to heat up and cool down the microchannel distillation unit quickly during start up and shut down. To reach the desired steady state process conditions, the process microchannels and wall between the process microchannels may be heated or cooled using a flowing heat exchange fluid. Due to high heat transfer coefficient and small single channel process capacity associated with the microchannels, the start-up time and shut down time may be reduced drastically as compared to conventional systems.

An advantage of microchannel technology is that it is modular in nature. This permits the use of performance calculations for a repeating unit to be used as the basis for estimating the performance for an entire structure employing a plurality of the repeating units. For example, it is estimated that in a system employing the inventive microchannel distillation units with same total capacity as a conventional ethylene fractionator, if one heat exchange channel serves five process microchannels in the microchannel distillation units, the start-up time may be less than about 24 hours, and in one embodiment less than about 12 hours, and in one embodiment less than about 6 hours, and in one embodiment less than about 4 hours, for reducing the temperature of the overall system from room temperature to −33° C. In one embodiment, it is estimated that a system employing a plurality of repeating units using one heat exchange channel and five microchannel distillation units wherein the material of construction is stainless steel 304 and the repeating unit is cooled from ambient temperature to a steady state temperature of −33° C. by flowing a heat exchange fluid at a temperature of 40° C. in the heat exchange channel, the time for start up may be about 2 hours.

While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process for distilling a fluid mixture in a microchannel distillation apparatus, the microchannel distillation apparatus comprising a plurality of microchannel distillation units, each microchannel distillation unit comprising a plurality of microchannel distillation sections, each microchannel distillation unit having one or more unit inlets, the microchannel distillation apparatus having an apparatus inlet and one or more channel inlets connecting the apparatus inlet to the unit inlets, the fluid mixture comprising a more volatile component and a less volatile component, the process comprising:

flowing a vapor phase through the microchannel distillation units in a first direction;

flowing a liquid phase through the microchannel distillation units in a second direction that is counter-current to the first direction; and flowing the fluid mixture through the apparatus inlet, channel inlets and unit inlets into the microchannel distillation units, part of the more volatile component transferring from the fluid mixture to the vapor phase to form a more volatile component rich vapor phase, part of the less volatile component transferring from the fluid mixture to the liquid phase to form a less volatile component rich liquid phase.

2. The process of claim 1 wherein each microchannel distillation unit has a distillate end and a bottoms end, the process further comprises:

flowing the more volatile component rich vapor phase through a plurality of the microchannel distillation sections towards the distillate ends, the more volatile component rich vapor phase contacting the liquid phase in each microchannel distillation section and becoming enriched with the more volatile component; and flowing the less volatile component rich liquid phase through a plurality of the microchannel distillation sections towards the bottoms ends, the less volatile component rich liquid phase contacting the vapor phase in each microchannel distillation section and becoming enriched with the less volatile component.

3. The process of claim 1 wherein each microchannel distillation unit comprises at least one heat exchanger.

4. The process of claim 1 wherein each microchannel distillation unit comprises at least one process microchannel, the process microchannel comprising an area to permit flow of the vapor phase and an area to permit flow of the liquid phase.

5. The process of claim 1 wherein each microchannel distillation unit has a distillate end and a microchannel condenser at the distillate end.

6. The process of claim 5 wherein the microchannel condenser is in the form of a microchannel distillation section.

7. The process of claim 1 wherein each microchannel distillation unit has a bottoms end and a microchannel reboiler at the bottoms end.

8. The process of claim 7 wherein the microchannel reboiler is in the form of a microchannel distillation section.

9. The process of claim 1 wherein each microchannel distillation unit has a distillate end and a bottoms end and further comprises a microchannel condenser at the distillate end and a microchannel reboiler at the bottoms end.

10. The process of claim 9 wherein the microchannel condenser and the microchannel reboiler are in the form of microchannel distillation sections.

11. The process of claim 4 wherein a wicking layer separates the area for vapor phase flow and the area for liquid phase flow.

12. The process of claim 1 wherein at least part of the more volatile component rich vapor phase is condensed and withdrawn from the microchannel distillation units.

13. The process of claim 12 wherein the more volatile component rich vapor phase is condensed in a microchannel condenser.

14. The process of claim 1 wherein at least part of the more volatile component rich vapor phase is condensed and flows into the microchannel distillation units.

15. The process of claim 1 wherein at least part of the less volatile component rich liquid phase is withdrawn from the microchannel distillation units.

16. The process of claim 1 wherein at least part of the less volatile component rich liquid phase is vaporized and flows into the microchannel distillation units.

17. The process of claim 16 wherein the less volatile component rich liquid phase is vaporized in a microchannel reboiler.

18. The process of claim 1 wherein each microchannel distillation unit has a height of up to about 3 meters.

19. The process of claim 1 wherein the height of the equivalent theoretical plate ratio for each microchannel distillation unit is less than about one foot.

20. The process of claim 1 wherein the height of the equivalent theoretical plate ratio for each microchannel distillation unit is less than about one inch.

21. The process of claim 1 wherein the time for cooling the microchannel distillation units from room temperature to about −33° C. is less than about 24 hours.

22. The process of claim 1 wherein each microchannel distillation unit has a distillate end and a bottoms end, the fluid mixture being introduced into at least one microchannel distillation section positioned between the distillate end and the bottoms end.

23. The process of claim 1 wherein the microchannel distillation sections have heat exchange channel zones thermally communicating with the microchannel distillation sections, each of the heat exchange channel zones comprising at least one heat exchange fluid loop.

24. The process of claim 23 wherein heat exchange fluid flows from one heat exchange fluid loop to another heat exchange fluid loop.

25. The process of claim 23 wherein at least two heat exchange fluid loops are nested.

26. A process for distilling a fluid mixture in a microchannel distillation apparatus, the microchannel distillation apparatus comprising a plurality of microchannel distillation units, each microchannel distillation unit comprising a plurality of microchannel distillation sections, each microchannel distillation unit having one or more unit inlets, the microchannel distillation apparatus having an apparatus inlet and one more more channel inlets connecting the apparatus inlet to the unit inlets, each microchannel unit having a distillate end and a bottoms end, the fluid mixture comprising a more volatile component and a less volatile component, the process comprising:

flowing a vapor phase through each microchannel distillation unit towards the distillate end of each microchannel distillation unit;

flowing a liquid phase through each microchannel distillation unit towards the bottoms end of each microchannel distillation unit;

flowing the fluid mixture through the apparatus inlet, channel inlets and unit inlets into the microchannel distillation units, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in each microchannel distillation unit towards the distillate end of each microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in each microchannel distillation unit towards the bottoms end of each microchannel distillation unit, the less volatile component rich liquid phase contacting the vapor phase in each microchannel distillation section and becoming enriched with the less volatile component.

27. The process of claim 26 wherein each microchannel distillation unit comprises at least one process microchannel and at least one heat exchanger.

28. The process of claim 26 wherein each microchannel distillation unit comprises at least one process microchannel, the process microchannel comprising an open area to permit flow of the vapor phase and a wicking region to permit flow of the liquid phase.

29. The process of claim 28 wherein each microchannel distillation section comprises a liquid inlet for permitting liquid to flow into the open area from the wicking region, a liquid outlet for permitting liquid to flow out of the open area into the wicking region, an interior wall extending from the liquid inlet to the liquid outlet, and a capture structure, the liquid outlet being downstream from the liquid inlet.

30. The process of claim 29 wherein the liquid phase flows on the surface of the interior wall, the liquid phase being in the form of a thin film.

31. The process of claim 28 wherein part of the wicking region forms a wall for the open area of the process microchannel.

32. The process of claim 31 wherein the liquid phase flows in the wicking region and the vapor phase flows in the open area of the process microchannel and contacts at least part of the liquid phase in the wicking region.

33. The process of claim 27 wherein the process microchannel has an internal dimension of width or height of up to about 10 mm.

34. The process of claim 27 wherein the process microchannel has an internal dimension of width or height of up to about 2 mm.

35. The process of claim 27 wherein the process microchannel is made of a material comprising: steel; monel; inconel; aluminum; titanium; nickel; copper; brass; an alloy of any of the foregoing metals; a polymer; ceramics; glass; a composite comprising a polymer and fiberglass; quartz; silicon; or a combination of two or more thereof.

36. The process of claim 27 wherein the heat exchanger comprises at least one heat exchange channel having an internal dimension of width or height of up to about 10 mm.

37. The process of claim 27 wherein the heat exchanger comprises at least one heat exchange channel having an internal dimension of width or height of up to about 2 mm.

38. The process of claim 27 wherein the heat exchanger comprises at least one heat exchange channel, the heat exchange channel being made of a material comprising: steel; monel; inconel; aluminum; titanium; nickel; copper; brass; an alloy of any of the foregoing metals; a polymer; ceramics; glass; a composite comprising polymer and fiberglass; quartz; silicon; or a combination of two or more thereof.

39. The process of claim 28 wherein the wicking region comprises a wick.

40. The process of claim 39 wherein the wick comprises one or more sintered metals, metal screens, metal foams, polymer fibers, or a combination of two or more thereof.

41. The process of claim 28 wherein the wicking region comprises a wicking surface.

42. The process of claim 41 wherein the wicking surface comprises grooves in one or more interior walls of the process microchannel.

43. The process of claim 42 wherein the grooves are aligned parallel to the direction of flow of the vapor phase in the process microchannel.

44. The process of claim 42 wherein the grooves are aligned tangentially to the direction of flow of the vapor phase in the process microchannel.

45. The process of claim 42 wherein the grooves provide a flow path for the liquid phase to flow between microchannel distillation sections.

46. The process of claim 42 wherein the grooves are etched into at least one wall of the process microchannel using a laser.

47. The process of claim 28 wherein the wicking region comprises a wire mesh that is welded to at least one wall of the process microchannel.

48. The process of claim 26 wherein the flow of the liquid phase is driven by gravitational forces.

49. The process of claim 26 wherein the flow of the liquid phase is driven by gravitational force and/or a pressure differential.

50. The process of claim 26 wherein the fluid mixture comprises ethane and ethylene.

51. The process of claim 26 wherein the fluid mixture comprises styrene and ethylbenzene.

52. The process of claim 26 wherein the fluid mixture comprises oxygen and nitrogen.

53. The process of claim 26 wherein the fluid mixture comprises cycohexane and cyclohexanol or cyclohexanone.

54. The process of claim 26 wherein the fluid mixture comprises hexane and cyclohexane.

55. The process of claim 26 wherein the fluid mixture comprises isobutane.

56. The process of claim 26 wherein the fluid mixture comprises naptha.

57. The process of claim 27 wherein the heat exchanger comprises a heat exchange channel, an endothermic or exothermic process being conducted in the heat exchange channel.

58. The process of claim 27 wherein the heat exchanger comprises a heat exchange channel, a heat exchange fluid being in the heat exchange channel.

59. The process of claim 58 wherein the heat exchange fluid undergoes a phase change in the heat exchange channel.

60. The process of claim 58 wherein the heat exchange fluid undergoes partial boiling in the heat exchange channel.

61. The process of claim 27 wherein the heat exchanger comprises a heat exchange channel, the vapor phase flows through the process microchannel in a first direction, and a heat exchange fluid flows through the heat exchange channel in a second direction, the second direction being co-current, cross-current or counter-current relative to the first direction.

62. The process of claim 27 wherein the heat exchanger comprises a heat exchange channel, a heat exchange fluid flows through the heat exchange channel, the heat exchange fluid comprising one or more of air, steam, liquid water, carbon dioxide, gaseous nitrogen, liquid nitrogen, a gaseous hydrocarbon or a liquid hydrocarbon.

63. The process of claim 27 wherein the heat exchanger comprises a heat exchange channel, the pressure within the process microchannel is in the range from about 30 to about 100 atmospheres, and a heat exchange fluid flows in the heat exchange channel, the temperature of the heat exchange fluid being in the range from about −30 to about 200° C.

64. The process of claim 26 wherein at least part of the more volatile component rich vapor phase is condensed and withdrawn from each microchannel distillation unit.

65. The process of claim 64 wherein the more volatile component rich vapor phase is condensed in a microchannel condenser.

66. The process of claim 26 wherein at least part of the more volatile component rich vapor phase is condensed and flows into each microchannel distillation unit.

67. The process of claim 26 wherein at least part of the less volatile component rich liquid phase is withdrawn from the microchannel distillation unit.

68. The process of claim 26 wherein at least part of the less volatile component rich liquid phase is vaporized and flows into each microchannel distillation unit.

69. The process of claim 68 wherein the less volatile component rich liquid phase is vaporized in a microchannel reboiler.

70. The process of claim 26 wherein each microchannel distillation unit has a height of up to about 3 meters.

71. The process of claim 26 wherein the height of the equivalent theoretical plate ratio for each microchannel distillation unit is less than about one foot.

72. The process of claim 26 wherein the height of the equivalent theoretical plate ratio for each microchannel distillation unit is less than about one inch.

73. The process of claim 26 wherein the time for cooling each microchannel distillation unit from room temperature to about −33° C. is less than about 24 hours.

74. The process of claim 26 wherein a distillate product is formed, the distillate product being treated in another microchannel distillation unit.

75. The process of claim 74 wherein another distillate product is formed in the another microchannel distillation unit, the another distillate product being treated in a third microchannel distillation unit.

76. The process of claim 26 wherein a bottoms product is formed, the bottoms product being treated in another microchannel distillation unit.

77. The process of claim 76 wherein another bottoms product is formed in the another microchannel distillation unit, the another bottoms product being treated in a third microchannel distillation unit.

78. The process of claim 26 wherein a distillate product is removed from each microchannel distillation unit at the distillate end.

79. The process of claim 26 wherein at least one product is removed from each microchannel distillation unit downstream from the distillate end.

80. The process of claim 26 wherein a bottoms product is removed from each microchannel distillation unit at the bottoms end.

81. The process of claim 26 wherein at least one product is removed from each microchannel distillation unit upstream from the bottoms end.

82. The process of claim 26 wherein at least one feed stream is introduced into each microchannel distillation unit in at least one microchannel distillation section positioned between the distillate end and the bottoms end.

83. The process of claim 26 wherein the microchannel distillation sections have heat exchange channel zones thermally communicating with the microchannel distillation sections, each of the heat exchange channel zones comprising at least one heat exchange fluid loop.

84. The process of claim 83 wherein heat exchange fluid flows from one heat exchange fluid loop to another heat exchange fluid loop.

85. The process of claim 83 wherein at least two heat exchange fluid loops are nested.

86. A process for distilling a fluid mixture in a microchannel distillation unit, the microchannel distillation unit comprising a plurality of microchannel distillation sections, each microchannel distillation section comprising a vapor region and a capture structure, the process comprising: flowing a liquid stream in the capture structure, flowing a vapor stream in the vapor region, the capture structure comprising a first depth and a second depth, wherein the second depth is less than the first depth and the second depth comprises surface features that create a perpendicular velocity component in the liquid stream in at least a portion of the first depth that is greater than in the second depth.

87. The process of claim 1 wherein the fluid mixture comprises a gas.

88. The process of claim 1 wherein the fluid mixture comprises a liquid.

89. The process of claim 1 wherein the fluid mixture comprises a two-phase mixture.

90. The process of claim 1 wherein the fluid mixture comprises a homogeneous feed.

91. The process of claim 1 wherein the inlet feed channels comprise at least one micromanifold for providing for the flow of the fluid mixture to the microchannel distillation units.

92. The process of claim 1 wherein the direction of flow of the fluid mixture into the at least one microchannel distillation section in each microchannel distillation unit is orthogonal to the direction of flow of the vapor phase.

93. The process of claim 1 wherein the flow of the fluid mixture into each microchannel distillation section traverses the width of each microchannel distillation section.

94. The process of claim 1 wherein each microchannel distillation unit comprises at least one process microchannel, each process microchannel comprising an inlet feed channel that is adjacent to the process microchannel, the process microchannel containing one or more openings to permit the fluid mixture to flow from the inlet feed channel into the process microchannel.

95. The process of claim 1 wherein the inlet feed channels comprise grooves to direct the flow of the fluid mixture into the at least one microchannel distillation section of each microchannel distillation unit.

96. The process of claim 1 wherein the inlet feed channels comprise one or more wicks to direct the flow of the fluid mixture into the at least one microchannel distillation section of each microchannel distillation unit.

97. The process of claim 1 wherein the microchannel distillation apparatus comprises a plurality of feed inlets and inlet feed channels, each feed inlet and inlet feed channel providing for the distribution of the flow of the fluid mixture into different microchannel distillation sections in each microchannel distillation unit.

98. The process of claim 1 wherein the fluid mixture comprises a multiphase mixture, the multiphase mixture being separated to form a liquid phase feed stream and a vapor phase feedstream, the liquid phase feedstream flowing into contact with the liquid phase, the vapor phase feedstream flowing into contact with the vapor phase.

99. The process of claim 1 wherein the fluid mixture comprises a multiphase mixture, the multiphase mixture flowing into contact with the vapor phase.

100. The process of claim 1 wherein the fluid mixture comprises a multiphase mixture, the multiphase mixture comprising a liquid containing gas bubbles.

101. A process for distilling a fluid mixture in a microchannel distillation unit, the microchannel distillation unit comprising at least one process microchannel and a plurality of microchannel distillation sections in the process microchannel, the process microchannel comprising an area to permit flow of the vapor phase and an area to permit flow of the liquid phase, the process microchannel having an interior wall in the area for vapor phase flow and an interior wall in the area for liquid phase flow, each of the walls being opposite each other and having surface features to enhance the mixing of the vapor phase with the liquid phase, the microchannel distillation unit having at least one feed inlet, the fluid mixture comprising a more volatile component and a less volatile component, the process comprising:

flowing a vapor phase through the microchannel distillation unit in a first direction;

flowing a liquid phase through the microchannel distillation unit in a second direction that is counter-current to the first direction; and flowing the fluid mixture through the feed inlet into at least one microchannel distillation section, part of the more volatile component transferring from the fluid mixture to the vapor phase to form a more volatile component rich vapor phase, part of the less volatile component transferring from the fluid mixture to the liquid phase to form a less volatile component rich liquid phase.

102. The process of claim 101 wherein the surface features comprise grooves and/or protrusions on each wall.

103. A process for distilling a fluid mixture in a microchannel distillation unit, the microchannel distillation unit comprising a plurality of microchannel distillation sections, the microchannel distillation unit having at least one feed inlet, the fluid mixture comprising a more volatile component and a less volatile component, the process comprising:

flowing a vapor phase through the microchannel distillation unit in a first direction;

flowing a liquid phase through the microchannel distillation unit in a second direction that is counter-current to the first direction; and flowing the fluid mixture through the feed inlet into at least one microchannel distillation section, part of the more volatile component transferring from the fluid mixture to the vapor phase to form a more volatile component rich vapor phase, part of the less volatile component transferring from the fluid mixture to the liquid phase to form a less volatile component rich liquid phase;

the microchannel distillation sections having heat exchange channel zones thermally communicating with the microchannel distillation sections, a heat exchange fluid flowing in the heat exchange channel zones, the heat exchange fluid undergoing partial boiling in the heat exchange channel zones, the pressure of the heat exchange fluid in each of the heat exchange channel zones being different.

104. A process for distilling a fluid mixture in a microchannel distillation unit, the microchannel distillation unit comprising a plurality of microchannel distillation sections, the microchannel distillation unit having at least one feed inlet, the fluid mixture comprising a more volatile component and a less volatile component, the process comprising:

flowing a vapor phase through the microchannel distillation unit in a first direction;

flowing a liquid phase through the microchannel distillation unit in a second direction that is counter-current to the first direction; and flowing the fluid mixture through the feed inlet into at least one microchannel distillation section, part of the more volatile component transferring from the fluid mixture to the vapor phase to form a more volatile component rich vapor phase, part of the less volatile component transferring from the fluid mixture to the liquid phase to form a less volatile component rich liquid phase;

the microchannel distillation sections having heat exchange channel zones thermally communicating with the microchannel distillation sections, a heat exchange fluid flowing in the heat exchange channel zones, the heat exchange fluid undergoing partial boiling in the heat exchange channel zones, the temperature in each microchannel distillation section being different.

105. A process for distilling a fluid mixture in a microchannel distillation unit, the microchannel distillation unit comprising a plurality of microchannel distillation sections, the microchannel distillation unit having at least one feed inlet, the fluid mixture comprising a more volatile component and a less volatile component, the process comprising:

flowing a vapor phase through the microchannel distillation unit in a first direction;

flowing a liquid phase through the microchannel distillation unit in a second direction that is counter-current to the first direction; and flowing the fluid mixture through the feed inlet into at least one microchannel distillation section, part of the more volatile component transferring from the fluid mixture to the vapor phase to form a more volatile component rich vapor phase, part of the less volatile component transferring from the fluid mixture to the liquid phase to form a less volatile component rich liquid phase;

wherein the microchannel distillation unit is in a microchannel distillation assembly comprising a plurality of microchannel distillation units, some of the microchannel distillation units being active and some of the microchannel distillation units being inactive.

106. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein each microchannel distillation section comprises a liquid region, a vapor region positioned above the liquid region, and a bubble cap tray positioned above the vapor region.

107. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein each microchannel distillation section comprises a tray, the tray comprising a capture structure for collecting liquid and an opening for permitting the flow of the vapor phase through the tray.

108. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein the microchannel distillation unit comprises at least one process microchannel, the process microchannel comprising an open area to permit flow of the vapor phase and a wicking region to permit flow of the liquid phase;

wherein each microchannel distillation section comprises a liquid inlet for permitting liquid to flow into the open area from the wicking region, a liquid outlet for permitting liquid to flow out of the open area into the wicking region, an interior wall extending from the liquid inlet to the liquid outlet, and a capture structure, the liquid outlet being downstream from the liquid inlet; and wherein the capture structure comprises wire mesh.

109. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein the microchannel distillation unit comprises at least one process microchannel, the process microchannel comprising an open area to permit flow of the vapor phase and a wicking region to permit flow of the liquid phase;

wherein each microchannel distillation section comprises a liquid inlet for permitting liquid to flow into the open area from the wicking region, a liquid outlet for permitting liquid to flow out of the open area into the wicking region, an interior wall extending from the liquid inlet to the liquid outlet, and a capture structure, the liquid outlet being downstream from the liquid inlet; and wherein the capture structure comprises one or more inverted cones, liquid-nonwetting porous structures, liquid-wetting porous structures, perforated foils, fibers, or a combination of two or more thereof.

110. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein the microchannel distillation unit comprises at least one process microchannel and at least one heat exchange channel;

wherein an exothermic process is conducted in the heat exchange channel, the exothermic process comprising a water-gas shift reaction, a methanol synthesis reaction or an ammonia synthesis reaction.

111. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein the microchannel distillation unit comprises at least one process microchannel and at least one heat exchange channel;

wherein an endothermic process is conducted in the heat exchange channel, the endothermic reaction comprising a steam reforming process or dehydrogenation process.

112. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein the microchannel distillation sections have heat exchange channel zones thermally communicating with the microchannel distillation sections, a heat exchange fluid flows in the heat exchange channel zones, the heat exchange fluid undergoes partial boiling in the heat exchange channel zones, the pressure of the heat exchange fluid in each of the heat exchange channel zones being different.

113. A process for distilling a fluid mixture in a microchannel distillation assembly, the microchannel distillation assembly comprising at least one microchannel distillation unit, the microchannel distillation unit comprising a plurality of microchannel distillation sections, the microchannel distillation unit having a feed inlet, a distillate end, and a bottoms end, the fluid mixture comprising a more volatile component and a less volatile component, the process comprising:

flowing a vapor phase through the microchannel distillation unit towards the distillate end of the microchannel distillation unit;

flowing a liquid phase through the microchannel distillation unit towards the bottoms end of the microchannel distillation unit;

flowing the fluid mixture through the feed inlet for the microchannel distillation unit into at least one microchannel distillation section within the microchannel distillation unit, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in the microchannel distillation unit towards the distillate end of the microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in the microchannel distillation unit towards the bottoms end of each microchannel distillation unit, the less volatile component rich vapor liquid phase contacting the vapor phase in each microchannel distillation section and becoming enriched with the less volatile component;

wherein the microchannel distillation sections have heat exchange channel zones thermally communicating with the microchannel distillation sections, a heat exchange fluid flows in the heat exchange channel zones, the heat exchange fluid undergoes partial boiling in the heat exchange channel zones, the temperature in each microchannel distillation section being different.

114. A process for distilling a fluid mixture in a microchannel distillation unit, the microchannel distillation unit comprising at least one microchannel distillation section, the microchannel distillation unit having at least one feed inlet, the fluid mixture comprising a more volatile component and a less volatile component, the process comprising:

flowing the fluid mixture through the feed inlet into the microchannel distillation unit;

flowing a vapor phase of the fluid mixture through the microchannel distillation unit in a first direction;

flowing a liquid phase of the fluid mixture through the microchannel distillation unit in a second direction that is counter-current to the first direction;

flowing the vapor phase and the liquid phase in the at least one microchannel distillation section and changing the direction of flow of either the vapor phase or the liquid phase in the microchannel distillation section to provide for the flow of the vapor phase and the liquid phase in the same direction; and contacting the vapor phase and the liquid phase in the microchannel distillation section, part of the more volatile component transferring from the liquid phase to the vapor phase to form a more volatile component rich vapor phase, part of the less volatile component transferring from the vapor phase to the liquid phase to form a less volatile component rich liquid phase.

115. A process for distilling a fluid mixture in a microchannel distillation unit, the microchannel distillation unit comprising a plurality of microchannel distillation sections, the microchannel distillation unit having at least one feed inlet, the feed inlet comprising a feed inlet channel positioned adjacent to and parallel to the microchannel distillation unit, the microchannel distillation unit comprising a plurality of feed openings to permit the flow of the fluid mixture from the feed inlet channel through the feed openings into at least one microchannel distillation section, the fluid mixture comprising a more volatile component and a less volatile component, the process comprising:

flowing a vapor phase through the microchannel distillation unit in a first direction;

flowing a liquid phase through the microchannel distillation unit in a second direction that is counter-current to the first direction; and flowing the fluid mixture from the feed inlet channel through the feed openings into the at least one microchannel distillation section, part of the more volatile component transferring from the fluid mixture to the vapor phase to form a more volatile component rich vapor phase, part of the less volatile component transferring from the fluid mixture to the liquid phase to form a less volatile component rich liquid phase;

wherein a barrier wall is positioned in the at least one microchannel distillation section, the fluid mixture flowing into the microchannel distillation section contacting the barrier wall, the direction of flow of the fluid mixture changing from being orthogonal to the flow of the vapor phase to being aligned with the flow of the vapor phase.

116. A process for distilling a fluid mixture in a microchannel distillation apparatus, the microchannel distillation apparatus comprising a plurality of microchannel distillation units, each microchannel distillation unit comprising a plurality of microchannel distillation sections, each microchannel distillation unit having one or more unit inlets, the microchannel distillation apparatus having an apparatus inlet and one more more channel inlets connecting the apparatus inlet to the unit inlets, each microchannel unit having a distillate end and a bottoms end, the fluid mixture comprising a more volatile component and a less volatile component, the process comprising:

flowing a vapor phase through each microchannel distillation unit towards the distillate end of each microchannel distillation unit;

flowing a liquid phase through each microchannel distillation unit towards the bottoms end of each microchannel distillation unit;

flowing the fluid mixture through the apparatus inlet, channel inlets and unit inlets into the microchannel distillation units, part of the more volatile component transferring from the fluid mixture to the vapor phase to form a more volatile component rich vapor phase, part of the less volatile component transferring from the fluid mixture to the liquid phase to form a less volatile component rich liquid phase;

flowing the more volatile component rich vapor phase through a plurality of the microchannel distillation sections in each microchannel distillation unit towards the distillate end of each microchannel distillation unit, the more volatile component rich vapor phase contacting the liquid phase in each microchannel distillation section and becoming enriched with the more volatile component;

flowing the less volatile component rich liquid phase through a plurality of the microchannel distillation sections in each microchannel distillation unit towards the bottoms end of each microchannel distillation unit, the less volatile component rich liquid phase contacting the vapor phase in each microchannel distillation section and becoming enriched with the less volatile component;

wherein the gas to liquid Reynolds number is in the range from about $500 \times (\text{Suratmann Number})^{-0.67}$ to about $4500 \times (\text{Suratmann Number})^{-0.67}$.

* * * * *